US012700512B2

(12) United States Patent
Scholz et al.

(10) Patent No.: US 12,700,512 B2
(45) Date of Patent: Aug. 4, 2026

(54) STABILIZATION OF Z-PINCH WITH DIRECTED RADIO FREQUENCY EXCITATION

(71) Applicant: Jupiter Volta Inc., Berkeley, CA (US)

(72) Inventors: Jeremy Scholz, Berkeley, CA (US); Alexander Sherman, Berkeley, CA (US); David Berlin, Richmond, CA (US); Aviv Zohman, Berkeley, CA (US); Jerry Chien, Walnut Creek, CA (US); Matthew Robinson, Orinda, CA (US); Megumi Hora, Berkeley, CA (US)

(73) Assignee: JUPITER VOLTA INC., Berkeley, CA (US)

( * ) Notice: Subject to any disclaimer, the term of this patent is extended or adjusted under 35 U.S.C. 154(b) by 0 days.

(21) Appl. No.: 19/297,550

(22) Filed: Aug. 12, 2025

(65) Prior Publication Data

US 2026/0031246 A1 Jan. 29, 2026

Related U.S. Application Data

(63) Continuation of application No. PCT/US2025/026533, filed on Apr. 25, 2025.
(Continued)

(51) Int. Cl.
*G21B 1/05* (2006.01)

(52) U.S. Cl.
CPC .................................... *G21B 1/05* (2013.01)

(58) Field of Classification Search
CPC ....................................................... G21B 1/05
(Continued)

(56) References Cited

U.S. PATENT DOCUMENTS 5,504,795 A * 4/1996 McGeoch .............. H05G 2/007
378/119
6,075,838 A 6/2000 McGeoch
(Continued)

FOREIGN PATENT DOCUMENTS

WO 2023245064 A1 12/2023
WO 2024091136 A1 5/2024

OTHER PUBLICATIONS

Gomez, "Inertial Confinement Fusion-Experimental Physics: Z-Pinch and Magnetized Liner Inertial Fusion", No. SAND2021-3239B, Sandia National Lab (United States), 2021. (Year: 2021).*
(Continued)

*Primary Examiner* — Jack W Keith
*Assistant Examiner* — Daniel Wasil
(74) *Attorney, Agent, or Firm* — JDI PATENT; Joshua D. Isenberg

(57) ABSTRACT

A plasma processing method includes driving electric current through a Z-pinch plasma column within an atmospheric isolation device to produce a Lorentz force on the Z-pinch plasma column. Radiofrequency (RF) energy is supplied to the Z-Pinch plasma column with one or more RF generators. One or more RF applicators direct RF energy from the one or more RF generators toward the Z-pinch plasma column in a direction generally perpendicular to the direction of the electric current through the Z-pinch plasma column. One or more RF distributors distribute the RF energy to the one or more RF applicators.

22 Claims, 30 Drawing Sheets

Related U.S. Application Data

(60) Provisional application No. 63/640,008, filed on Apr. 29, 2024.

(58) Field of Classification Search
USPC .................................................. 376/144, 145
See application file for complete search history.

(56) References Cited

U.S. PATENT DOCUMENTS

| | | | |
|---|---|---|---|
| 6,673,199 | B1 | 1/2004 | Yamartino et al. |
| 2006/0000803 | A1* | 1/2006 | Koshiishi .......... H01J 37/32082 216/67 |
| 2012/0326592 | A1* | 12/2012 | Kudela ................ H01J 37/3211 333/237 |
| 2013/0221845 | A1 | 8/2013 | Edwards et al. |
| 2019/0099733 | A1 | 4/2019 | Locke et al. |
| 2023/0219052 | A1 | 7/2023 | McEnaney et al. |
| 2023/0286820 | A1 | 9/2023 | Renner et al. |
| 2024/0226844 | A1 | 7/2024 | Oliver et al. |
| 2024/0228287 | A9 | 7/2024 | Pinkowski et al. |
| 2024/0234098 | A1 | 7/2024 | Schwalbe et al. |

OTHER PUBLICATIONS

Britannica, “Energy released in fusion reactions”, obtained 2025, https://www.britannica.com/science/nuclear-fusion/Energy-released-in-fusion-reactions. (Year: 2025).*
Nemchinsky, “Plasma flow in a nozzle during plasma arc cutting”, Journal of physics d: applied physics 31, No. 21 (1998): 3102. (Year: 1998).*
Orlinski, “Investigations of materials for windows of the fusion reactor diagnostic systems”, Plasma Devices and Operations 9, No. 3-4 (2001): Abstract. (Year: 2001).*
B. Huang et al., “Simulation and mitigation of the magneto-Rayleigh-Taylor instabilities in Z-pinch gas discharge extreme ultraviolet plasma radiation sources”, Physics of Plasmas, vol. 20, 11, 2023.
B. Levitt, “The Zap Energy approach to commercial fusion”, Phys. Plasmas 30, 090603 (2023); doi: 10.1063/5.0163361, Sep. 18, 2023.
Bogaerts, Annemie, and Erik C. Neyts. “Plasma Technology: An Emerging Technology for Energy Storage.” ACS Energy Letters 3, No. 4 (Apr. 13, 2018): 1013-27. https://doi.org/10.1021/acsenergylett.8b00184.
D. Potter, “The formation of high-density z-pinches”, 1978 Nucl. Fusion 18 813.
Douglass et al.—2007—“Structure of the Dense Cores and Ablation Plasmas in the Initial Phase of Tungsten Wire-Array Z Pinches”, Physics of Plasmas 14, 012704 (2007); doi: 10.1063/1.2431633.
Douglass et al., “Plasma density measurements in tungsten wire-array Z-pinches”, Physics of Plasmas 19, 072710 (2012).
F. Conti , et al., “Neutron-producing gas puff Z-pinch experiments on a fast, low-impedance, 0.5 MA linear transformer driver”, J. Appl. Phys. 136, 095901, Sep. 2024.
G. Osborne, An Investigation of Tungsten-Based Z-Pinch Wire Array Experiments and Benchmarking Experiments, Univ. of Nevada, Reno (2012).
Hassan, A., S. A. Abd El Aal, M. M. Shehata, and A. A. El-Saftawy. “Plasma-Etching and Modification of Polyethylene for Improved Surface Structure, Wettability and Optical Behavior.” Surface Review and Letters 26, No. 07 (Aug. 2019): 1850220. https://doi.org/10.1142/S0218625X18502207.
Hawtof et al., Sci. Adv. 2019; 5 : eaat5778 Jan. 11, 2019; Case Western Reserve University.
Hong, Jungmi, Steven Prawer, and Anthony B. Murphy. “Plasma Catalysis as an Alternative Route for Ammonia Production: Status, Mechanisms, and Prospects for Progress.” ACS Sustainable Chemistry & Engineering 6, No. 1 (Jan. 2, 2018): 15-31. https://doi.org/10.1021/acssuschemeng.7b02381.
J. Ruiz-Comacho et al., “Z-pinch discharges in aluminum and tungsten wires”, Physics of Plasmas (1994-present) 6, 2579 (1999); doi: 10.1063/1.873529.
J.D. Chase, “Magnetic Pinch Effect in the Thermal rf Induction Plasma”, Journal of Applied Physics 40, 318 (1969); doi: 10.1063/1.1657052.
J.D. Douglass, “An Experimental Study of Tungsten Wire-Array Z-Pinch Plasmas Using Time-Gated Point-Projection X-Ray Imaging”, Cornell University, 2008.
Kyere-Yeboah, Kwasi, Ikenna Kemba Bique, and Xiu-chen Qiao. “Advances of Non-Thermal Plasma Discharge Technology in Degrading Recalcitrant Wastewater Pollutants. A Comprehensive Review.” Chemosphere 320 (Apr. 2023): 138061. https://doi.org/10.1016/j.chemosphere.2023.138061.
Panchal, Deepak, Qiuyun Lu, Ken Sakaushi, and Xuehua Zhang. “Advanced Cold Plasma-Assisted Technology for Green and Sustainable Ammonia Synthesis.” Chemical Engineering Journal 498 (Oct. 2024): 154920. https://doi.org/10.1016/j.cej.2024.154920.
Provisional U.S. Appl. No. 63/640,008 to Jeremy Scholz et al. filed Apr. 29, 2025.
R.B. Spielman et al., “Tungsten wire-array Z-pinch experiments at 200 TW and 2 MJ”, Phys. Plasmas 5, 2105 (1998); doi: 10.1063/1.872881.
S. Lee, “Plasma Focus Radiative Model: Review of the Lee Model Code”, J Fusion Energ (2014) 33:319-335.
T. W. L. Sanford et al., Z-Pinch-Generated X Rays for Indirect-Drive ICF Potential, Phys. Rev. Lett. 82, 2159-2162 1999. PDF.pdf.
U. Shumlak et al., “Fusion Gain and Triple Product for the Sheared-Flow-Stabilized Z Pinch”, Fusion Science and Technology • vol. 80 • 1-16 . Jan. 2024.
International Search Report and Written Opinion dated Nov. 21, 2025 for International Patent Application No. PCT/US2025/026533.

* cited by examiner

STABILIZATION OF Z-PINCH WITH DIRECTED RADIO FREQUENCY EXCITATION

CLAIM OF PRIORITY

This application is a continuation of International Patent Application Number PCT/US2025/026533 filed Apr. 25, 2025, the entire disclosures of which are incorporated herein by reference. International Patent Application Number PCT/US2025/026533 claims the priority benefit of U.S. Provisional Application No. 63/640,008 filed Apr. 29, 2024, the entire contents of which are incorporated herein by reference.

FIELD OF THE DISCLOSURE

Aspects of the present disclosure are directed to nuclear fusion and more particularly to stabilization of a Z-pinch to reach the necessary conditions for nuclear fusion. Aspects of this disclosure also relate to fields utilizing the radiation emitted from a Z-Pinch, particularly hard X-Rays and EUV, which are difficult to produce in other ways, e.g., for photolithography. Aspects of this disclosure also relate to fields utilizing the fusion products of the Z-Pinch even if the fusion is low efficiency. Examples are creation of radioisotopes, and creation of fusion fuels like $^3$He and $^3$H (tritium). Aspects of this disclosure also relate to fields utilizing the conditions of the Z-Pinch for chemical engineering. Examples are cracking of $N_2$ molecules and fabrication of nitrogen containing molecules.

BACKGROUND

The global economy largely relies on carbon emitting fossil fuels for the majority of energy consumption for electricity generation and transportation. This situation is inconsistent with international climate goals ($CO_2$ emission limits) and long-term national energy security and energy independence. The geographical and geopolitical concentration of fossil fuel deposits combined with geopolitical unrest threatens national and international security interests.

Fusion power is a proposed form of power generation that would generate electricity by using energy from nuclear fusion reactions. In a typical fusion process, two lighter atomic nuclei combine to form a heavier nucleus, while releasing energy. Fusion processes, which typically occur in the plasma phase, require specific fuel or reactant and a confined environment with sufficient temperature, density, and confinement time. The product of these figures is known as the Triple Product, which considers the energy balance between the energy produced in fusion reactions to the energy being lost to the environment. According to the Triple Product criterion, a machine holding a thermalized and quasi-neutral plasma has to generate enough energy to overcome energy losses due to conduction and radiation, in order to be economically viable for energy production.

In stars, gravity provides extremely long confinement times that reach the conditions needed for fusion energy production for a variety of fusion reactions, including protium-protium. Proposed terrestrial fusion reactors generally use heavy hydrogen isotopes such as deuterium ($^2$H) and tritium ($^3$H) (or mixtures of the two), which react more easily than protium ($^1$H), the most common hydrogen isotope, to allow them to reach the Triple Product criterion requirements with less extreme conditions. Most designs aim to heat their fuel to around 100 million kelvin, which presents a major challenge in producing a successful design.

There are a number of different types of fusion reactor designs, including magnetic confinement, inertial confinement and magnetic or electric pinches. Magnetic confinement utilizes externally produced magnetic fields to confine a fusion plasma. Inertial confinement fusion (ICF) involves compressing and heating pellets of fuel, e.g., containing $^2$H and $^3$H, typically with high-energy laser pulses. Pinch confinement utilizes magnetic forces induced in a plasma by current flow to compress the plasma. An early attempt at controlled fusion involved a type of magnetic pinch confinement for fusion plasma is known as the Z-pinch.

In the Z-pinch, an electric current passes through a cylindrical plasma along its axis (known as the Z-axis). The current produces a Lorentz force that accelerates charged particles radially inward causing the plasma to constrict, or "pinch" to a narrow diameter cylinder. The constricting motion coupled with ohmic heating produces a dense and hot plasma, which can create the necessary conditions for fusion and X-Ray production. Unfortunately, the Lorentz force that constricts the Z-pinch plasma naturally magnifies any deviations in the cylindrical form of the pinch, creating an inherent instability that limits its lifetime, resulting in confinement times too low for practical fusion. Attempts have been made to overcome these instabilities. One conventional approach is known as Shear flow stabilization, which involves an axial flow of plasma along the outside of the plasma cylinder. This approach is still unproven and has not yet been able to reach performance targets necessary for fusion power generation. One disadvantage of current shear flow stabilization systems is that most gas present must be removed from the reaction chamber between shots which limits the frequency of repetition of pulses, hence limiting the potential power output of said devices.

Another conventional approach to Z-pinch instabilities is to use lasers to add energy and ionization to Z-Pinch plasmas, such as the MagLIF type of project. The MagLIF project uses a short (e.g., 100 nanosecond) pulse of electricity to create an intense Z-pinch magnetic field that inwardly crushes a fuel filled cylindrical metal liner through which the electric pulse runs. Just before the cylinder implodes, a laser is used to preheat fusion fuel (such as deuterium-tritium) that is held within the cylinder and contained by a magnetic field. While lasers can be aimed at particular areas of plasma, they do not naturally add energy to destabilizing regimes, and may induce instability if applied non-uniformly.

It is within this context that aspects of the present disclosure arise.

DETAILED DESCRIPTION

Introduction

Figure 1A:
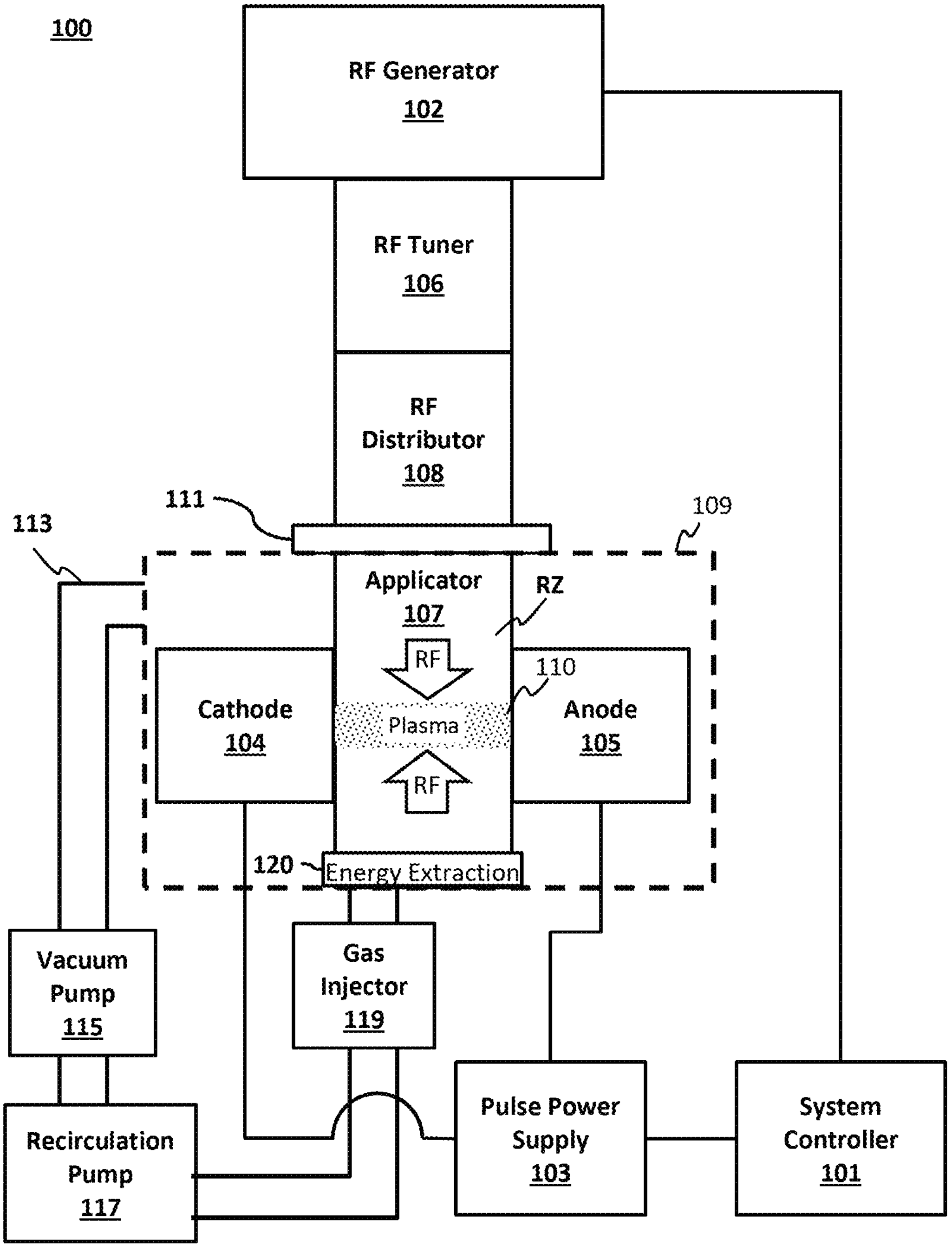
FIG. 1A illustrates a stabilized Z-pinch plasma system according to aspects of the present disclosure.

There are no net energy producing fusion reactors online today and there are challenges with exclusively using renewables (including nuclear fission) to address the problem of reliance on fossil fuels. Recent scientific breakthroughs in inertial confinement, though exciting, are far from engineering and economic breakeven. The approaches with the most attention are Tokamaks and Stellarators. The Z-pinch approach is more attractive than Tokamak and Stellarator by naturally achieving plasma confinement and fusion without externally applied magnetic fields. The Z-pinch simplifies the fusion process, requiring fewer components, reducing operational complexity, and minimizing risk. MagLIF is a compelling hybrid between Z-Pinch and ICF, but less compelling with respect to repetition rate and fuel cost. Although the Z-Pinch approach to fusion has offered the simplest approach to getting a plasma to the density and temperature necessary for $Q>>1$ fusion with a variety of fuels for over 90 years, Z-Pinch research was abandoned for several decades owing to the intrinsic magneto-Raleigh-Taylor (MRT) instabilities limiting the confinement time to a few nanoseconds. There has been a resurgence of Z-Pinch owing to engineering breakthroughs related to using shear flow stabilization of the pinched plasma. Such conventional approaches have demonstrated a plausible path to $Qsci>1$.

Aspects of the present disclosure provide several advantages over both conventional Z-pinch approaches and MagLIF. These advantages include: a faster path to market due to a simple design allowing several equipment iterations per year and larger operating process window with respect to triple product parameters.

Advantages of aspects of the present disclosure further include a more efficient fusion reaction, owing to >100× higher repetition rate as evacuation of the reactor is unnecessary, no thermal loss from plasma cooling by neutral species, and potentially longer quiescent periods. Aspects of the present disclosure may also provide a future path toward mass deployment in microgrids and transportation using the aneutronic $^{3}He+^{2}H\rightarrow^{4}He+^{1}H$ reaction, for which the 8× higher activation energy is conceptually well within the reach of a stabilized Z-Pinched plasma.

Stabilized Z-Pinch Plasma Reactor System

A stabilized Z-pinch plasma system according to aspects of the present disclosure solves the stability (and thus confinement time) problem of by applying radiofrequency (RF) energy in one or more of the following ways:

Pre-ionization: application of RF to the neutral gas to create a plasma prior to the Z-pinch [DC] current.

Exciting gas at instability sites: application of RF during stagnation at a time when instabilities begin to form, naturally driving more energy into collapsing regions, stabilizing their geometry (homogenizing the temperature and density in the surrounding volume) before collapse occurs.

It may be more practical to apply the RF for the entire duration of the implosion and stagnation, but it is likely only helpful for pre-ionization or a combination of pre-ionization and exciting gas at instability sites.

The timing and synchronization of the RF and the DC pulse (pinch) can be engineered using switched RF or pulsed RF, and pulsed DC electronics or amplitude modulated low frequency AC electronics to optimize timing and rep rate. In addition, RF generators are relatively efficient and inexpensive compared to lasers.

Shown in FIG. 1A, are components of a stabilized Z-pinch system 100 according to aspects of the present disclosure, which includes a Z-Pinch drive device, one or more RF generators 102, an RF tuner 106, one or more RF applicators 107, an RF distributor 108, and an atmospheric isolation device 109, such as a vacuum chamber or pressure vessel. In some implementations, a gas curtain may be used as the part or all of the atmospheric isolation device 109. An environmental separation window 111 may isolate the RF distributor from the environment inside the atmospheric isolation device 109. The term "chamber" is sometimes used herein as a convenient shorthand to refer to the atmospheric isolation device 109. The environmental separation window 111 permits RF radiation to enter the atmospheric isolation device 109, while isolating an environment inside it, e.g., the RF concentration zone 110, keeping fuel or reactant gas in and environmental effects out.

A reaction takes place within a reaction zone RZ inside the atmospheric isolation device 109. The location of the reaction zone is somewhat dependent on the nature of the reaction that takes place inside the chamber 109. For a volume process, the reaction zone is some sub-volume of the chamber volume for a volume process. In the example depicted in FIG. 1A, the reaction zone RZ is inside the RF applicator For a surface process, the reaction zone refers to some surface within the chamber where the reaction takes place.

In the implementation depicted in FIG. 1A, a Z-pinch device drives a DC electric current through the initial RF pre-ionized plasma in an RF concentration zone 110 to cause all the ions in the plasma to compress. In this example, the RF concentration zone 110 may include or overlap with the reaction zone RZ. The Z-pinch drive device may include an AC or DC pulse power supply 103 having suitably configured capacitors and switches coupled to an anode 105, and cathode 104. The anode 105 acts as a positively charged terminal during operation, e.g., to supply a conventional current pulse to a plasma in the RF concentration zone 110, or to receive electrons from the plasma. During operation, the cathode 104 acts as a negatively charged terminal that supplies electrons to the plasma or receives conventional current from the plasma. The pulsed power supply 103 is configured to provide a driving pulse of electrical force of short duration between the cathode 104 and anode 105.

According to aspects of the present disclosure, the RF generator 102, tuner 106, distributor 108, applicator 107, window 111, and electrodes 104, 105 may be configured to pre-ionize a plasma prior to a Z-pinch for nuclear fusion or other applications. In some implementations, the electrodes, e.g., cathode 104 and anode 105, may be hollow in shape. The electrodes 104, 105 may be configured to distribute current uniformly on the plasma skin and prevent current from bunching on an electrode section causing damage. In some implementations, the RF ionization motivates a spreading of contact area with the electrodes 104, 105, reducing damage from high current density.

The system 100 may optionally include an exhaust tube 113 coupled to a vacuum pump 115 that draws gas from within the atmospheric isolation device 109 to produce a vacuum therein. The system may further include a recirculation pump 117 and gas injector 119 configured to recirculate gas withdrawn from the atmospheric isolation device back into it. Fuel or reactant gas and other gases exit the chamber 109 through the exhaust tube 113 as a result of vacuum pull on the chamber from the vacuum pump 115. The recirculation pump 117 may compress gas for re-introduction to plasma in the chamber via a gas injector 119. The gas injector is generally a physical structure that directs gas flow, e.g., in jet form, into the plasma chamber 109. Such flow can be directed to interact with plasma in the RF concentration zone 110, creating vortex or shear flow stabilization. In a sheared flow stabilized plasma for nuclear fusion, a plasma column is compressed and heated by a strong electrical current. Plasma instabilities are suppressed by introducing a sheared plasma flow in which different parts of the plasma move at different speeds. The sheared flow effectively "smears" and breaks up the instabilities that would otherwise disrupt the plasma, allowing for a longer duration of stable fusion conductions.

The RF generators 102 may be of Magnetron type, solid state type, Klystron type, Inductive Output Tube type, or other type sources of high-power RF energy. RF may be delivered to the RF applicator(s), e.g., by waveguide, coaxial cable, or strip line. An RF tuner ensures delivery of RF power to an RF concentration zone 110 within the atmospheric isolation device by matching the impedance of the RF generator to the RF distributor 108 and/or RF applicator(s) 107. The tuner 106 may be adjustable, fixed, motorized, or motorized automatic. Each RF generator 102 or group of RF generators 102 may optionally feed a circulator preventing or reducing feedback of RF to the generator.

The one or more RF applicators 107 may be configured to direct RF energy from the RF generator(s) 102 radially inward toward the volume where the Z-pinch will be formed between the cathode and anode. As used herein, the term "Z-pinch zone" refers to a column of space in the reactor where the Z-pinch will occur or is occurring. The Z-pinch zone may lie within or may overlap the RF concentration zone 110. The RF Distributor 108 distributes RF power to one or more entry points on the RF applicator(s) 107, which delivers RF energy to RF concentration zone 110. The RF distributor 108 may be configured to ensure that the RF applicator(s) 107 distributes power to the Z-pinch plasma in a cylindrically uniform manner. For example, the RF distributor 108 can include one or more waveguide entries arranged in a mirrored linear pair, triangle, square, pentagon, hexagon, septagon, octagon, or higher order polygon geometry. The RF applicator(s) 107 may be made from copper, aluminum, stainless steel, or other conductive metal, or material coated with conductive metal or other high conductivity materials.

According to aspects of the present disclosure, a plasma in the RF concentration zone 110 is "lit", i.e., initiated, in the reactor prior to the application of Z-Pinch current. This creates a uniform smooth skin plasma which reduces seed sites at which MRT instabilities can form. The RF energy may be reduced, turned off, maintained, or increased during the period of the Z-Pinch, or pulsed periodically or pulsed in coordination with relevant phases of the Z-Pinch. In some embodiments RF energy may be maintained continuously during the Z-Pinch and responsible for continued instability mitigation by naturally directing energy to the instability "seeds" (initiation of instabilities). In some implementations, the plasma in the RF concentration zone 110 may be contracted into a narrow cylinder by means of its own natural form, or by means of an externally applied magnetic field, (another mode of operation) even without the Z-Pinch current. Contracting the plasma in this manner can set up a column for the Z-Pinch ahead of time and make instabilities less likely compared to, e.g., having the plasma uniform through the reactor.

Z-pinch plasma may experience instabilities detrimental to its intended purpose. As used herein, the term "plasma instabilities" generally refers to regions of a plasma where geometric distribution of active species deviates from axisymmetry and axial uniformity, e.g., due to changes in characteristics of the plasma, such as temperature, density, electric fields, and magnetic fields. These instabilities can cause localized regions of the plasma to move differently than surrounding regions. This can lead to uneven particle flow or the formation of plasma filaments. In an alternative implementation, the RF may be applied to regions of plasma instability only during Z-pinch formation to "treat" the instabilities where the RF preferably concentrates, preventing them from collapsing the pinch. In another alternative implementation, the RF may be applied only during stagnation, i.e., after compression has stopped following initiation of the Z-pinch, so as not to disrupt the Lorentz magnetic force responsible for the implosion. In a further alternative implementation, the RF may be applied to pre-ionize the plasma, unapplied during implosion, and reapplied during stagnation.

In some implementations, the RF applicator 107 may include a resonator (resonance cavity), which serves to intensify the RF field by a factor of up to 10→6 in a localized region (e.g., corresponding to the area of the pinch or RF concentration zone 110). The RF resonator may be configured to operate in the transverse electromagnetic (TEM) mode, transverse electric (TE), or transverse magnetic (TM) modes, such as 01, 11, 12, 31, 123 etc., and may be circular, rectangular, octahedral, spherical, or other shape. In alternative implementations the RF applicator 107 may utilize parallel plate electrodes or an inductive coil to deliver RF energy to the plasma. Parallel plate electrodes or an inductive coil may be backed by an LC resonator circuit to boost no-load electric field. The LC resonator circuit, sometimes called a tank circuit, includes an inductor and capacitor connected in a closed loop. The parallel plate electrodes act as the capacitor. The electric field between the plates is maximized when the resonator circuit is driven at its resonant frequency, which is proportional to the inverse of the square root of the product of the capacitance C of the parallel plate electrodes and the inductance L of the inductor.

The atmospheric isolation device 109 is configured to maintain a controlled environment for the Z-Pinch, and a gas delivery and/or recirculation device for providing more fuel or reactant to the Z-Pinch plasma activation area. The atmospheric isolation device 109 may include, e.g., a vacuum/pressure chamber, or gas curtain. A gas source may supply fusion reactant gases to an enclosed environment, such as a chamber, in which the Z-pinch takes place. In FIG. 1, a dashed line indicates the enclosed environment. An exhaust system, e.g., one or more vacuum pumps, may remove gas at a desired rate to maintain a desired pressure of the atmosphere in the enclosed environment. The system 100 may further include an energy extraction mechanism 120 configured to extract energy from nuclear fusion resulting from a Z-pinch occurring in the Z-pinch plasma column. By way of example, the energy extraction mechanism 120 may include a neutron absorbing blanket containing, e.g., lithium, lead, or water, that is heated by transfer of kinetic energy of the neutrons impacting it. A cooling mechanism uses a coolant (e.g., molten salt, helium, water, or liquid metal) extracts the heat. For example, the hot coolant may drive a heat exchanger, which generates steam to spin a turbine for electricity production. In some implementations, the energy extraction mechanism may include a downstream nuclear fission reactor that uses lithium-7 as the fissionable fuel. Neutrons produced by fusion in the Z-pinch plasma column may drive fission of the lithium-7 and energy may be extracted from the fission reaction, e.g., through a heat exchanger that drives a turbine. In alternative implementations, the energy extraction mechanism may include a neutron absorbing blanket of a precursor isotope for a useful product isotope. By way of example, and not by way of limitation, the precursor isotope may be molybdenum-98 that is used to make molybdenum-99, which in turn decays to form technetium-99m, a medical isotope.

FIG. 1A shows an example of application of RF to an idealized Z-Pinch column in the RF concentration zone 110 constrained between parallel plates. Transverse Electromagnetic (TEM) mode RF radiation may be applied in a radially symmetric manner to the plasma column. Two or more converging transverse electric (TE) modes may also be applicable if oriented with the magnetic field of the RF waves from the RF applicators wrapping around the pinch plasma, and Electric field aligned with the axis of the pinch plasma.

Figure 1B:
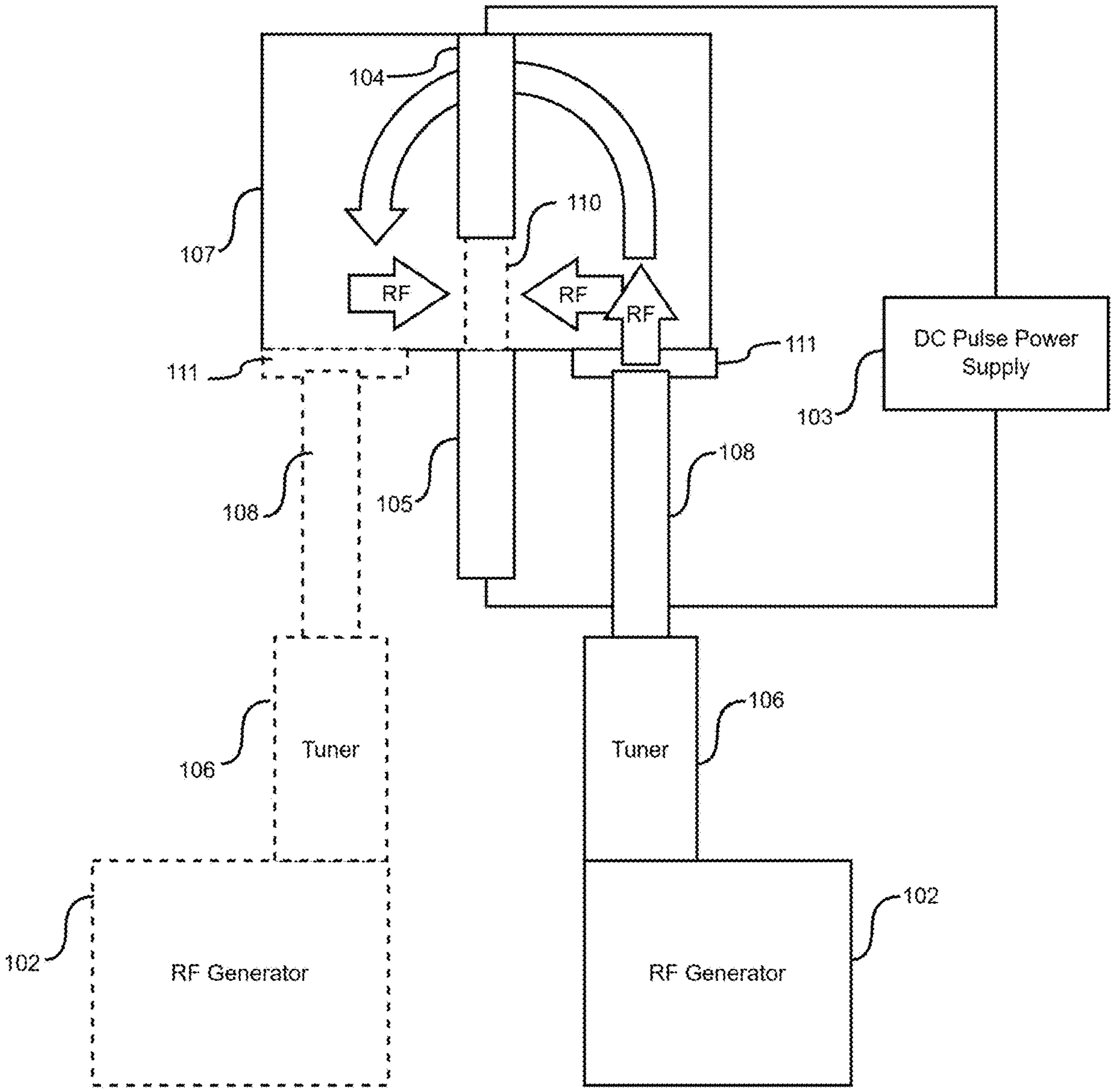
FIG. 1B illustrates an alternative stabilized Z-pinch plasma system according to aspects of the present disclosure in which RF radiation is introduced through a floor of a chamber.

There are many variations on the system 100 depicted in FIG. 1A. For example, as shown in FIG. 1B, the RF distributor 108 and environmental separation window 111 are configured so that RF radiation enters the chamber 109 from its floor. There may be one or optionally two or more RF generators 102, tuners 106, distributors 108, and windows 111 configured to introduce RF power to the chamber in this manner. The RF distributor(s) 108 may be simple waveguide structures coupled between the tuner(s) 106 and window(s) 111, or optionally configurations of dielectric RF lenses or magnetized permeability change material devices such as electromagnet magnetized ferrite. In this implementation, the chamber 109 itself is configured to act as the RF applicator 107. This may be accomplished, e.g., by making the chamber wholly or partially of an electrically conductive material, such as aluminum, stainless steel or copper. By introducing RF power through the chamber floor, the chamber/applicator may distribute RF waves from one or more points of entry proximate to the anode 105 and cathode 104. In this example, the anode 105 is located within chamber 109 and the cathode is located outside the chamber (or mostly outside it).

As may be seen from FIG. 1B, RF energy may enter applicator 107 and/or chamber 109 in a direction parallel to the axis of the Z-Pinch column. Furthermore RF may enter at any of a number of different locations relative to axis of the Z-Pinch column, including at either end of the Z-Pinch, at the middle of the Z-Pinch column, above the Z-Pinch column, or at any intermediate location along the Z-Pinch column.

Figure 1C:
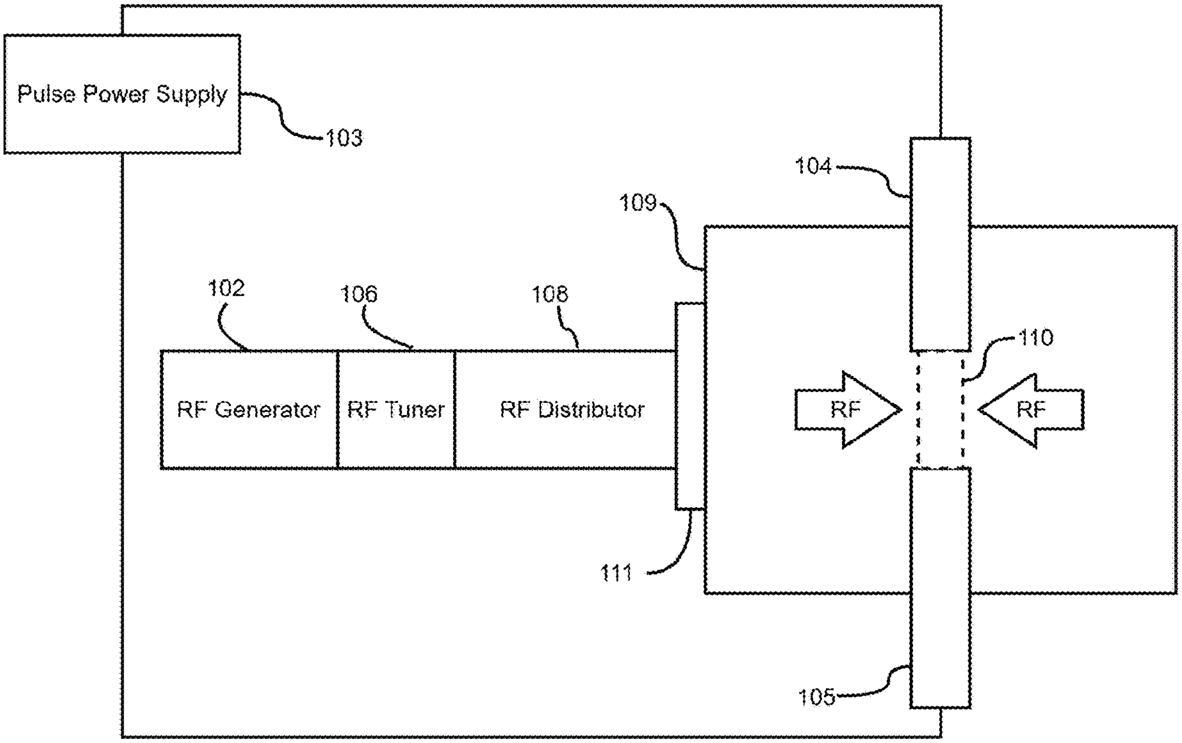
FIG. 1C illustrates an alternative stabilized Z-pinch plasma system according to aspects of the present disclosure in which both an anode and cathode protrude into a chamber.

FIG. 1C shows a system configuration where the cathode 104 and anode 105 protrude or include one or more protrusions into the chamber 109. For example, the protrusions on the cathode and/or anode can form a point or rounded tip concentric with an axis of the Z-Pinch plasma column. In such a configuration the cathode and anode may act as resonant members creating transverse electromagnetic (TEM) resonance, in addition to transverse electric (TE), e.g., TE01 mode, radiation introduced by a distributor 108 in the form of a waveguide structure. In this example, the anode 105 and cathode 104 may be configured to act as antennae to create TEM RF mode that overlays TE RF mode wave coming in from a waveguide distributor 108 to create the RF concentration.

Figure 1D:
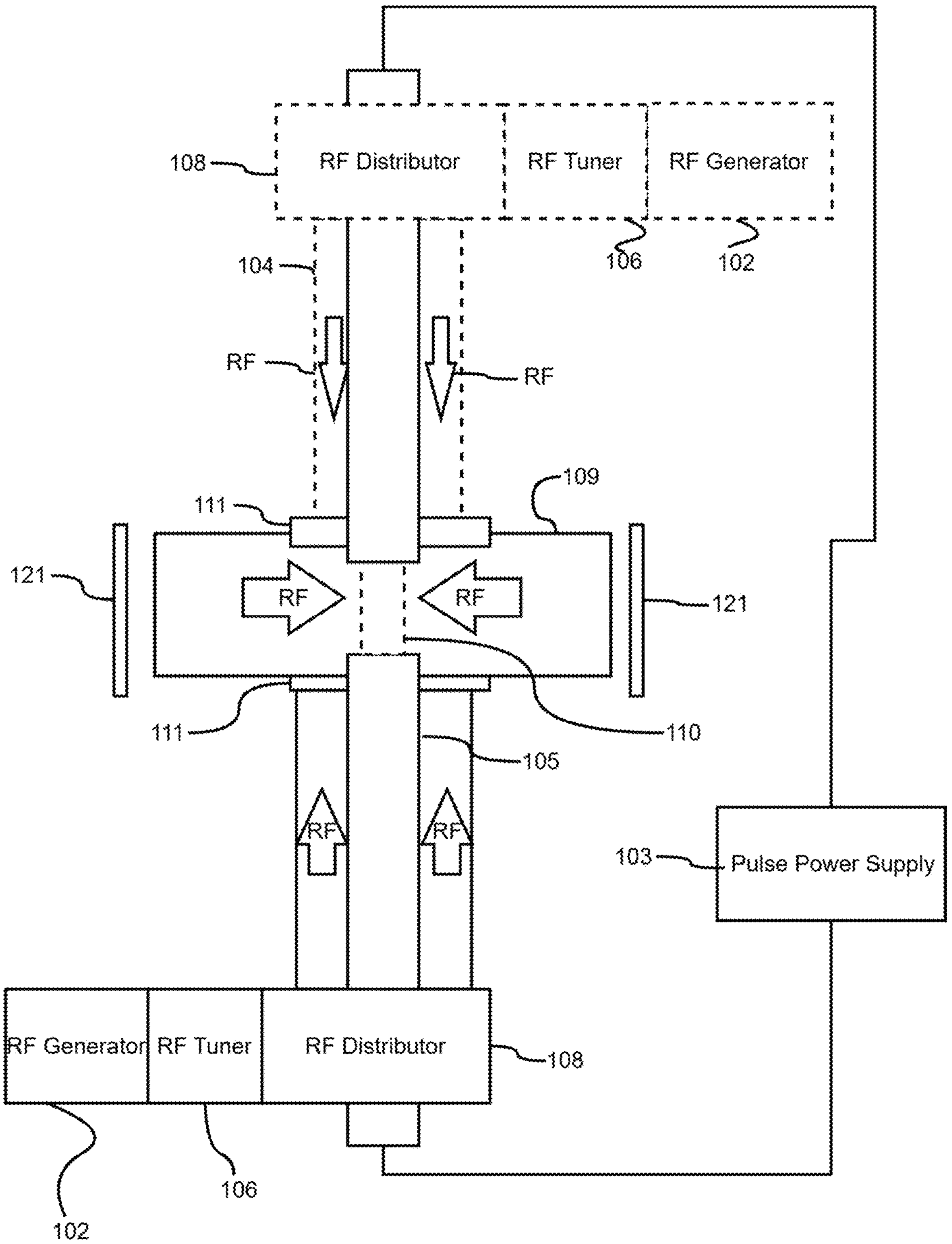
FIG. 1D illustrates an alternative stabilized Z-pinch plasma system according to aspects of the present disclosure in which RF radiation is delivered coaxially into a chamber.

FIG. 1D depicts an alternative system configuration where RF power is delivered coaxially with the cathode 104, or optionally the anode 105, or optionally both cathode and anode acting, in whole or in part, as the applicator. In particular, the cathode and/or anode may be of a generally cylindrical shape that protrudes through one or more environmental separation windows 111, e.g., one or more suitably configured feedthroughs that electrically isolate the cathode and/or anode from the chamber 109. Outside the chamber, the cathode and/or anode may be surrounded by coaxial electrically conductive shields 121 that confine the RF waves to the space between the shield and the cathode and/or anode. Such a configuration may deliver RF waves coaxially to the concentration zone 110 in a TEM mode.

Figure 1E:
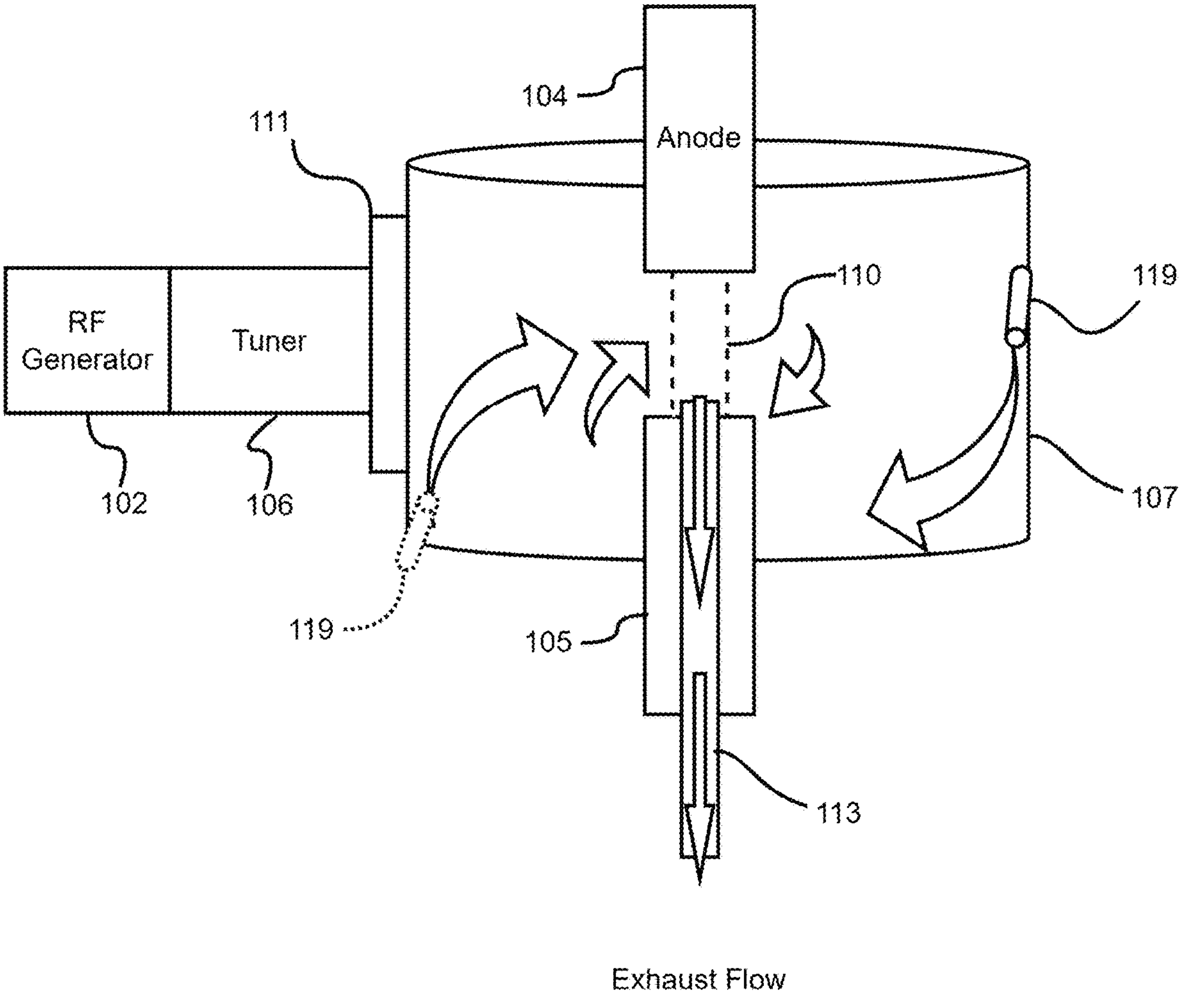
FIG. 1E illustrates an alternative stabilized Z-pinch plasma system according to aspects of the present disclosure in which tangential gas injectors introduce a vortex flow to a plasma chamber.

FIG. 1E illustrates an example of an alternative system configuration where tangential gas injectors 119 cause a vortex flow pattern within the chamber 109. The gas injectors may be angled tangentially with respect to a symmetry axis of the chamber so that vortex flow is present proximate to the center of the chamber. In this example, an exhaust tube 113 is coaxial with the cathode 104. In some implementations, an exhaust tube may optionally be coaxial with the anode 105. In other implementations, there may be two or more exhaust tubes, with one coaxial with the cathode and another coaxial with the anode. It is noted that implementations of the type shown in FIG. 1E include those in which a single structure acts as both electrode (anode or cathode) and exhaust tube.

Figure 1F:
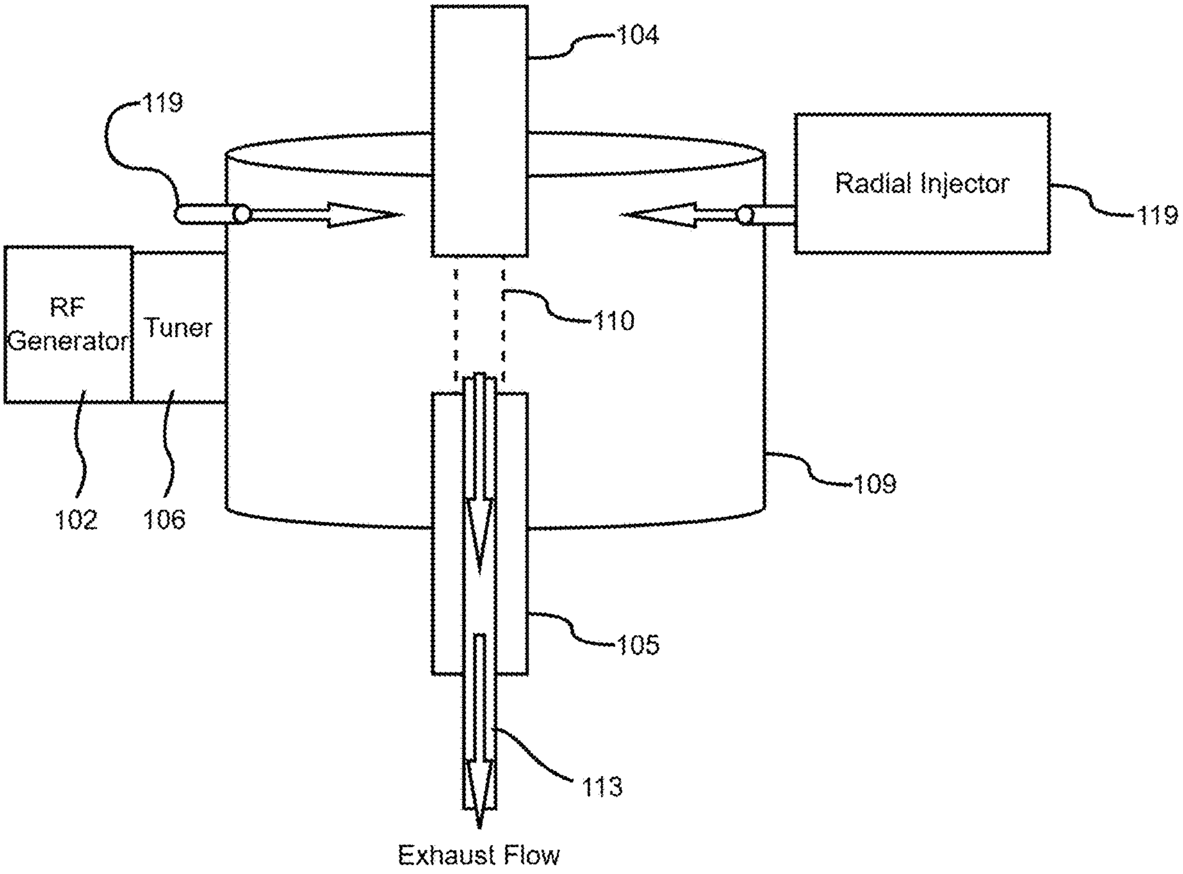
FIG. 1F illustrates an alternative stabilized Z-pinch plasma system according to aspects of the present disclosure in which radial gas injectors cause a centrally directed flow pattern in a plasma chamber.

FIG. 1F depicts an example of an alternative system configuration where the gas injectors 119 include radial gas injectors configured to cause a centrally directed flow pattern within the chamber 109. In this example, the exhaust tube 113 may be coaxial with the cathode 104 or optionally with the anode 105 or optionally coaxial with both the cathode and anode. In some variations on this implementation the gas injectors 119 could produce some combination of radial, axial, and tangential gas flow(s). Also, pulling exhaust through anode/cathode creates a low pressure core that pulls in gas species for the plasma in the RF concentration zone. The gas flow may also be configured to pull activated plasma from the RF concentration zone 110 (or Z-pinch plasma column) through to another reaction zone for downstream reactions. Implementations like that shown in FIG. 1F may be particularly applicable to fusion and plasma chemistry implementations, e.g., with heavy gas molecules that have more inertia.

Figure 1G:
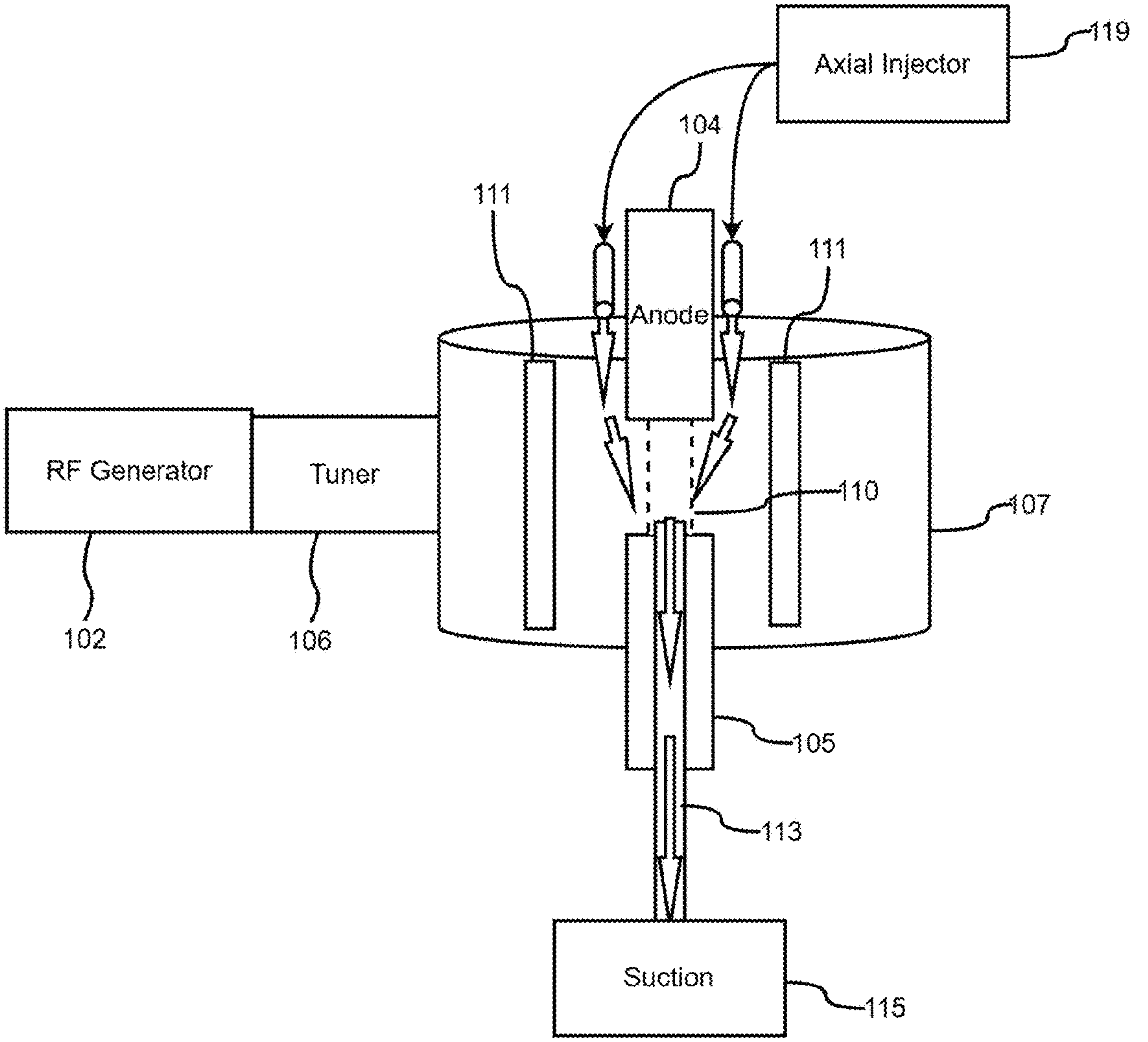
FIG. 1G illustrates an alternative stabilized Z-pinch plasma system according to aspects of the present disclosure in which axial gas injectors inject fuel or reactant gas axially toward a cathode and anode in a plasma chamber.

FIG. 1G depicts an example of a system configuration in which the environmental separation window 111 is a cylinder within the RF Applicator 107, and where the gas injectors 119 include axial injectors that direct fuel or reactant gas axially along the anode 105 toward the cathode 104. A variation on this implementation may have the reverse configuration, i.e., where the axial injectors direct gas axially along the cathode toward the anode.

Operation

The system shown in FIG. 1A may operate under direction of a system controller 101. Such a controller 101 may include one or more computing devices, microprocessors, microcontrollers, application specific integrated circuits. The controller 101 may be coupled to the RF generator(s) 102 and the pulse power supply 103. The controller 101 may be operably coupled to various components of the system 100 to coordinate delivery of fuel gas, RF power, pulse current to the RF concentration zone 110. For example, the controller 101 may provide signals that trigger the RF generator(s) 102 to turn on and generate RF waves prior to triggering the power supply 103 to apply a DC pulse between the cathode 104 and anode 105 to pre-ionize a plasma discharge and to turn off the RF waves prior to the DC pulse, or turn on when the DC pulse is delivered, or turn on prior to the DC pulse and turn off after the DC pulse is complete, or turn on prior to a series of pulses and turn off after the series is complete. In other implementations RF may be used to trigger plasma formation which triggers discharge of DC from the DC pulse delivery device, with the RF acting as a switch. Alternatively, plasma formation initiated by the RF may trigger a separate switch such as spark gap, solid state switch, MOSFET array, ignitron, contact, or other high voltage high current switch.

In some implementations, the controller 101 may be configured to cause the pulse power supply 103 to deliver a series of pulses of different amplitude, frequency, period, pulse shape, waveform, or pattern between the anode 104 and cathode 105, thereby delivering controlled current pulses to the Z-Pinch Plasma column, e.g., to facilitate stabilization, heating, or density control. In some implementations, the pulse power supply 103 may take a form largely resembling a Linear Transformer Driver System. In other embodiments it may take the form of a programmable Marx generator array, optionally impedance tuned, optionally with variable impedance for various plasma operating conditions.

Figure 2A:
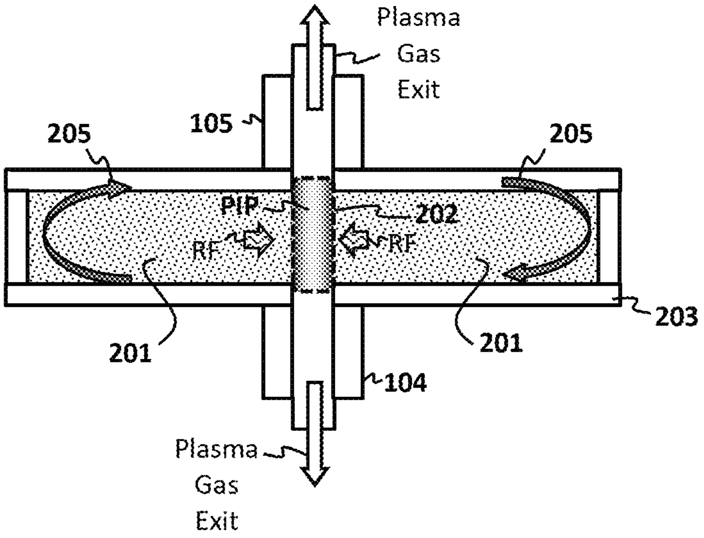
FIG. 2A illustrates operation of a stabilized Z-pinch plasma system according to aspects of the present disclosure just prior to application of a Z-Pinch current.
Figure 2B:
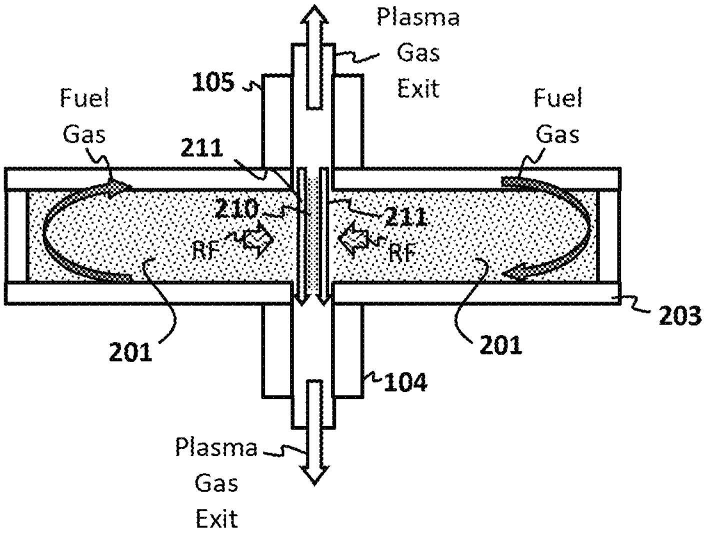
FIG. 2B depicts the condition of the stabilized Z-pinch plasma system according to aspects of the present disclosure during the Z-Pinch.

In some implementations, e.g., as depicted in FIG. 2A, the controller may be configured to cause the RF generator(s), RF applicator(s) and RF distributor to apply sufficient RF energy to a neutral gas 201 in the Z-pinch plasma column region 202 to create a plasma prior to the Z-pinch drive device applying electric current through the Z-pinch plasma column, e.g., as shown in FIG. 2A. In alternative implementations, the controller may be configured to cause the RF generator(s), RF applicator(s) and RF distributor to apply RF energy to the Z-pinch plasma column 210 as the Z-pinch drive device applies electric current 211 through the Z-pinch plasma column 210, e.g., as shown in FIG. 2B. It is noted that combinations of such implementations are possible, e.g., combinations where the controller is configured to cause the RF generator(s), RF applicator(s) and RF distributor to apply sufficient RF energy to a neutral gas in the Z-pinch plasma column region to create a plasma prior to the Z-pinch drive device applying sufficient electric current through the Z-pinch plasma column and to subsequently apply RF energy to the Z-pinch plasma column as the Z-pinch drive device applies sufficient electric current through the Z-pinch plasma column.

FIG. 2A depicts a reactor in the form of an RF resonator 203, providing up to, e.g., 1 $kW/mm^3$ of RF power to the pinch zone 202 prior to the pinch. Not to be limited by theory, providing this energy prior to the pinch may create a plasma in the area of the pinch zone 202 that mitigates the nucleation of MRT instabilities by removing the field emission and Townsend avalanching phases of ionization necessary with a pure DC pulse ionization. Furthermore, as illustrated in FIG. 2B, the RF wave continues to act exclusively on the outside of the pinch cylinder, the area of trouble with respect to cooling by neutrals and formation of MRT nucleation sites, without interfering with the denser core of the pinch where the fusion is happening. In some implementations, the RF resonator 203 may be integrated into the atmospheric isolation device.

Independent Temperature Control

An additional feature of the invention is the ability to apply plasma heating via RF energy in addition to the DC pulse. The additional energy addition adds flexibility to achieve triple product criterion and allows the pinch current to act as a compression mechanism rather than relying on it for ohmic heating. An additional advantage of stabilized Z-pinch plasma systems of the types described herein is the ability to heat the plasma using the RF energy in addition to the DC pulse.

Fusion Energy Generation

The system shown in the FIG. 1, FIG. 2A and FIG. 2B may be readily adapted for fusion energy generation. Specifically, the gas source may supply deuterium and/or tritium as reactant gasses for a fusion Z-pinch plasma of sufficient density. The RF generator(s) and applicators may be configured to ionize the reactant gasses and sustain the plasma and the DC pulse generator may be configured to apply a DC pulse to the cathode and anode for a sufficient pulse duration to satisfy the triple product criterion for the reactants involved so that energy efficient nuclear fusion takes place. Energy released by the fusion reaction may then be extracted by a suitable mechanism or mechanism.

By way of example, in the case of deuterium-tritium (D-T) fusion the energy extraction mechanism may capture the kinetic energy of fast neutrons released by such fusion. One way to do this is to surround the fusion reaction zone with a thick “blanket” of lithium, which heats up when struck by the fast neutrons. In some implementations the thick “blanket” may be a pool of liquid metals surrounding the reaction zone. The liquid metals may be a combination of metals such as lead and lithium or a combination of lithium and other elements such as fluorine and beryllium (FLiBe). The blanket may then be cooled by a working fluid that drives a turbine. Furthermore, lithium can undergo reactions when struck by neutrons, producing tritium, which is a useful and valuable fuel for fusion reactors. In an alternative implementation, neutrons released by the fusion reaction may breed fission fuel in a blanket of nuclear waste that surrounds the fusion reaction zone. The power output of the system is enhanced by the fission events and power may be extracted by systems like those used in conventional fission reactors.

In another example, a reactor implementation may omit the “blanket” of lithium or place the “blanket” of lithium and/or other materials behind the first wall reactor cooling and the energy may be extracted through the working fluid in thermal contact with the vessel containing the fusion reaction. As above the working fluid drives a turbine connected to a dynamo or alternator which converts the rotational movement of the turbine shaft to electrical energy. In implementations that include a blanket the blanket may also be cooled with working fluid which drives a turbine for additional energy extraction.

In yet another alternative implementation, the Z-pinch plasma may use a combination of reactants that produce an aneutronic fusion reaction, which releases much more energy in the form of charged particles than in the form of neutrons. A compact aneutronic reactor with low mass-to-energy ratio could potentially serve not only the demands of the electric grid, but also serve transportation and aerospace energy needs. An example of such a reactant combination includes a boron-containing gas and hydrogen, which may be used to produce an aneutronic proton-boron fusion reaction. In such implementations, the energy extraction mechanism may be based on movement of such charged particles. One example of such an extraction mechanism may be based on the principle of magnetohydrodynamic generation. In such a system, a flow of charged particles generated by the fusion reaction is directed into a channel. Magnets, e.g., electromagnets, produce a transverse magnetic field, i.e., one perpendicular to the direction of the flow of charged particles. The Lorentz force from the magnetic field directs positive and negative charged particles toward separate electrodes and an electric potential difference can be retrieved from the electrodes.

The thermoelectric effect may be employed in some example implementations to generate electricity from a temperature gradient on the outside of the vessel containing the fusion reaction for example and without limitation thermopiles may be coupled around the vessel with one side being cooled and the other side in thermal contact with the hot wall of the vessel or a heat transfer fluid in thermal contact with the vessel thus creating a thermal gradient.

Advantages

Some existing Z-Pinch apparatus employ RF to ionize gas prior to gas exit from a cathode-nozzle or anode-nozzle combination. Systems according to aspects of the present disclosure, by contrast, allow RF application during the pinch, in addition to pre-ionization of the pinch gas. Stabilized Z-pinch systems of the type described herein may also allow for much higher pressure plasmas for Z-pinch than conventional systems, e.g., from about 10 Pascal up to atmospheric pressure or higher.

Stabilized Z-pinch plasma systems according to aspects of the present disclosure may also operate at much higher-frequency pulsed mode operation than conventional Z-pinch systems that need to be pumped down before starting a full pinch cycle. Such conventional systems typically operate at a pulse rate of order 0.1 Hz with a goal of operating at up to 1 Hz. By contrast, a system of the type described herein would not need gas removed from the system between pulses. Operation at 1 Hz, 100 Hz, or over 1 kHz is possible. In some cases, the systems and methods described herein can operate at 10 Pa up to atmosphere or higher. Pulse length could range from 10’s of microseconds down to 100’s of nanoseconds.

Stabilized Z-pinch plasma systems according to aspects of the present disclosure may allow confinement times $\gg$10 μs.

A fusion reactor system according to aspects of the present disclosure presents a future path toward mass deployment in microgrids and transportation using the aneutronic 3He+2H→4He+1H reaction, for which the 8× higher activation energy is possible using the stabilized Z-Pinched plasma systems and methods described herein.

A Z-pinch reactor according to aspects of the present disclosure can operate in the following regimes that conventional approaches cannot. Consequently, such reactors can have a more versatile tolerance to the triple product parameter space. By way of example, but not by way of limitation, such a reactor may potentially operate with one or more of the triple product parameters (confinement time (τ)×plasma density (n)×plasma temperature (T)) bounded by the following conditions:

$$\tau > 100 \text{ ns}, n > 1e27 \text{ m}^{-3}, T > 12 \text{ keV, pinch current} \sim 1\text{–}2\ MA\ (DT)$$

$$\tau > 10\ \mu\text{s}, n > 1e27 \text{ m}^{-3}, T > 20 \text{ keV,}$$

$$\text{pinch current} \sim 2\text{–}3\ MA\ (DD/DHe3)$$

$$n\tau > 1e21 \text{ m}^{-3}\text{s}, T > 7 \text{ keV, pinch current} \sim 0.8\text{–}1.6\ MA$$

Several RF, plasma, and gas pressure parameters prior to initiating the Z-pinch may influence which of the conditions above are accessible. Examples of such parameters include plasma diameter, pressure, and RF power density ratio. Some examples of ranges for these parameters include:

Condition A

- Plasma diameter ~$\lambda_{RF}/4$,
- Pressure ~0.5-2 kPa,
- RF power density ratio ~0.2-0.4 W/mm$^3$kPa Condition B

- Plasma diameter ~2.5-12 mm,
- Pressure ~2 kPa-50 kPa,
- RF power density ratio ~0.2-1.2 W/mm$^3$kPa Condition C

- Plasma diameter ~1-6 mm,
- Pressure ~50 kPa-500 kPa or 200 kPa to 1000 kPa
- RF power density ratio ~0.4-2.0 W/mm$^3$kPa As used herein, pressure refers to the gas pressure in the RF concentration zone 110 or Zr pinch plasma column region 202. The RF power density ratio refers to a ratio of the RF power per unit volume in the RF concentration zone (or Z-pinch plasma column region) divided by the gas pressure in the RF concentration zone (or Z-pinch plasma column region). As used herein, plasma diameter refers to a transverse dimension of the Z-pinch plasma column without Z-pinch current applied. Since the plasma column may not have a well-defined solid boundary, its diameter may be defined based on optical, electrical, or fluid dynamic properties. For example, the diameter may be based on a Full-Width at Half-Maximum (FWHM) diameter based on optical and/or spectroscopic measurements in which plasma emission intensity or electron density or magnetic field profile is measured across the plasma column, and the diameter is taken as the width at half the maximum intensity. If the plasma has an irregular shape but a known cross-sectional area A an equivalent diameter can be defined as $D_{eq}=\sqrt{A/\pi}$.

With respect to Condition A, $\lambda_{RF}$ refers to the wavelength of the RF energy in the RF concentration zone (or Z-pinch plasma column region). The ability to have the plasma diameter constrict below $\lambda_{RF}/4$ at low pressure is believed to be particularly advantageous. With respect to Condition C, the ability to operate at arbitrarily high pressure is also believed to be particularly advantageous. In some implementations, conditions A, B, or C may be implemented with pulsed, continuous, AC or other current applied to the Z-pinch plasma column through electrodes Plasma Catalyzed Reactions According to some aspects of the present disclosure, concentrated plasma reactions may be used to catalyze the chemical breakdown of materials and secondary reactions. These concentrated plasma catalyzed reactions may not be possible or may be very slow when performed without the concentrated plasma catalyst.

Figure 3A:
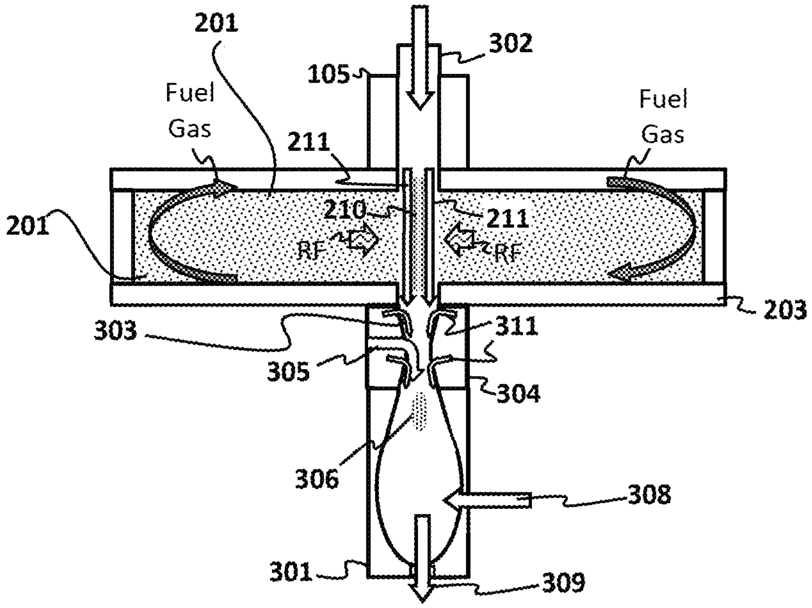
FIG. 3A illustrates a Z-pinch plasma system with an external venturi nozzle and reaction chamber according to aspects of the present disclosure.
Figure 3B:
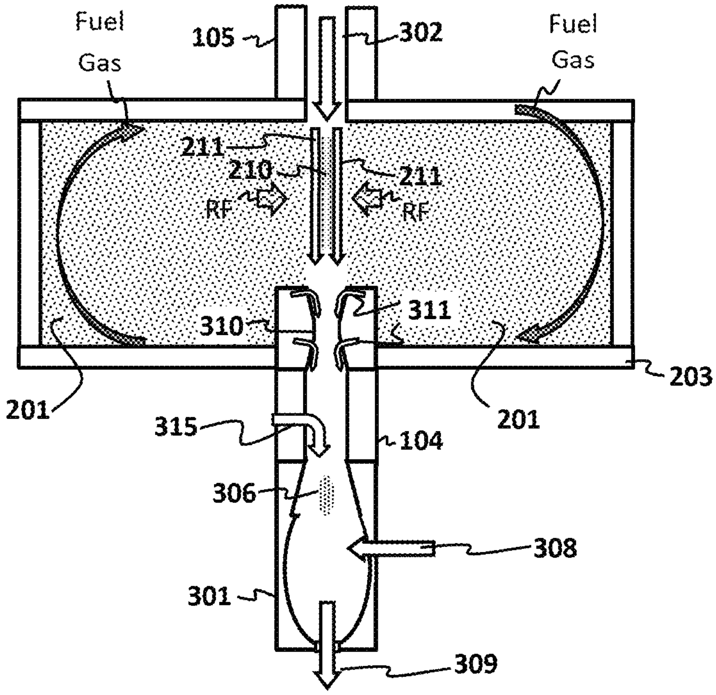
FIG. 3B illustrates a Z-pinch plasma system with an internal venturi nozzle and reaction chamber according to aspects of the present disclosure.

FIG. 3A and FIG. 3B depict reactors configured to take part in plasma catalyzed reactions according to aspects of the present disclosure. In FIG. 3A the atmospheric isolation device 203 may be attached to one or more down-stream reaction chambers 301. In the implementation shown an inlet of the downstream reaction chamber 301 is connected to an outlet of the atmospheric isolation device 203 aligned with an axis of the Z-pinch plasma column region 210. The outlet of the atmospheric isolation device 203 is coupled to the cathode 304 used for the DC pulse. A carrier gas and/or reactant gases and/or downstream reagents may be introduced at an inlet 302 opposite the outlet for the downstream reaction chamber 301 to push concentrated plasma towards the outlet of the downstream reaction chamber 301. This may allow for collection of products 309 at the downstream reaction chamber 301. In some implementations, the downstream reaction chamber may be coated with a catalyst such as tungsten, Iron Oxide, Alumina, CaO, or Ru on C or MgO. In some implementations, the reaction chamber may have features providing additional surface area such as metal wool or fins. The downstream reaction chamber may be water cooled to promote rapid cooling of reaction products.

The implementation shown in FIG. 3A further includes a venturi nozzle 303 incorporated into a plasma outlet of atmospheric isolation device 203 and located on the outside of the atmospheric isolation device 203. In alternative implementations, there may be one or more plasma outlets patterned in a rotationally symmetric array around a cathode and/or an anode. As noted above, an RF resonator may be integrated into the atmospheric isolation device. The venturi nozzle shown here is electrically conductive and integrated with the cathode 304. The venturi provides suction to move plasma species out of the chamber to be reacted. The venturi may also facilitate effective mixing of a downstream reagent.

In FIG. 3B the venturi nozzle 310 is mounted on the inside of the atmospheric isolation device 203 before the outlet. A flow of venturi fluid 311 may be introduced through inlets just before or after the narrow "throat" of the venturi nozzle 310 to flow along the inner wall of the venturi nozzle toward the downstream reaction chamber. The venturi fluid 311 may be a neutral gas, such as argon or helium, or a reactant gas such as hydrogen, nitrogen, methane, or carbon monoxide that participates in a reaction in the downstream reaction chamber 301. In alternative embodiments the venturi fluid 311 can be a reactant liquid such as deionized water which is reacted with nitrogen plasma to form nitric acid, or a sulfur dioxide plasma to form sulfuric acid. In alternative embodiments the venturi fluid 311 can be a heat transfer fluid liquid such as supercritical $CO_2$ which rapidly cools the plasma stream. The gas flowing along the inner wall of the venturi nozzle 310 may entrain the plasma to a narrow stream by following the sidewalls of the venturi nozzle 310. Entraining the plasma in this fashion may keep the hot plasma away from sides of the down-stream reaction chamber. In other embodiments, venturi fluid may be used to rapidly cool the plasma to stabilize desired reaction products. In some embodiments the venturi fluid 311 may be used to thoroughly mix the plasma species with a second reagent, reacting to form a desired product.

In some implementations, downstream reagents 305 may be introduced with a carrier gas at the carrier gas entrance 302, into a stream of primary reactants forms the Z-pinch plasma column 210, at the entrance to the venturi nozzle, the pinch of the venturi nozzle and/or the exit of the venturi nozzle. One or more holes in the interior walls of the venturi nozzle 303 may be used to introduce the downstream reagents into the plasma. The one or more holes may be connected via pipes or tubing to tanks which contain the downstream reagents. The one or more downstream reagents may be liquid, gas or an aerosolized liquid. The downstream reagents react with the primary reactants flowing from the Z-pinch plasma column 210 in the downstream reaction chamber 301 to form dissociated products. The dissociated products may then be further reacted with secondary reactants 308 to form final or intermediate products. The final products 309 of the reactions with the secondary reactants 308 and dissociated products may exit the downstream reaction chamber 301 via an exit orifice for collection or further processing. In some implementations, a secondary plasma 306 may be generated in the downstream reaction chamber to facilitate reaction between the downstream reagents, and/or dissociated products and/or secondary reactants.

In another example implementation, as shown in FIG. 3B, the downstream reagents 315 may be introduced through holes in the hollow cathode 104 connected to the downstream reaction chamber. Alternatively, the one or more downstream reagents may be introduced into the atmospheric isolation device with the fuel or reactant gas or in separate inlets from the inlets introducing fuel gas. In yet other alternative implementations, the one or more downstream reagents may be introduced over the outlet for the plasma with or without a carrier gas. A carrier gas may be introduced to the atmospheric device to push the plasma column towards the plasma outlet. In some implementations the carrier gas may be introduced over the plasma outlet through a carrier gas inlet 302.

The downstream reaction chamber 301 may be a container suitable to contain secondary reactions that occur after the concentrated plasma reactions. The downstream reaction chamber may have inlets to introduce secondary reactants 308 to the downstream reaction chamber. These secondary reactants 308 may react with products formed from reactions between the concentrated plasma. The final products 309 of these secondary reactions may be collected from the downstream reaction chamber or may flow through a collection outlet to a separate collection area (not shown).

For example and without limitation, downstream reagents such as polymers, water, or hydrocarbons may be introduced to the compressed plasma column. The downstream reagents may react with a compressed plasma column resulting in dissociated products such as dissociated hydrocarbon radicals. These products may then react with the secondary reactants in the downstream reaction chamber. By way of non-limiting example, the secondary reactants may include Nitrogen ($N_2$) and Oxygen ($O_2$) resulting in the formation of Nitric Acid, $HNO_3$, from the dissociated water radicals. The final product, Nitric Acid, may be collected from the downstream reaction chamber or flowed to a collection area. In another example the downstream reagents may include simple molecules such as water ($H_2O$) and carbon dioxide ($CO_2$) which may be dissociated in the plasma column into their constituent atoms and may recombine into complex hydrocarbons which may end up in the downstream reaction chamber. Thus, an advantage of the compressed plasma reactions described herein is that they may be used to create compounds which typically require thermodynamically unfavorable reactions.

It is noted that although an anode 104 and a cathode 105 are depicted in FIG. 3A and FIG. 3B aspects of the present disclosure include implementations that either omit them or that do not involve applying a voltage between them to produce a Z-pinch current. As such, the anode and cathode may be regarded as optional features for implementations involving chemical processing, including implementations involving plasma catalyzed reactions using downstream reagents, among others. In particular, aspects of the present disclosure apply to implementations in which chemical processing may occur without the need for a Z-pinch current to compress a plasma column.

Fuel, reactant, or downstream reagents may be solid, liquid, or gas at room temperature. Fuel, reactant, or downstream reagents may be a superfluid, such as superfluid helium-4. For example but not by limitation, fuel or reactant gas can be heated to above its boiling point at the pressure within the atmospheric isolation device before entry into the atmospheric isolation device 201, optionally by absorbing heat from the atmospheric isolation device, anode 104, or cathode 105. By way of example, elemental sulfur could enter the system at 1 bar and 115° C. in the liquid phase, and be heated to above 444° C. by way of contact with hot components. Downstream reagents entering the downstream reaction chamber 301, may be gas, liquid, or solids at room temperature. In some implementations, fuel, reactants, or downstream reagents may be in the form of solid particles or liquid droplets that are small enough to be entrained in a gas flow, e.g., sub-micron particles or impurities. Examples of liquid fuel, reactant, or downstream reagents include liquids at room temperature, mixtures which are liquid in the temperature range of the atmospheric isolation device or other components, or liquids which include dissolved or suspended solids, such as a Lithium Hydroxide solution. Downstream reagents, carrier, fuel, and reactant gasses may be injected in interchangeable orientations, by way of example, in FIG. 3B Fuel gas could be injected at Carrier Gas Entrance 302, or carrier gas could be injected at port for Secondary Reactants 308. By example, a downstream reagent may include:

water, entering 1 atm pressure environment in the reagent chamber at 1 to 100° C. in the liquid phase, or 101° C. to 650° C. in the gas phase as steam Iron oxide powder or Wolframite at fluidizable particle size carried by hydrogen gas at 20° C.

Oxygen entering a 5 atm pressure environment in the liquid phase between −227° C. and −160° C., or in the gas phase above −160° C.

As used herein, particles are said to be fluidizable if their size and density allows them to become suspended and behave like a fluid when a gas or liquid flows through them. The degree to which particles may be fluidized depends mainly on particle size, density, and fluid velocity. Particles that are too small may tend to stick together. Particles that are too large may require an impractically large fluid velocity.

Table 1 shows several examples of reactions which can be catalyzed by the plasma.

TABLE 1

| Fuel/Reactant Gas | Downstream Reagent | Product |
|---|---|---|
| nitrogen + oxygen | water | nitric acid |
| nitrogen | hydrogen | ammonia |
| carbon dioxide | hydrogen | methanol and water |
| methane and water | none | methanol |

TABLE 1-continued

| Fuel/Reactant Gas | Downstream Reagent | Product |
|---|---|---|
| sulfur and hydrogen | water | sulfuric acid |
| methane | none | graphite and hydrogen |
| carbon dioxide | nitrogen | carbon monoxide, nitric oxide |
| iron oxide and hydrogen | methane | carbon steel |
| methane | oxygen | water, carbon dioxide, energy |

In some alternative implementations the plasma species may include nitrogen and oxygen, forming nitrogen oxides. In other alternative implementations the plasma species may include air, forming nitrogen oxides. In still other alternative implementations the plasma species may be air supplemented with nitrogen and/or oxygen, forming nitrogen oxides.

RF Created Plasma Instability

A discovery made during experimentation with a system according to aspects of the present disclosure is that a stable RF plasma column may be created. In some implementations, with sufficient RF energy, Z-pinch compression can be achieved with RF driven current. Thus, in some implementations the hollow cathode and hollow anode may be omitted or simply not used to apply electrical current for the Z-Pinch. For example and without limitation, a stable plasma column may be generated with RF alone.

Figure 4:
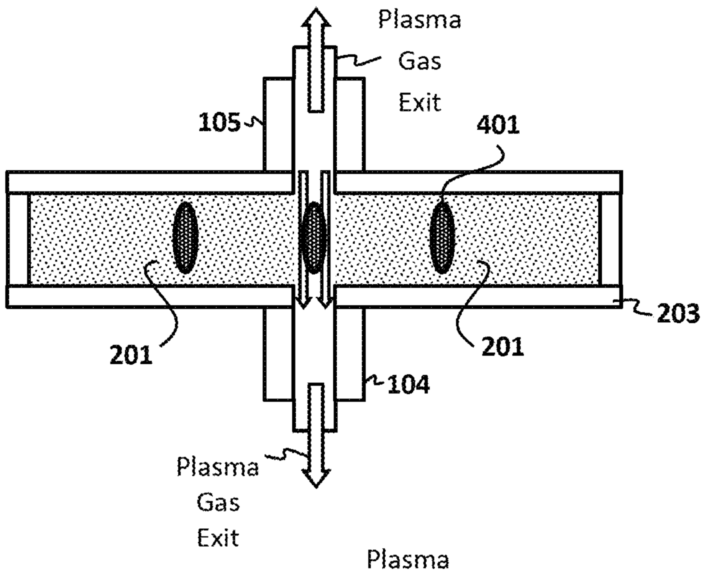
FIG. 4 depicts the issue of plasma instability in the Z-pinch plasma system according to aspects of the present disclosure.

One, previously unknown, problem that has been discovered with a system according to aspects of the present disclosure is single plasma column instability at some ratios of RF power to gas pressure inside the atmospheric isolation device, such as greater than 0.3 W/Pa in one embodiment, or 0.1 W/Pa in another. This plasma instability results in the formation of two or more parallel plasma columns 401 of relative decreased plasma intensity (e.g., cooler plasma temperature and/or lower plasma density) as shown in FIG. 4. These weaker columns 401 are unfavorable because the reduced plasma intensity and multiple plasma columns may make it difficult to perform secondary reactions as the heat of the weaker plasma and plasma location may be less favorable for reactions or energy generation.

Directed Gas Plasma Shaping

Figure 5A:
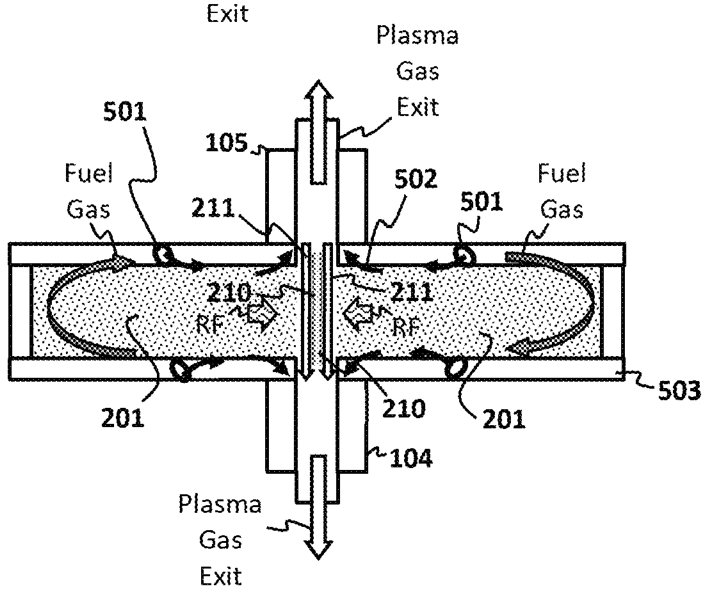
FIG. 5A illustrates a Z-pinch plasma system with angled nozzles on the top and bottom of the atmospheric isolation device to resolve plasma instabilities according to aspects of the present disclosure.

One solution to the discovered plasma instability was to further increase the gas pressure, but this results in suboptimal plasma conditions for a given desired reaction. Fortunately, a better solution for the plasma instability has been discovered. According to aspects of the present disclosure, the discovered plasma instability may be addressed by shaping the gas flow in the atmospheric isolation device to direct the plasma into a single column. One implementation of this solution is shown in FIG. 5A. Here, angled gas inlets 501 are located in the top and bottom of the atmospheric isolation device 503. The angled gas inlets 501 are configured to deliver a flow of gas 502 radially inward towards the center of the atmospheric isolation device 503 or the location at which the compressed plasma 210 to be generated. The gas flow 502 may prevent the Z-pinch plasma column 210 from splitting into separate weaker columns.

Figure 5B:
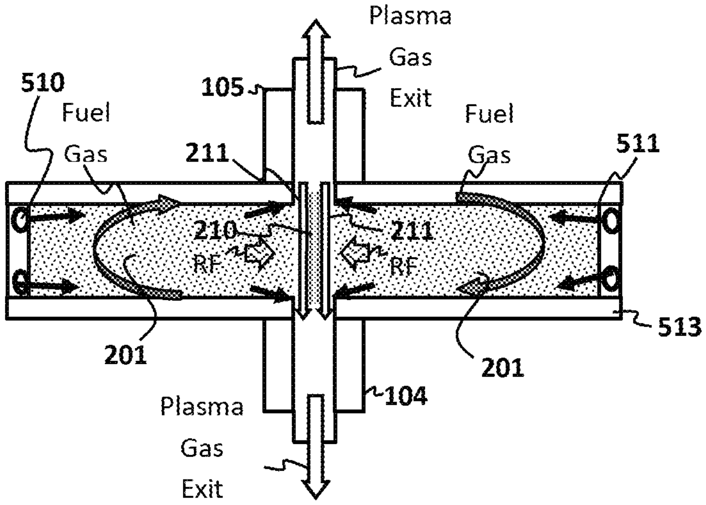
FIG. 5B illustrates a Z-pinch plasma system with angled nozzles on the sides of the atmospheric isolation device to resolve plasma instabilities according to aspects of the present disclosure.

In another implementation shown in FIG. 5B the angled gas inlets 510 may be located on the side of the atmospheric isolation device 513. The angled gas inlets 510 may point directly towards the center or may point slightly downward toward the plasma outlet. The gas introduced through the angled gas inlets may be fuel gas, a carrier gas, one or more downstream reagents, or any combination thereof. The carrier gas may be neutral gas. The angled inlets may be connected to a reservoir of gas under pressure and the gas flow rate may be controlled by a pressure regulator or control valve. Alternatively, gas flow may be regulated in part by controlling the rate at which gases are removed from the atmospheric isolation device via a suitable pump. Alternatively, a pump may be used to pump gasses into the atmosphere isolation device through the angled inlets. In some implementations the flow of the angled gas inlets may be directed by pipe structures which extend into the atmospheric isolation device allowing the gas stream from the angled inlets to be shaped and directed. In other implementations, the flow of angled gas may be injected through orifices in the wall of the atmospheric isolation device. Optionally, the gas nozzles can be shaped as de Laval expanding supersonic jet nozzles increasing the velocity of the gas flow and increasing the vortex velocity.

While FIGS. 5A and 5B depict four angle gas inlets, it should be understood that aspects of the present disclosure are not so limited and there may be any number of angled gas inlets arranged around the Z-Pinch Plasma Column region. For example, in FIG. 5A it is not shown, but there may be three or four gas inlets arranged radially around the Z-Pinch plasma column on the top and bottom walls of the atmospheric containment device. Additionally, while in the implementation shown in FIG. 5A angled gas inlets are located on the top and bottom of the atmospheric isolation device aspects of the present disclosure are not so limited and angled gas inlets may be located on a single side (e.g. on the top or on the bottom) or on any number of sides to eliminate or reduce plasma instability with a desired gas flow rate. Nozzle shapes including Laval nozzle, or simple orifice nozzles, or penetrating tube structures may be used to entrain local present gas, boost velocity, and boost local mass flow of gas at nozzle entrances. In some embodiments, Flow rates of 2-20 standard liters per minute (slpm) per kPa may provide sufficient stabilizing flow. As used herein, “standard liter” refers to a liter of gas at standard pressure and temperature, e.g., 273 Kelvin and 1 bar (100 kPa). In other embodiments, such as using Laval nozzle shapes, flow rates of 0.1-10 slpm per kPa delivered at 20-500 kPa differential pressure above ambient may provide sufficient stabilizing flow. In yet other embodiments, flow rates of 0.05-5 slpm per kPa delivered at 200 kPa-2000 kPa differential pressure may provide sufficient stabilizing flow velocity.

RF Field Shaping

Experimentation with Z-Pinch Plasma systems of the type described herein has revealed that it is highly desirable for the electric field in the RF wave to be aligned with the Z-pinch plasma column in order to drive current axially along the column. Another desirable feature is for the RF wave to be uniformly in phase around the plasma column, i.e., for the RF distributor and RF applicator(s) to produce an RF mode characterized by axisymmetric RF phase in the region of the Z-pinch plasma column. Such RF delivery and phased field shaping can be accomplished in many ways, such as by direct delivery of TE waves perpendicular to the axis of the Z-Pinch plasma column, or by inclusion of resonant structures or lensing features to convert RF energy into a TE or TEM mode wave.

According to certain aspects of the present disclosure the RF applicator and distributor may be configured to deliver RF energy with an axisymmetric phase to the Z-Pinch column region. Furthermore, it has been discovered that at certain gas pressures and RF field intensities plasma densification and contraction may occur in the Z-pinch region without the use of a DC electrical field, such as by way of non-limiting example, in a hydrogen plasma with a pressure of 0.5 kPa, and a power density of 18 $MW/m^3$, the plasma diameter will form approximately as the RF wavelength/4; increasing pressure from 0.5 kPa to 2 kPa, the plasma column will contract and become independent from RF wavelength; at 2 kPa as the field strength is increased from roughly 30 kV/m to greater than 38 kV/m, the plasma diameter will contract from 12 mm to 10 mm as pressure is increased from 0.5 kPa.

Figure 6A:
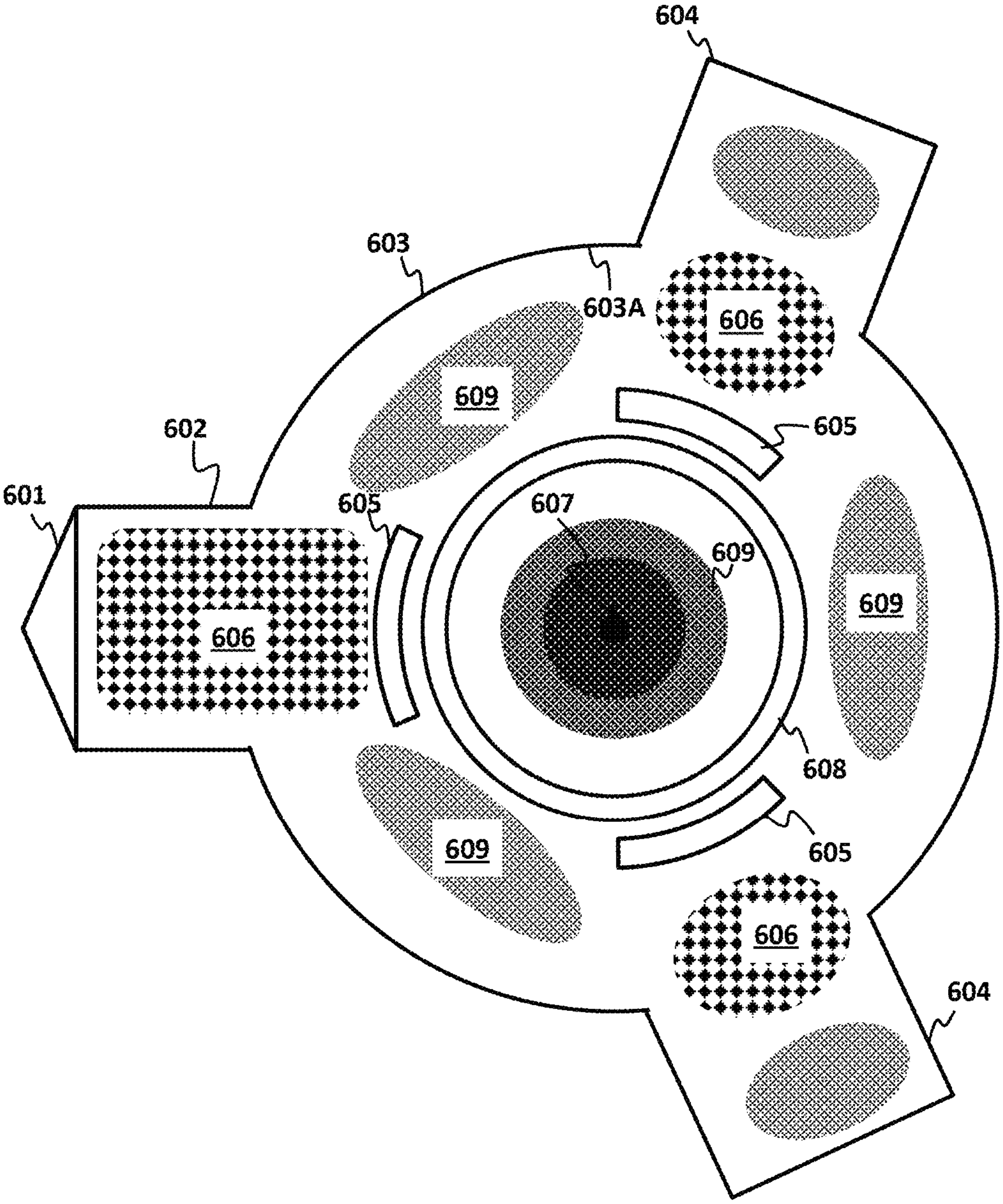
FIG. 6A depicts the RF distributor with a single RF generator and RF applicator according to aspects of the present disclosure.
Figure 6B:
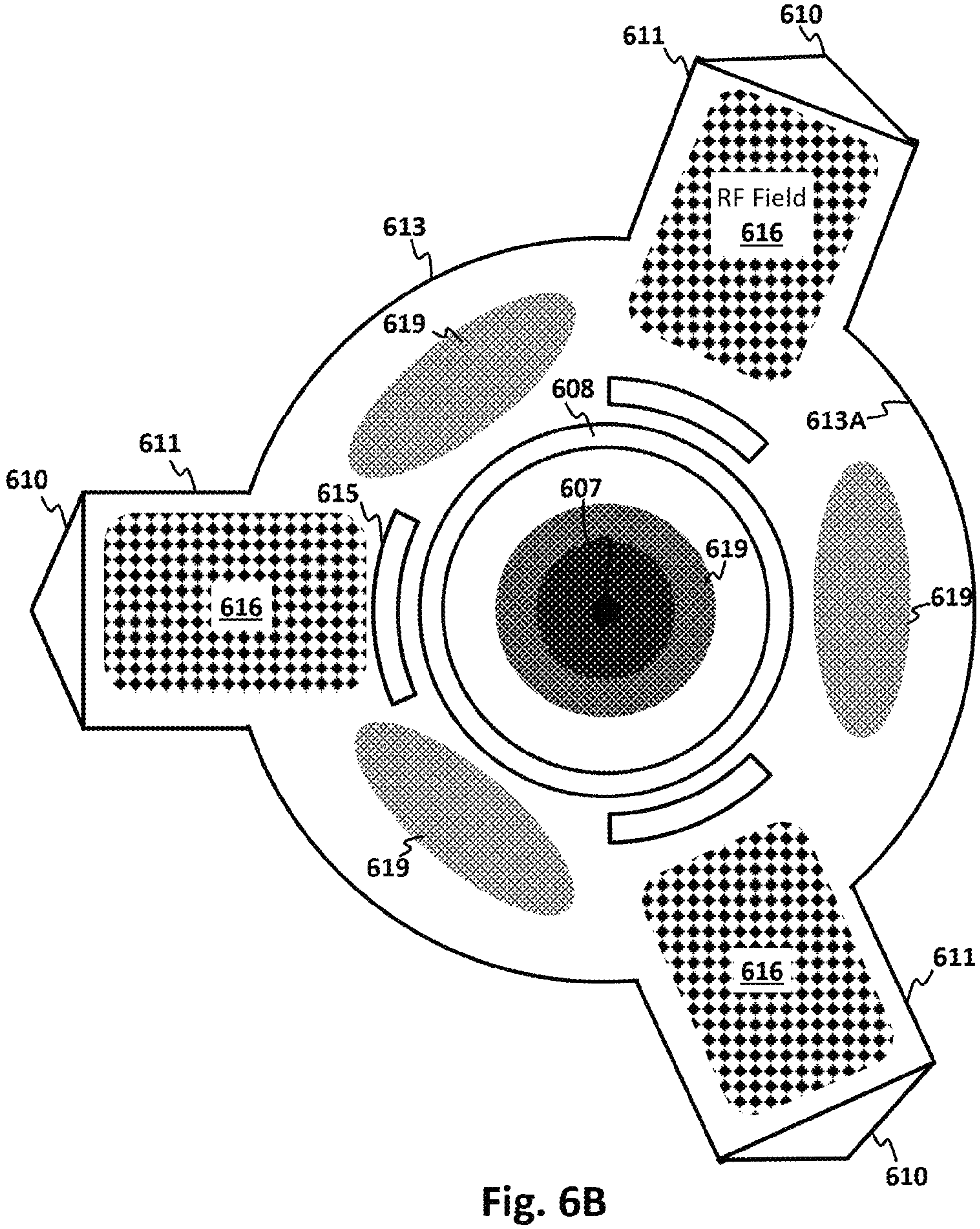
FIG. 6B depicts the RF distributor with multiple RF generator and RF applicator according to aspects of the present disclosure.

FIG. 6A and FIG. 6B depict different implementations of wave shaping of the RF field according to aspects of the present disclosure. FIG. 6A depicts wave shaping with a single RF generator and RF Tuner 601 according to an aspect of the present disclosure. It is noted that the RF generator and RF tuner are depicted as a single unit and, for simplicity, are referred to as the RF generator.

In the implementation shown in FIG. 6A, a single RF generator 601 is coupled to an RF applicator 602 which directs RF energy from the RF generator 601 via a specially-configured RF distributor 603 to the Z-pinch plasma column region 607 within the atmospheric isolation device 608. Here the RF applicator 602 is configured to direct RF energy through an RF-reflective cylindrical outer wall 603A of the RF distributor 603. The RF applicator may be a simple square, conical, cylindrical, or bell-shaped structure, e.g., a waveguide, made of a material that is reflective to RF energy and thus directs the RF energy 606 toward the Z-pinch plasma column region 607 centered on the axis of cylindrical outer wall 603A of the RF distributor. The RF distributor 603 is configured to shape the RF field 606 ensuring that the field is distributed such that it exhibits a cylindrically axisymmetric phase in the Z-pinch plasma column region 607.

Additionally, in this implementation the RF distributor 603 includes two resonant cavity mode shaping structures 604 are coupled to the RF distributor 603 azimuthally around wall of the RF distributor in an axisymmetric fashion with respect to axis of the Z-pinch column region 607. The outer wall 603A and resonant cavity mode shaping structures 604 form an outer waveguide structure. In the illustrated implementation, the resonant cavity waveguide structures 604 and RF applicator 602 are located at 120-degree angle intervals around the axis of the Z-pinch plasma column region 607. The resonant cavity waveguide structures 604 serve to reflect and concentrate the RF field 606 emitted by the RF generator 601 in the Z-pinch plasma column region 607 allowing the use of a single RF generator 601. The resonant cavity waveguide structures 604 may also include tuning stubs to correct any phase issues that may arise due to reflections of the RF field. The RF applicator 602 and RF distributor 603 are arranged and configured such that the RF created by the RF generator 601 is at its highest field intensity at the center of the Z-pinch column region 607. In some alternative implementations multiple RF generators may be coupled together at the same RF applicator. In such a case, an RF generator controller may apply appropriate phase offsets to the one or more of the multiple RF generators to ensure that the RF energy that is provided through the applicator is in phase. In another alternative implementation, a common RF signal may be fed to multiple RF generators, consisting of an RF amplifier and tuner, in order to create in phase RF waves. While this implementation shows two resonant cavity wave shaping structures there may be any number resonant cavity wave shaping structures sufficient to achieve the desired RF field wave distribution.

The RF distributor 603 may further include wave shaping structures such as arcuate inner walls 605 which change the distribution of RF field in the Z-pinch plasma column region 607. In the example shown in FIG. 6A, the inner walls 605 act to block RF fields 606 that are 180 degrees out of phase with RF fields 609 in the gaps between the walls. This prevents the out-of-phase RF fields 606 from cancelling the fields 609 in the Z-pinch plasma column region 607. In FIG. 6A, the different phases of the RF fields 606, 609 are indicated by different shading. In the implementation shown in FIG. 6A, the walls 605 are located opposite the RF applicator 602 and resonant cavities 604. Each wall covers an arc of approximately 60 degrees with gaps of approximately 60 degrees of arc between adjacent walls.

In alternative implementations, other possible wave-shaping structures may be used instead of the arcuate walls 605. Examples of such other wave-shaping structures include, but are not limited to, flat reflector structures, connected resonant cavities, tuned length waveguides, tuning stubs, which may be motorized, protruding into a cavity. Magnetic fields and/or dielectric lenses can also be used.

FIG. 6B shows another implementation of RF generator, RF applicator and RF distributor according to aspects of the present disclosure. In this implementation three separate RF generators 610 are used to generate the RF energy. The RF generators 610 may be coordinated by a single system controller or two or more separate system controllers which may be coordinated to control the RF Generators 610 in phase to ensure that they emit RF energy 616 in the correct phase orientation. Each of the RF generators 610 is coupled to an RF applicator 611 which directs RF energy 616 from the RF generators 610 into the RF distributor 613. The RF distributor includes an outer wall 613A and wave shaping structures such as inner walls 615 that act to block RF fields 616 that are 180 degrees out of phase with RF fields 619 in the gaps between the walls. This prevents the out-of-phase RF fields 616 from cancelling the fields 619 in the Z-pinch plasma column region 607. In FIG. 6B, as in FIG. 6A, the different phases of the RF fields 616, 619 are indicated by different shading. The darker shading around the Z-pinch plasma column region indicates a greater electric field intensity.

In some alternative implementations each RF generator 610 and RF applicator 611 may each be coupled to a separate RF distributor. For example, each RF generator and RF applicator may be offset vertically from each other such that they are on separate horizontal planes and as such each RF generator and RF applicator has a separate RF distributor for the horizontal plane. While the present disclosure shows three RF generators with corresponding RF applicators arranged azimuthally around the RF distributor in 120-degree intervals, aspects of the present disclosure are not so limited and the RF generators with corresponding RF applicators may be arranged in any orientation around the RF distributor. For example and without limitation, the RF generators with corresponding RF applicators may be arranged in one or more rows vertically, on the RF distributor along the Z-pinch axis or alternatively may be arranged in one or more rows vertically along the Z-pinch Axis with each RF generator and RF applicator having its own separate RF distributor. It is noted that if more resonators and/or applicators are used the number of walls and gaps and their respective locations and sizes would change depending on the resulting mode shape for the RF fields resulting from the number and configuration of the RF applicators and/or resonators.

The RF distributor 603, 613 may be integrated into the atmosphere isolation device and may include wave shaping structures which extend into peripheral regions of the atmospheric isolation device where the flow of gasses in the Z-pinch plasma column region of the atmospheric isolation device is less affected. Alternatively, the wave shaping structures may also be configured to shape the flow of gasses in the atmospheric isolation device. The RF distributor may be made from a material that is reflective to the RF energy or may be coated with a material that is reflective to the RF energy. For example and without limitation, the RF distributor and/or RF applicator may be made from or coated with an RF reflective material, e.g., a metal such as aluminum, copper, silver, steel, tungsten, molybdenum, etc. If coated with such an RF reflective material, the structure may be made of a ceramic, composite, or a plastic composition. In some embodiments, the RF distributor may be cooled by way of natural or forced convection of a fluid such as air, water, or supercritical carbon dioxide, to absorb waste heat. Alternatively, the RF distributor 603, 613 may be outside the atmospheric isolation device 608 and either attached to atmospheric isolation device 608 or located close enough to the atmospheric isolation device that the RF energy is directed into the atmospheric isolation device. In this case the atmospheric isolation device may be made from a material that is transparent to the RF energy, such as glass, quartz or ceramic, polymer, E-Glass composite, or diamond. In some implementations there may be two or more RF distributors. For example and without limitation, in implementations with multiple RF generators with corresponding RF applicators, each RF generator and RF applicator may be coupled to a separate RF distributor. In some implementations, each RF generator may produce RF energy of a different RF frequency so that multiple frequencies of RF energy may be provided to the RF applicator. For example, the two or more RF distributors can include one or more waveguide entries arranged in a mirrored linear pair, triangle, square, pentagon, hexagon, septagon, octagon, or higher order polygon geometry.

Secondary Electrodes

Figure 7:
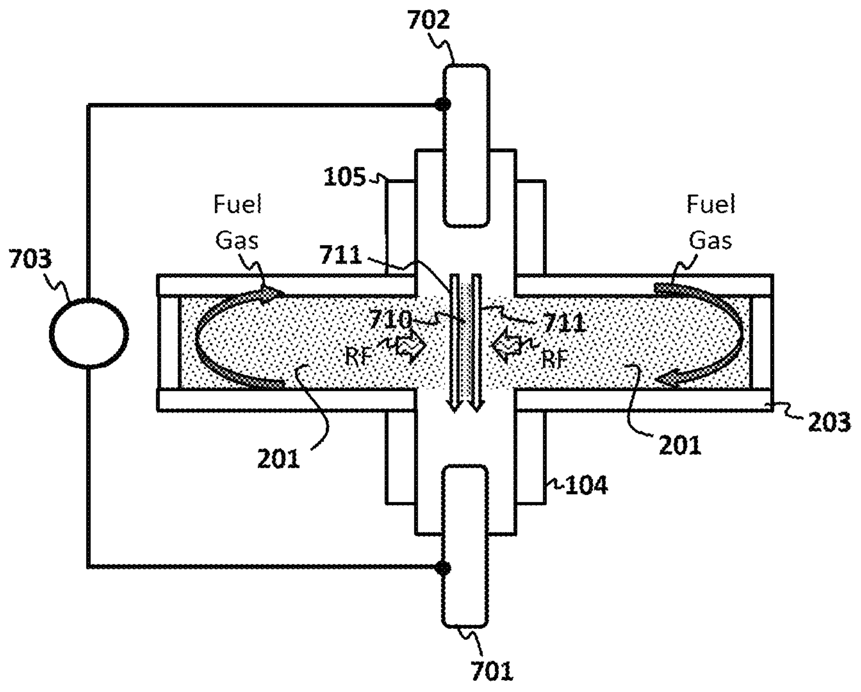
FIG. 7 illustrates a Z-pinch plasma system with secondary electrodes according to aspects of the present disclosure.

According to certain aspects of the present disclosure, additional electrical energy may be added to the Z-Pinch plasma column with one or more secondary electrodes. As shown in FIG. 7 two secondary electrodes 701, 702 are located in the output path of the compressed plasma. These two secondary electrodes 701, 702 are electrically connected to an electrical energy source 703 which may be configured to supply either low frequency alternating current (AC) or direct current (DC). The two secondary electrodes 701, 702 may be configured to supply electrical energy via an electric field 711 having a significant component parallel to the Z-Pinch plasma column 710. By way of example and without limitation, a secondary cathode 701 may be located in the outlet path of the primary hollow cathode 104 and a secondary anode 702 may be located in the outlet path of the primary hollow anode 105 of the Z-Pinch device. Thus, the electric field 711 between the secondary anode 702 and the secondary cathode 701 may drive electrical current through the plasma 710 to the secondary cathode 701. It should be understood that in some implementations, the primary hollow electrodes may be omitted as RF energy may be sufficient to generate a Z-Pinch. In such implementations the secondary electrodes may still be used to provide electrical energy across the Z-Pinch plasma column region. In some implementations there may be a single secondary electrode in which case the circuit for the secondary electrode may be completed through a primary hollow electrode. For example and without limitation, in implementation with a single secondary electrode and a reaction chamber, the secondary electrode may be a secondary anode outside the atmospheric isolation device in the gas path of the hollow primary anode and gas inlet to the atmospheric isolation device the hollow primary cathode may also be the cathode for secondary anode. In some implementations, no physical electrical connection between the primary and secondary electrodes is made, and in operation the plasma forms an electrical connection between the primary and secondary electrodes. In some cases, the primary hollow cathode 104 and the primary hollow anode 105 are connected to a primary power supply (e.g., pulse power supply 103 in FIG. 1A) that is separate from the energy source 703 connected to the two secondary electrodes 701, 702. The primary and secondary power supplies may operate under the direction of a controller, such as the controller 101 in FIG. 1A.

In one example implementation, a stable fusion reaction may be achieved with a 32 kilovolt (kV) DC pulse applied for 6-10 microseconds (μsec) at the primary anodes to a deuterium plasma at 4 kilopascals of pressure. Simultaneously 24 kilowatts (kW) of RF power at 2.45 GHz is applied to the deuterium plasma. The DC current is ramped up from 100 kiloamperes (kA) at the 1 μsec mark after the DC pulse starts to 600 kA at the 6 μsec during the DC pulse. A pulse rep rate may be as high as 10 times the pulse duration. Other frequency ranges for RF wave could include 6.78 MHz, 13.56 MHz, 27.12 MHz, 40.68 MHz, 433.92 MHz, 915 MHz, 2.45 GHz, 5.8 GHz, 24.125 GHz, 61.25 GHz, 122.5 GHz, 245 GHz. The frequency range affects the design of the distributor and/or applicator. Generally, below a frequency of 350 MHz an anode-cathode applicator is more practical and above about 350 MHz a waveguide-type applicator is more practical. Those skilled in the art will further recognize that the geometry and dimensions of a waveguide-type applicator may depend on the frequency range. Typically, the higher the RF frequency the smaller the waveguide dimensions.

There are a number of different possible configurations for the anode, cathode, and secondary electrode(s). By way of example, there may be one central electrode and two or more opposite polarity electrodes located in cylindrical symmetry about a central axis of the central electrode. In such an implementation, the central electrode and the two or more opposite polarity electrodes may all extend parallel from a wall structure of the atmospheric isolation device 109.

In an alternative implementation, there may be one central electrode and two or more opposite polarity electrodes located in cylindrical symmetry about a central axis of the central electrode. In such an implementation, the central electrode and the two or more opposite polarity electrodes may all extend parallel from opposite wall structures of the atmospheric isolation device 109.

In another alternative implementation there may be one central electrode and two or more opposite polarity electrodes may be located in cylindrical symmetry about a central axis of the central electrode with the opposite polarity electrodes extending in a radial direction perpendicular to or angled up or down relative to the central electrode.

In yet another alternative implementation, there may be one or more concentric hollow cathode and anode structures located at opposite ends of the Z-Pinch plasma column region, e.g., RF concentration zone 110. In some such implementations, the Z-Pinch drive device may be coupled to a cathode and an anode configured to drive the electric current through the Z-pinch plasma column. Furthermore, the system may further include a secondary anode and/or cathode located on the axis of the Z-Pinch plasma column region either protruding from, coplanar with, or withdrawn from a surface of the one or more concentric hollow cathode and anode structures.

Additional System Configurations

Aspects of the present disclosure include a number of variations on the system configurations discussed hereinabove. FIGS. 8A-8F, FIGS. 9A-9G, and FIGS. 10A-10B depict a few such variations.

Figure 8A:
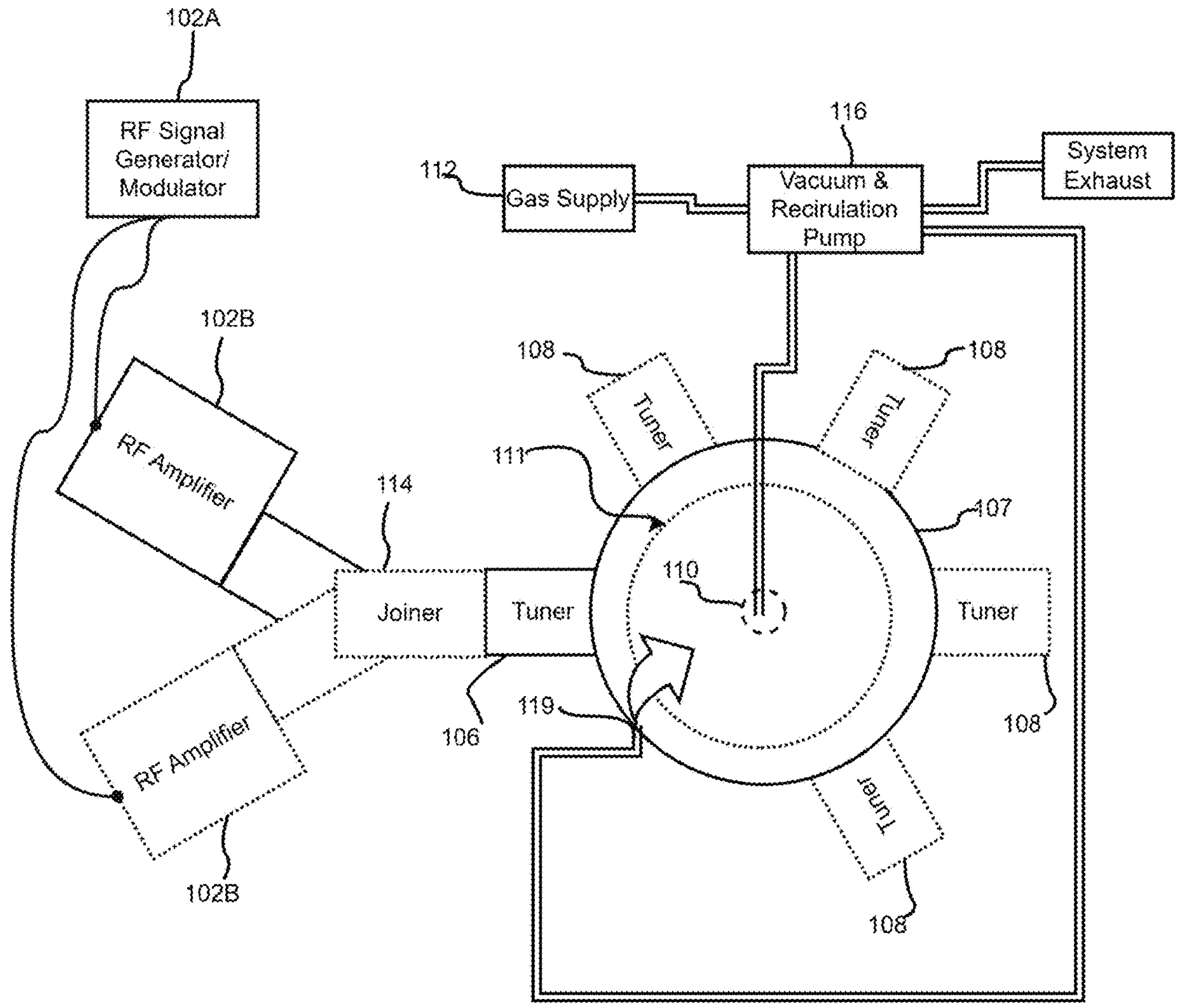
FIG. 8A is a top view schematic diagram depicting an alternative stabilized Z-pinch plasma system having an asymmetric configuration of RF amplifiers and tuners according to aspects of the present disclosure.

FIG. 8A depicts an example of a system configuration in which an RF signal generator 102A is coupled to an RF amplifier 102B, which directs TE01 RF waves into a tuner 106 and an RF applicator 107 in the form of a cylindrical RF cavity configured to produce an RF concentration zone 110 proximate a cylinder axis of the RF cavity. One or more additional RF amplifiers may deliver power to a joiner 114 before the tuner 106. An environmental separation window 111 in the form of a dielectric cylinder coaxial to the cylinder axis is located within the RF cavity. A distributor 108 in the form of additional tuners distributed azimuthally about the cylinder axis may be coupled to the RF cavity (applicator 107) to allow for adjustment of the RF intensity distribution in the RF concentration zone 110. A gas supply, pump, and system exhaust provide gas to a vortex injector 119 within the environmental separation window, and the gas is removed through an exhaust port within the boundary of the RF concentration zone 110. In this example, a gas supply 112 is coupled to a combined vacuum and recirculation pump 116 that performs the functions of the vacuum pump 115 and recirculation pump 117 discussed above with respect to FIG. 1A. The vacuum and recirculation pump 116 may be coupled to a system exhaust that removes excess gases from the system.

Figure 8B:
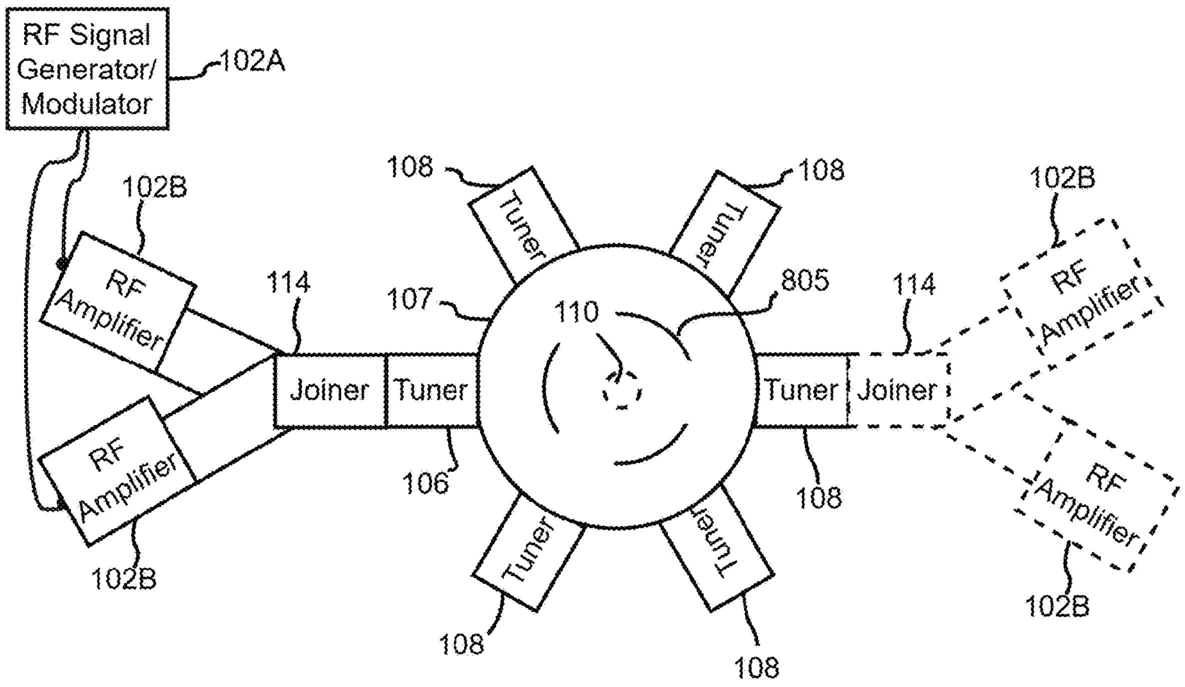
FIG. 8B is a top view schematic diagram depicting an alternative stabilized Z-pinch plasma system having an asymmetric configuration of RF amplifiers and tuners according to aspects of the present disclosure.

FIG. 8B depicts an example of a system configuration similar to that shown in FIG. 8A, but with RF reflectors 805 located within the RF applicator 107. The RF reflectors may be configured to block out-of-phase RF radiation from the concentration zone 110. The RF reflectors 805 may be configured as arcuate walls disposed around a Z-pinch plasma region in a manner similar to the inner walls 605 discussed above with respect to FIG. 6A. The system may optionally be configured for RF injection from two or more points on the RF applicator. By way of example, there may be RF generators or amplifiers 102 coupled to tuners 106 on opposite sides of the applicator 107. Each of the tuners may be coupled to two or more RF generators by a joiner. Additional tuners may shape the RF field distribution in the concentration zone 110. In some implementations, RF amplifiers may be coupled to each of the additional tuners.

Figure 8C:
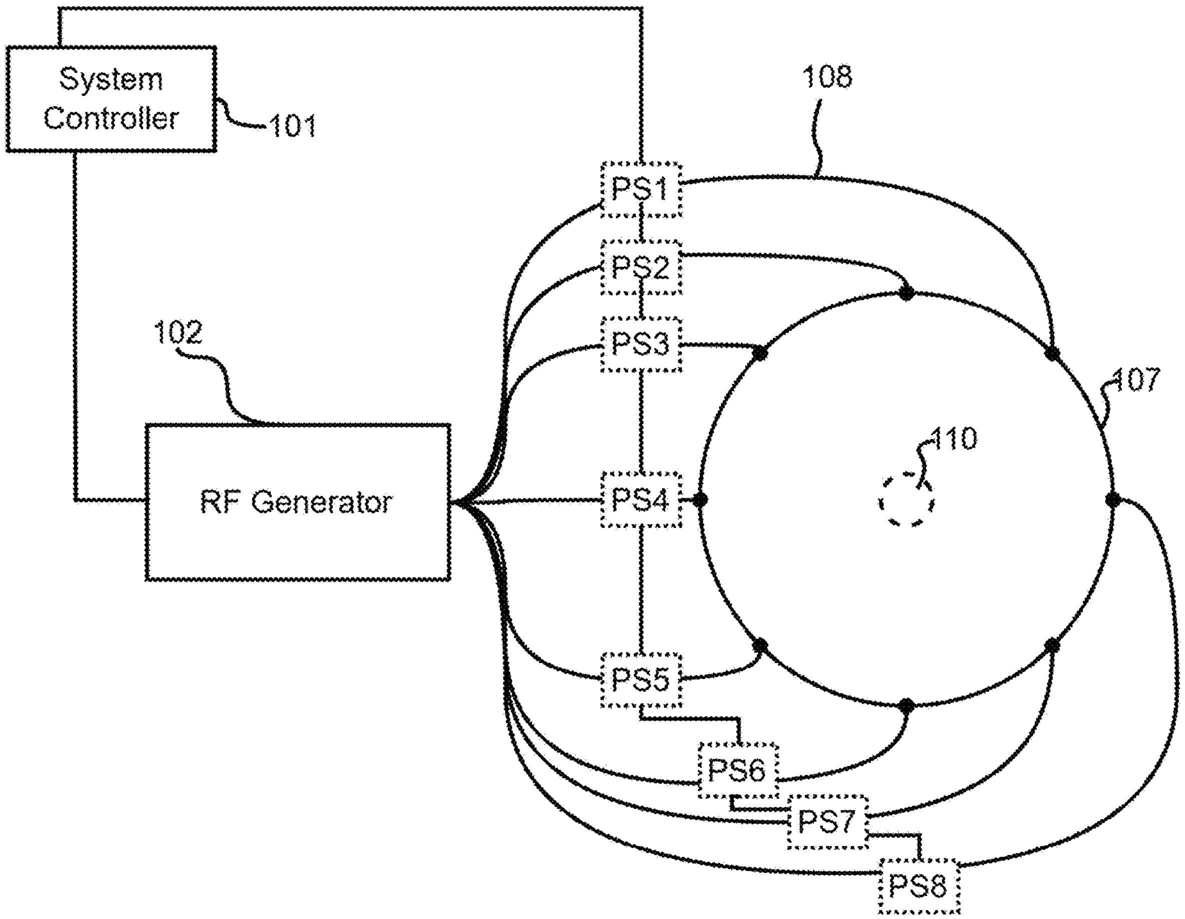
FIG. 8C is a top view schematic diagram depicting an alternative stabilized Z-pinch plasma system having a single RF amplifier and a symmetric configuration of application of RF energy according to aspects of the present disclosure.

FIG. 8C depicts an example of an alternative system configuration in which a distributor 108 in the form of plurality of coaxial, strip line, or other type waveguides deliver RF power from a single RF generator 102 to an applicator 107 in a cylindrically symmetric fashion. By way of example, if the waveguides are coaxial cables, the center conductor of each cable may project into an applicator in the form of a cylindrical or spherical metal chamber via insulated feed-thrus. The portion of each center conductor that projects into the chamber acts as an antenna inside the chamber. The metal chamber acts as part of the applicator by containing the RF power delivered by the antennae within the chamber and concentrating it in the concentration zone 110. Some implementations may include tuners coupled to each coaxial cable between the generator and the applicator for impedance matching. Optionally, one or more RF amplifiers may be individually connected to RF cavity entry points, and connected to and controlled by a phased array controller to create patterned delivery of RF to the central axis. As used herein, the term "phased array" generally refers to a RF transmitting system having a one-, two- or three-dimensional array of multiple antennae, a transmitter and a plurality of corresponding phase shifters that operate under control of a computer. A common RF signal from the transmitter passes through one of the phase shifters and/or amplifiers before being transmitted by the corresponding antenna. The computer adjusts the amount of phase shift and/or amplification between signals transmitted by adjacent antennae to shape the beam collectively transmitted by the antenna array. An applicator 107 configured to operate as a phased array is sometimes referred to herein as a phased array applicator. As an example, the system shown in FIG. 8C may optionally include phase shifters PS1, PS2, PS3, PS4, PS5, PS6, PS7, PS8 coupled between corresponding antennae on the applicator 107 and the RF generator 102. Suitably configured computer hardware or software implemented in the system controller 101 may control the amount of relative phase shift applied by each phase shifter. In implementations where separate amplifiers are associated with each phase shifter, the controller 101 may also control the amount of amplification by each amplifier. The phase shifts may be controlled in such a way as to adjust the static or time dependent location and density profile of the plasma.

Figure 8D:
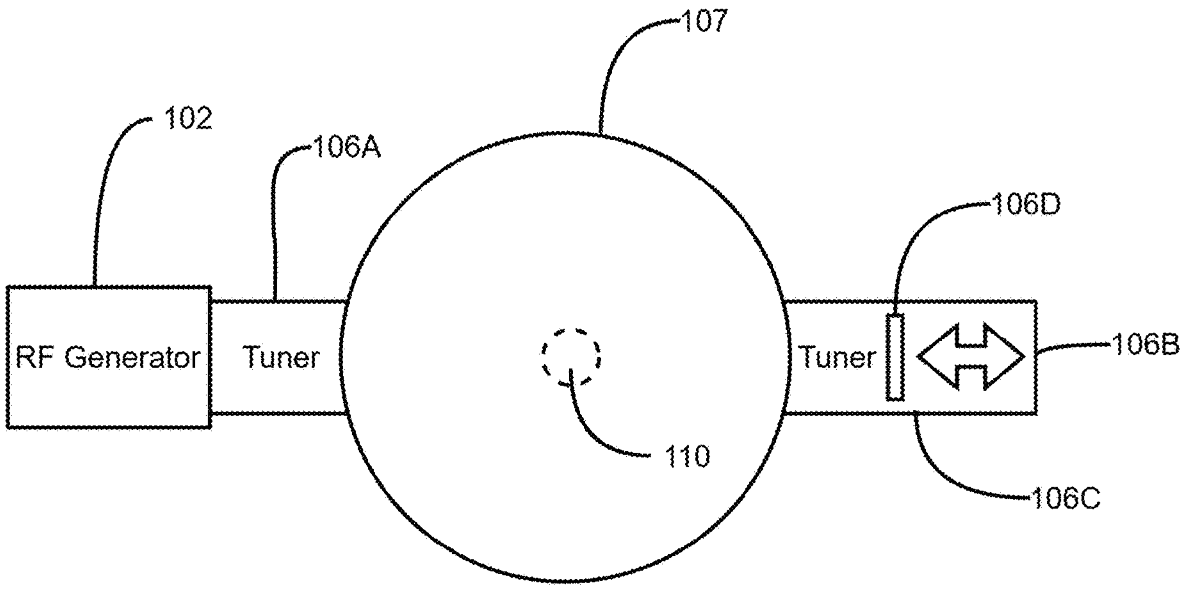
FIG. 8D is a top view schematic diagram depicting an alternative stabilized Z-pinch plasma system having a symmetric configuration with an RF amplifier and an inline tuner and a reflection tuner according to aspects of the present disclosure.
Figure 8E:
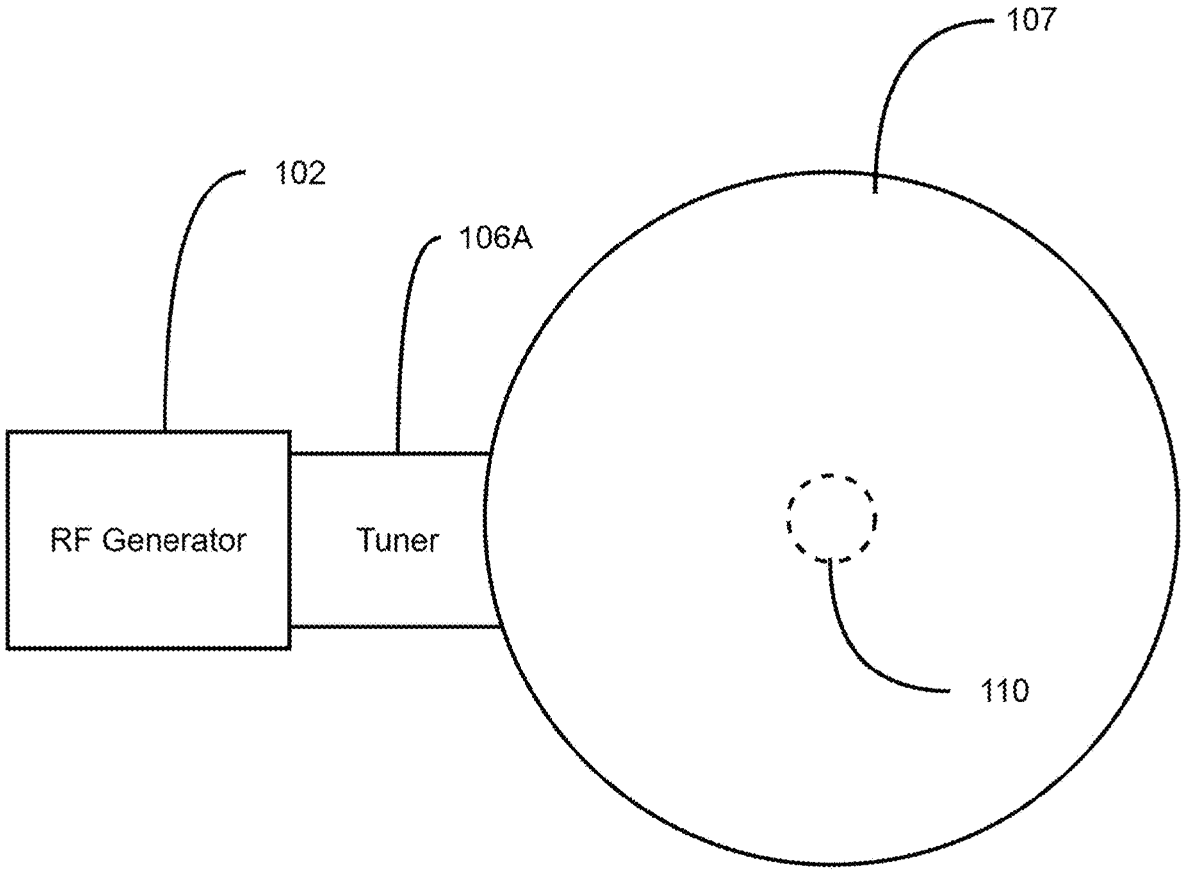
FIG. 8E is a top view schematic diagram depicting an alternative stabilized Z-pinch plasma system having an asymmetric configuration with an RF amplifier and an inline tuner according to aspects of the present disclosure.

Aspects of the present disclosure include implementations in which the functions of the distributor 108 and applicator 107 overlap to some degree in different structures. For example, FIG. 8D depicts an example system configuration with one RF generator and one inline tuner 106A and one reflection tuner 106B. The reflection tuner may include an RF cavity 106C made of electrically conductive material and a moveable back wall 106D that can translate along an axis of the cavity 106C. The inline tuner 106A and reflection tuner 106B are coupled to a chamber, which acts as the applicator 107. The tuners 106A, 106B and chamber may act together as a distributor to provide RF power to one or more entry points on the chamber and deliver RF energy to the RF concentration zone 110 in the chamber. In an alternative implementation shown in FIG. 8E, a single RF generator and inline tuner 106A are coupled to a chamber. The chamber acts mainly as the applicator 107 but may also act partly as the distributor in conjunction with the inline tuner.

There are a number of different configurations for the tuners 106A, 106B. For example, inline tuners and or reflection tuners may be configured as volumetric tuners each having one or more variable volume TE mode resonators including a movable wall coupled to a linear motion device. The moveable walls may be actuated by corresponding motorized linear motion devices. A controller may be configured to determine a motion of each linear motion device during tuning. Alternatively, one or more variable volume transverse electromagnetic (TEM) resonators, or transverse magnetic (TM) resonators may be used.

Figure 8F:
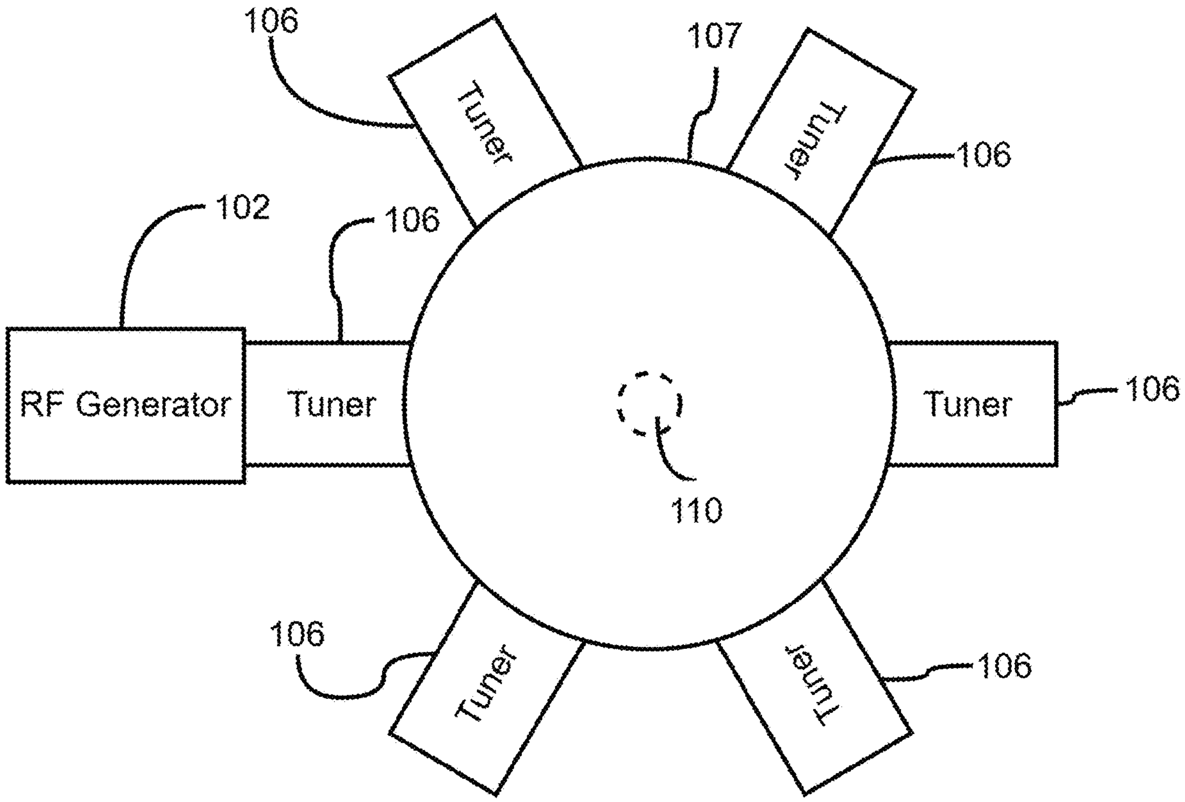
FIG. 8F is a top view schematic diagram depicting an alternative stabilized Z-pinch plasma system having a symmetric configuration with an RF amplifier and multiple reflection tuners according to aspects of the present disclosure.

FIG. 8F illustrates an example of a system configuration with an RF power supply 102 and multiple tunable resonators 106 arranged with cylindrical symmetry around a chamber. Each tunable resonator may have a resonant cavity with a back wall that can move to change the resonant frequency of the resonant cavity, e.g., as shown in FIG. 8D and described above. The combination of tunable resonators and chamber acts partly as the applicator and partly as the distributor.

Figure 9A:
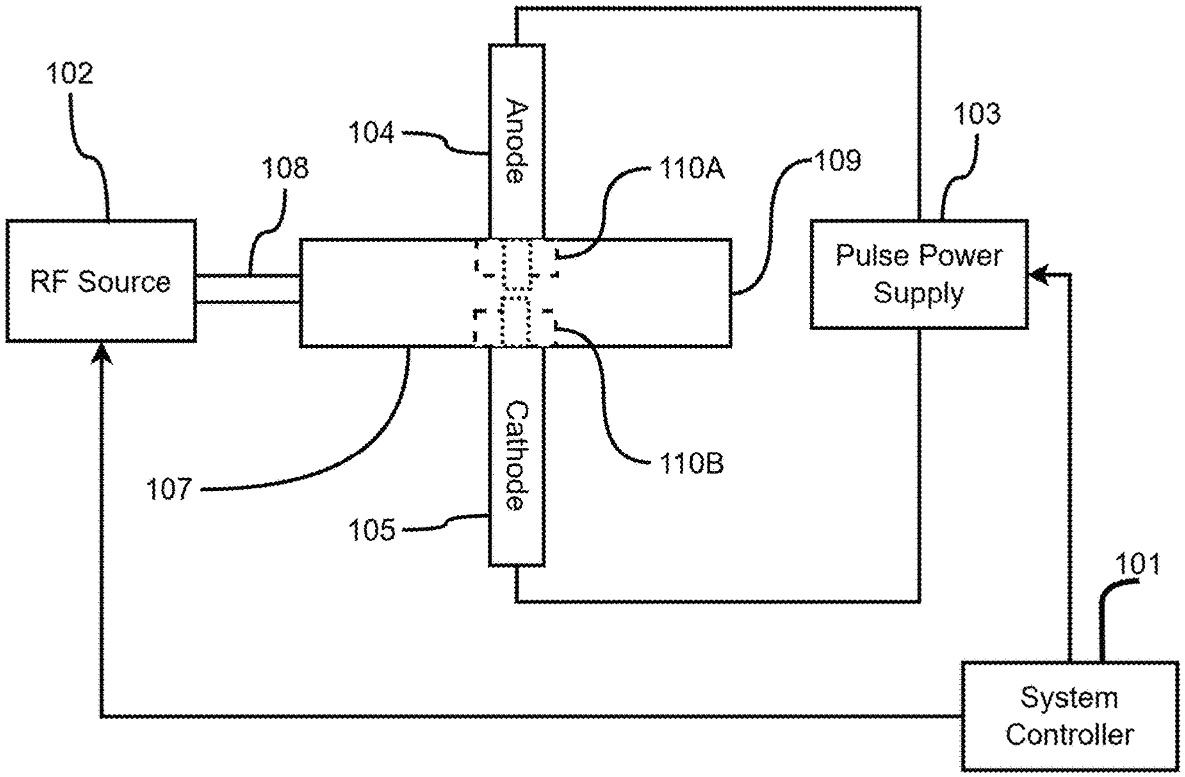
FIGS. 9A-9G are schematic diagrams depicting alternative configurations of stabilized Z-pinch plasma systems that support two or more RF concentration zones according to aspects of the present disclosure.

The above-described drawings generally show a single RF concentration zone 110 within the atmospheric isolation device 109; however, aspects of the present disclosure are not limited to such implementations alone. Alternative system configurations may facilitate two or more concentration zones. By way of example, and not by way of limitation, FIG. 9A depicts an example of an alternative system configuration in which an RF source 102 drives an RF applicator 107 integrated with an atmospheric isolation device 109, e.g., a chamber, directly through a distributor 108 in the form of a waveguide. In this configuration, the RF concentration zone is split into two zones 110A and 110B proximate the anode 104 and cathode 105, respectively. The two zones 110A and 110B may be wider or narrower than anode 104 and cathode 105, respectively. Splitting of the RF concentration zone in this fashion may facilitate splitting the plasma into separate lobes corresponding to the RF concentration zones 110A, 110B. In the illustrated example, the anode and cathode are hollow and may be coupled to an exhaust tube (not shown) so that suction may be pulled from within anode and/or cathode. A pulse power supply 103 is connected to the anode 104 and cathode 105. A system controller 101 coordinates both the RF source 102 and pulse power supply 103. Although in this example the chamber also acts as the applicator and a waveguide acts as the distributor other configurations, such as those discussed above, may be used.

Figure 9B:
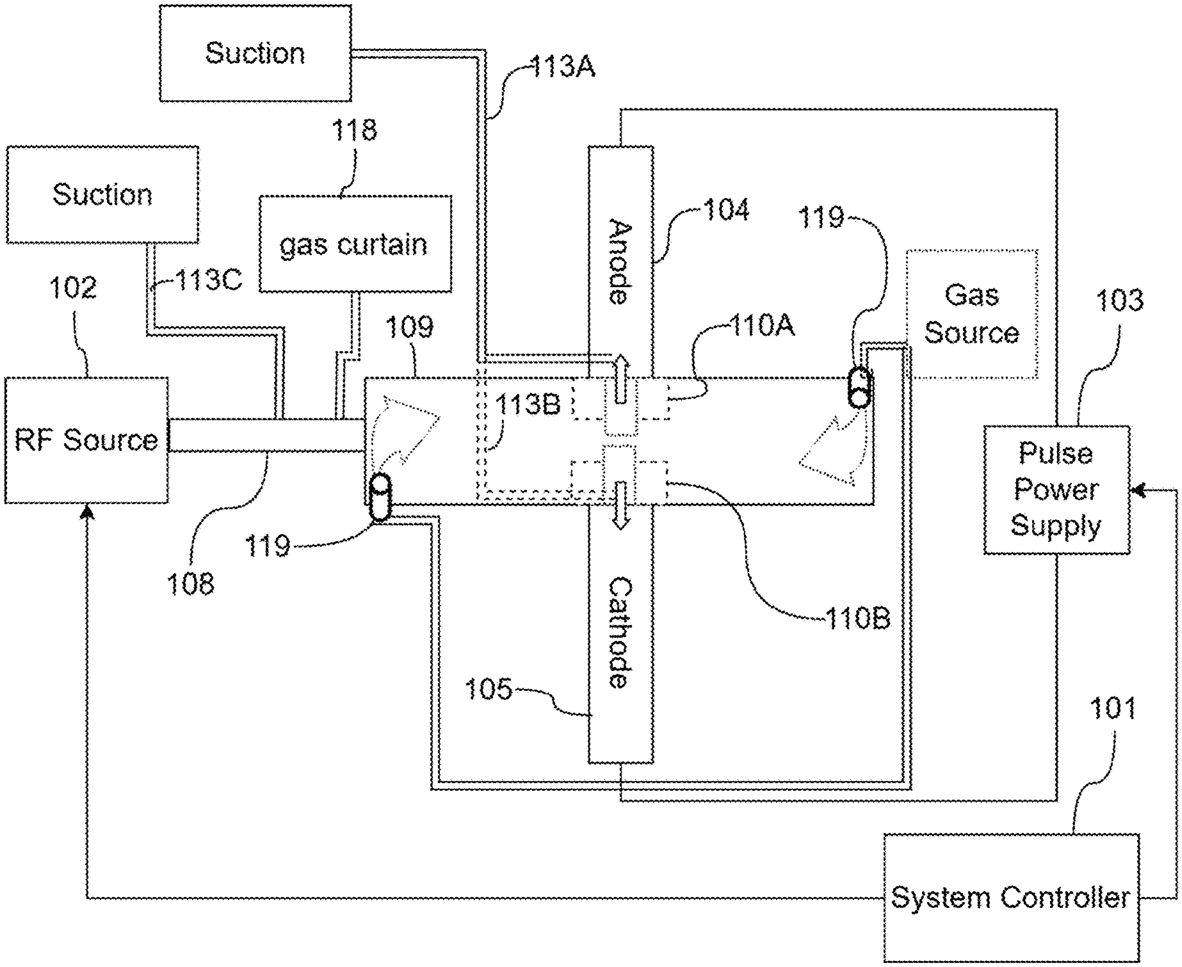

FIG. 9B illustrates a variation on the alternative system configuration shown in FIG. 9A. In this configuration, a gas injector 119 may be configured to drive gas into the chamber 109 in a vortex flow around the anode 104 and cathode 105. In this example, there may be a suction tube 113A coupled to the hollow anode and another suction tube 113B coupled to the hollow cathode. Furthermore, a gas curtain 118 and additional suction tube 113C may be integrated into a waveguide that acts as part of the distributor 108 to control the atmosphere within the atmospheric isolation device 109. Although in this example the chamber also acts as the applicator and a waveguide acts as the distributor other configurations, such as those discussed above, may be used.

Figure 9C:
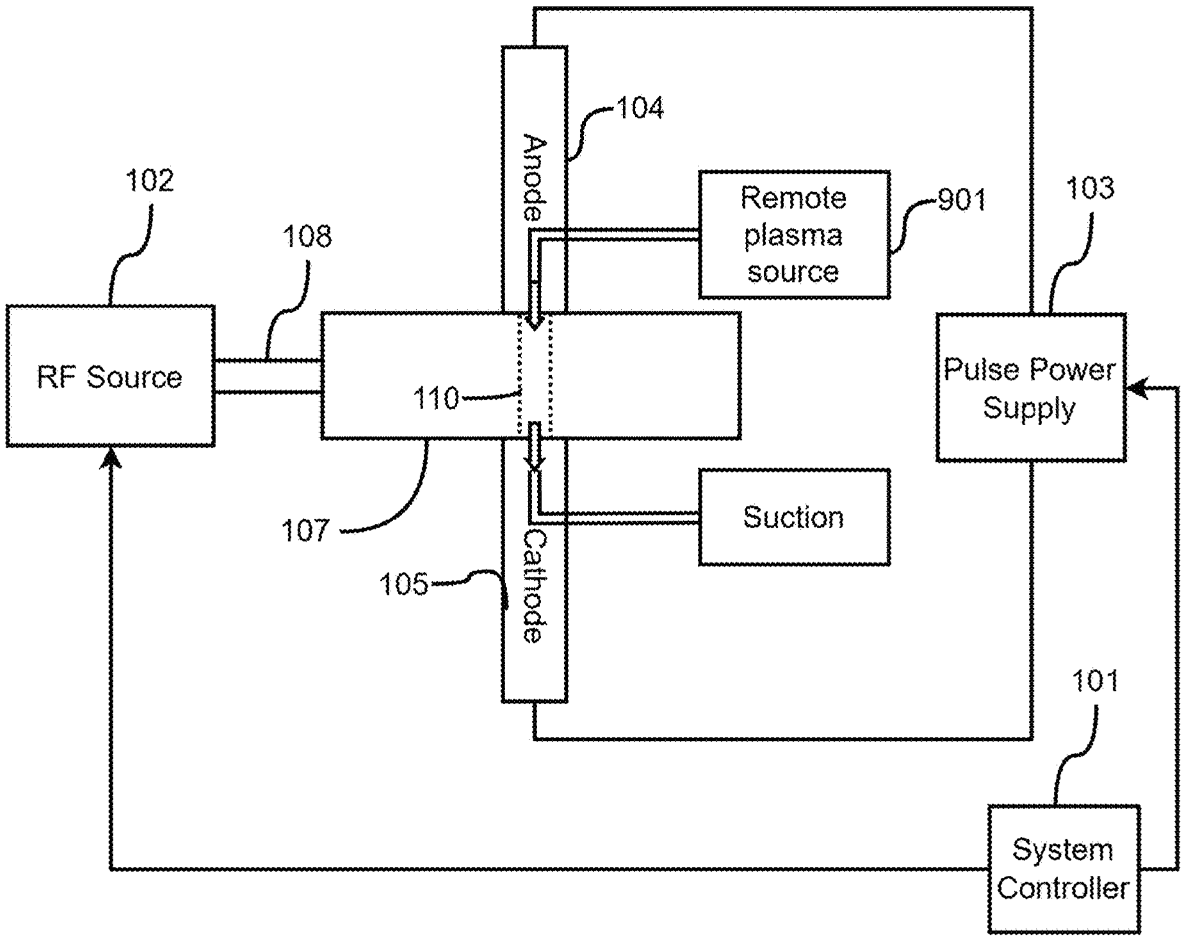

Many of the above configurations are described or implied to use RF power in conjunction with a pulsed electric field to initiate a plasma in the RF concentration zone 110. However, aspects of the present disclosure are not limited to such implementations alone. For example, FIG. 9C illustrates an example of an alternative configuration in which plasma from a remote plasma source 901 drives plasma to enter the atmospheric isolation volume through a hollow electrode, e.g., anode 104 or cathode 105 with suction applied through a suction tube (not shown) coupled to the hollow electrode. RF power from an RF source 102 is coupled via a distributor 108, e.g., a waveguide, to an applicator 107 that may also serve as the atmospheric isolation device. The applicator concentrates RF fields, in particular RF electric fields, in the concentration zone 110 between the anode and cathode. The RF fields in the concentration zone 110 stabilize the plasma introduced through the anode, as discussed above. Voltage pulses from the pulse power supply 103 drive current through the stabilized plasma between the cathode and anode to drive a Z-pinch. Although in this example the chamber also acts as the applicator and a waveguide acts as the distributor other configurations, such as those discussed above, may be used.

Figure 9D:
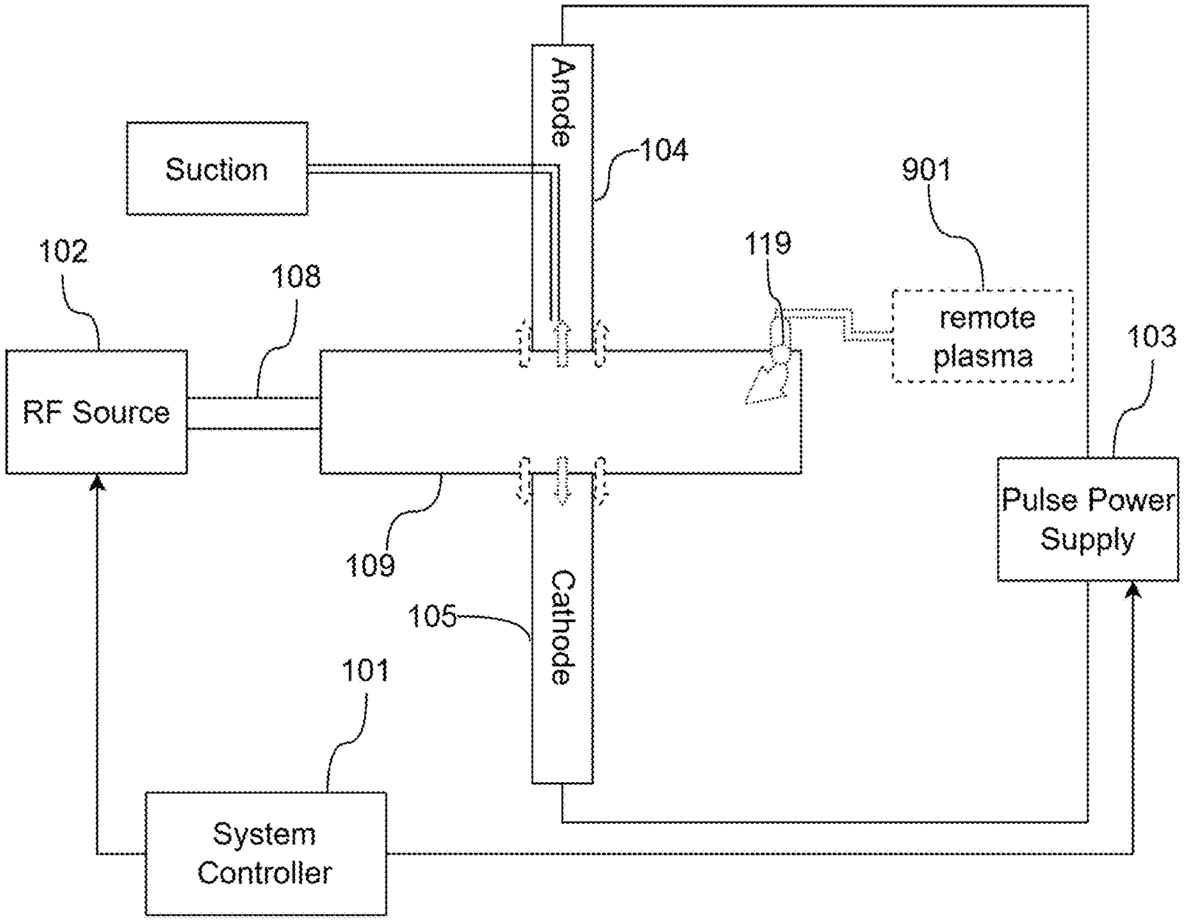

Although many configurations described above involve plasma concentrated in an RF concentration zone 110, aspects of the present disclosure include implementations in which this is not the case. By way of example, and not by way of limitation, FIG. 9D depicts an alternative configuration in which a remote plasma source (not shown) supplies plasma to the atmospheric isolation device 109, e.g., a chamber. The plasma occupies the entire volume of an atmospheric isolation device 109, e.g., a chamber. In this example, RF energy is introduced throughout the volume of the chamber. Consequently, the chamber volume may be regarded as the RF concentration zone 110 in this example. Suction from areas in and around the anode and/or cathode may maintain a desired pressure in the chamber. In some implementations, one or more gas injectors 119 may optionally inject gas into the chamber at an angle from one or more points on the chamber to introduce a vortex flow pattern. Although in this example the chamber also acts as the applicator and a waveguide acts as the distributor other configurations, such as those discussed above, may be used.

Figure 9E:
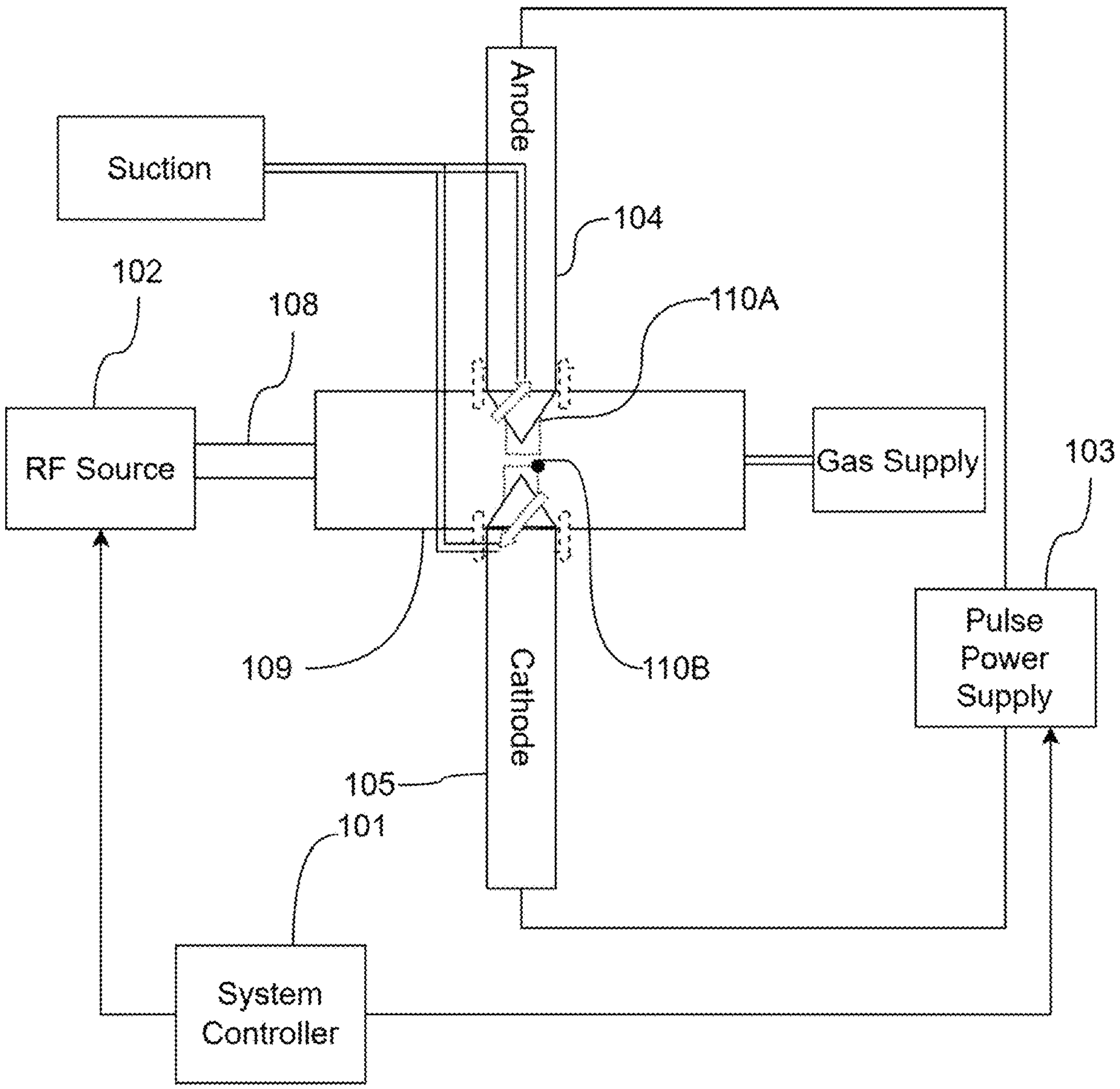

Although some of the above-described system configurations involve use of angled gas inlets to introduce a vortex flow, aspects of the present disclosure are not limited to such implementations alone. Alternatively, vortex flow may be introduced by an appropriate configuration of one or more suction outlets in conjunction with one or more gas injectors. Any of a number of different gas injector and suction outlet configurations may be used to introduce a vortex flow pattern in a chamber. By way of example, and not by way of limitation, FIG. 9E illustrates an alternative system configuration having a conical anode 104 and conical cathode 105. In this example, gas is introduced to the atmospheric isolation device 109, e.g., a chamber, from a gas source coupled to the chamber opposite the junction between the distributor 108, e.g. a waveguide and the chamber. Suction is applied at an angle through outlets near the tip of the anode 104 or cathode or both anode and cathode. Angled suction outlets may optionally be located around the edges of the anode and/or cathode. In this example, the chamber also acts as the applicator and a waveguide acts as the distributor 108, however, other configurations, such as those discussed above, may be used. Furthermore, although the RF concentration zone 110 is depicted as being split into two sections adjacent the cathode and anode, respectively, other concentration zone configurations may be used. It is additionally noted that in this system configuration, RF power may optionally be applied to pre-ionize gas in the chamber. This would obviate the need for a remote plasma source, as discussed above with respect to FIG. 2A.

Figure 9F:
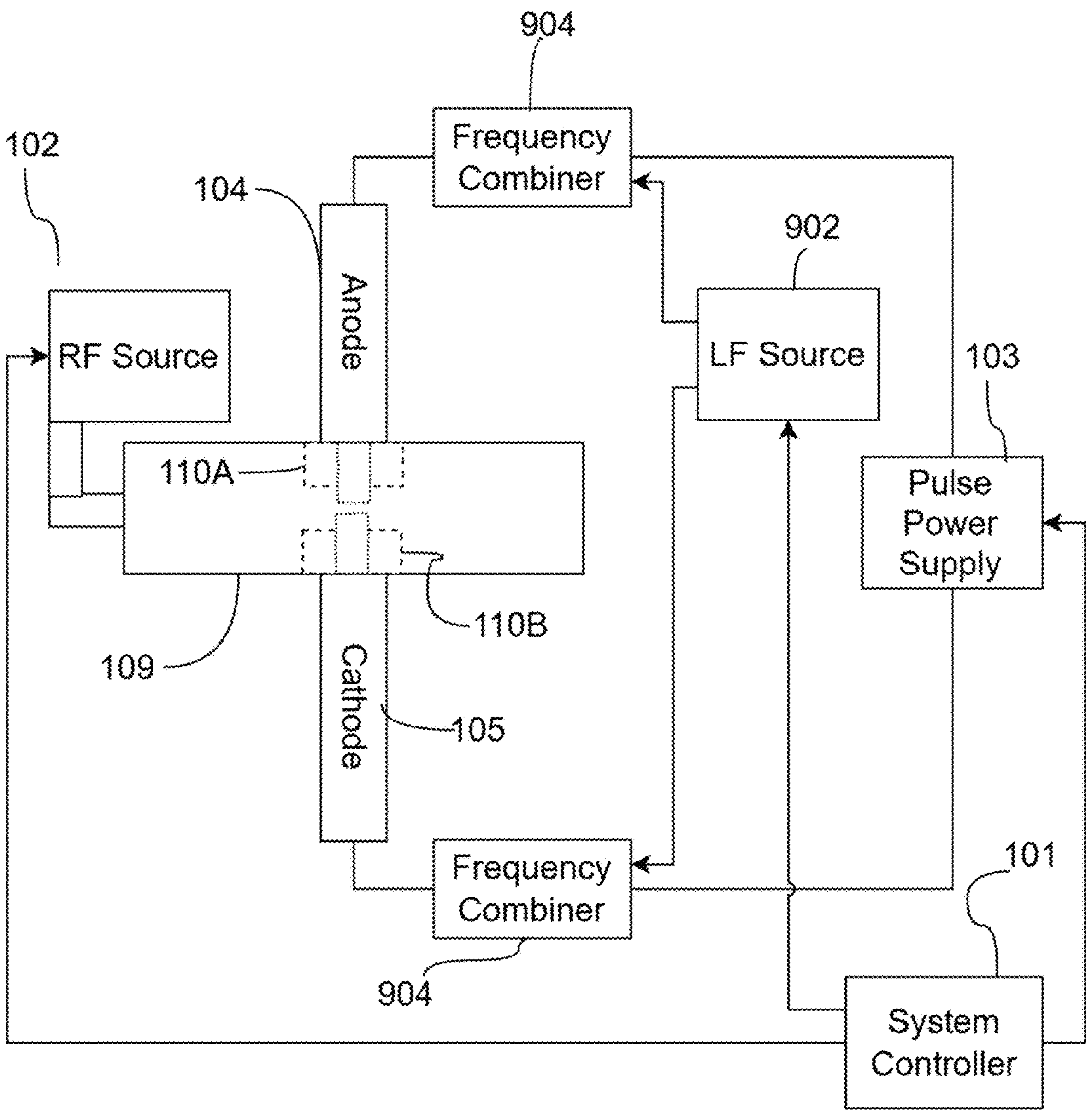

Many of the system configurations discussed above involve applying pulsed voltage between the anode and cathode to drive current through a plasma between them. Aspects of the present disclosure include implementations in which additional voltages may be applied between the anode and cathode, e.g., to adjust plasma concentration and/or facilitate plasma stabilization. By way of example, and not by way of limitation, FIG. 9F depicts an alternative system configuration in which an additional Low Frequency RF source 902 is coupled between the anode 104 and cathode 105. A driving signal from the Low Frequency RF source is combined though a frequency combiner 904 with conductors from the pulse power supply 103, and connected to the anode and cathode. The Low Frequency RF source is controlled by the System Controller 101. The low frequency RF applied between the cathode and anode may increase plasma concentration in the RF concentration zone 110 thereby increasing the plasma temperature and density prior to the pulse power supply driving current between the anode and cathode to initiate the Z-pinch. The system controller 101 provides signals that direct the RF source 102, LF source and pulse power supply 103 when to turn on and off. Low frequency voltage applied between the anode 104 and cathode 105 may also help stabilize the plasma in the RF concentration zone 110.

Figure 9G:
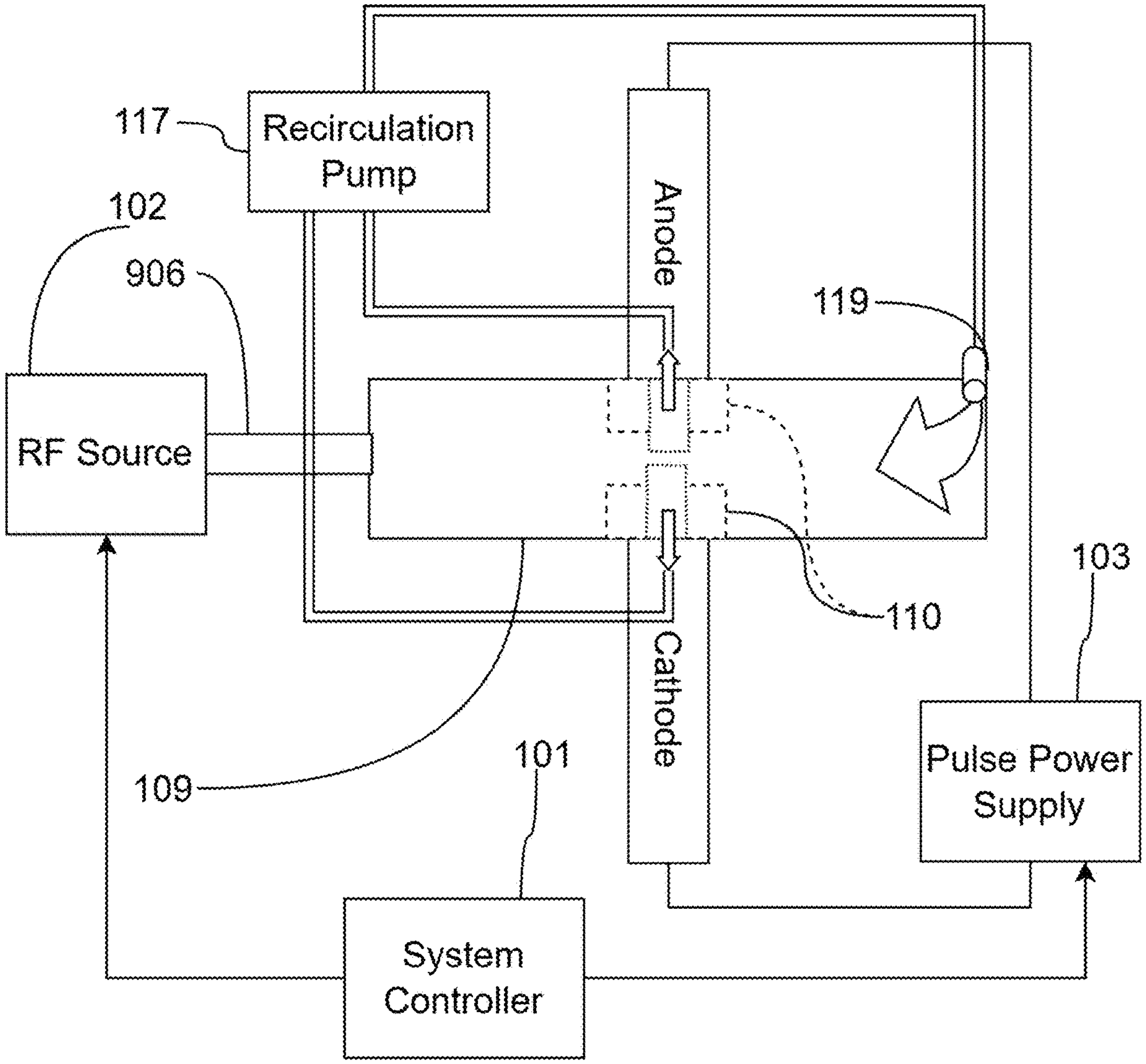

Aspects of the present disclosure include further variations on the system configurations described above to facilitate operation with specific types of plasma. For example, some system configurations may be designed to manage the consumption of gases used in the plasma. By way of example, FIG. 9G illustrates an example of a system configuration having a recirculation pump 117 coupled to the atmospheric isolation device 109, e.g., a chamber, which may also act as the applicator. RF power from an RF power supply 102 is delivered to the chamber via one or more waveguides 906. Gas withdrawn from the chamber by the vacuum pump may be recirculated back to the chamber by a recirculation pump 117 through a gas inlet. In some implementations, the functions of the vacuum pump 115 and recirculation pump 117 may be combined in a single pumping system or even a single pump. In other implementations, some form of gas treatment device, e.g., filtration and/or gas species separation may be implemented between the vacuum pump and recirculation pump. Such a gas treatment device may include in-line gas separation, filtration, or fuel addition. By way of example, and not by way of limitation, this type of combination could be used for helium management for systems that generate helium plasma, e.g., for fusion applications. In this example, the chamber 109 is depicted as also acting as the applicator and the waveguide 906 acts as the distributor, however, other configurations, such as those discussed above, may be used. Furthermore, although the RF concentration zone 110 is depicted as being split into two sections adjacent the cathode and anode, respectively, other concentration zone configurations may be used.

Figure 10A:
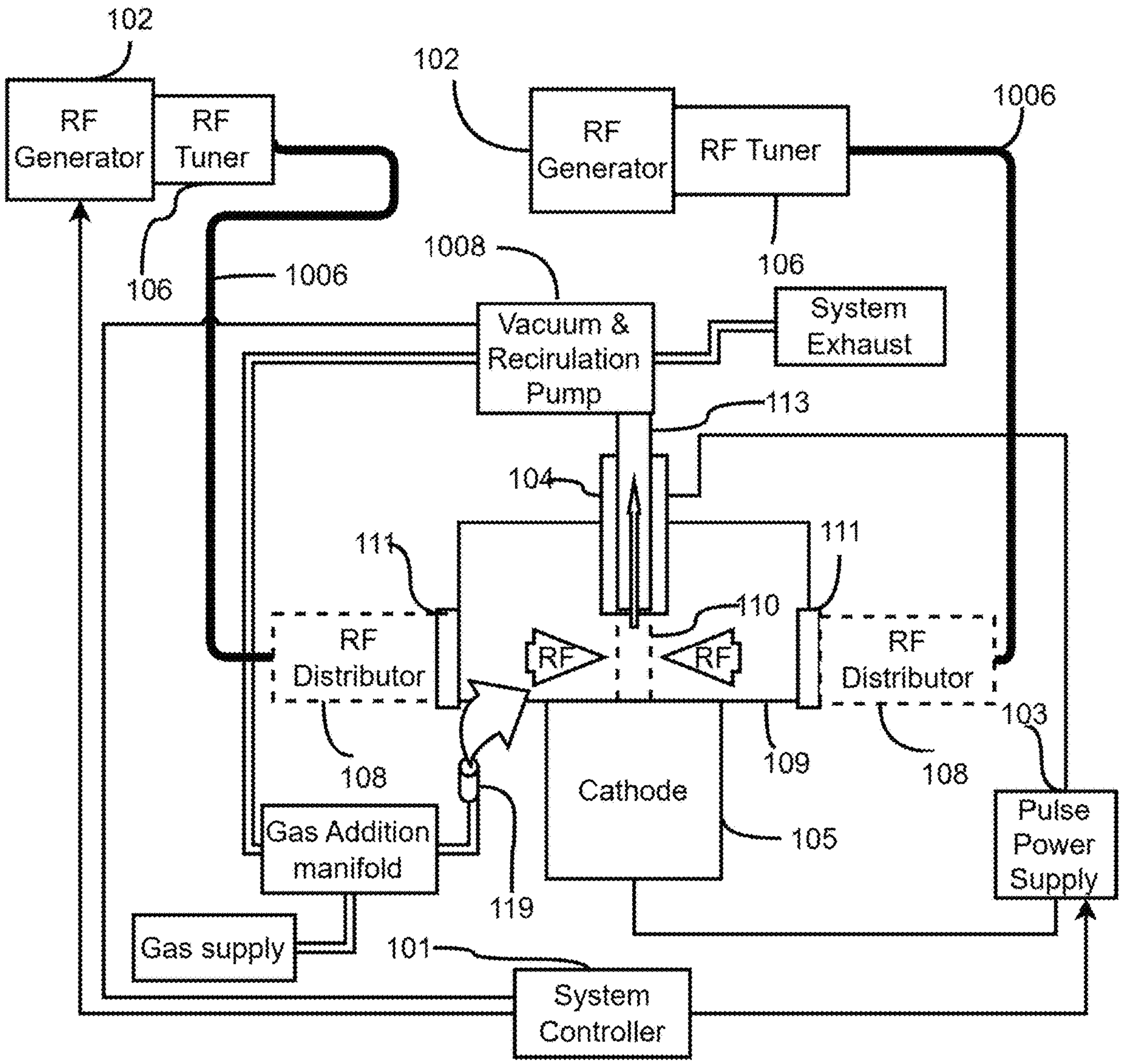
FIG. 10A is a schematic diagram depicting an alternative configuration of a stabilized Z-pinch plasma system having a hollow anode.

Alternative system configurations may have different features than those discussed above in many ways. FIG. 10A depicts one possible alternative system configuration showing one or more RF generators 102 injecting RF power through one or more corresponding tuners 106, waveguides 1006, environmental separation windows 111, and optionally distributors 108, into a chamber 109 that acts as an RF resonant applicator, with frequency tuned RF concentrated in a concentration zone 110. A hollow anode 104 is located protruding into the chamber 109, additionally acting as a field reflector, and is located with its tip at the RF concentration zone 110. RF waves are delivered in a cylindrically symmetric manner to the RF concentration zone 110. A cathode 105 includes a large area of the wall of the applicator under the RF concentration zone 110. A combined vacuum and recirculation pump 1008 pulls gas from the center of the anode 104, removes gas via a system exhaust tube 113, introduces gas from a gas supply source via a gas addition manifold, and injects vortex gas through a delivery inlet 119. A pulsed power supply 103 is connected to the anode and cathode.

Figure 10B:
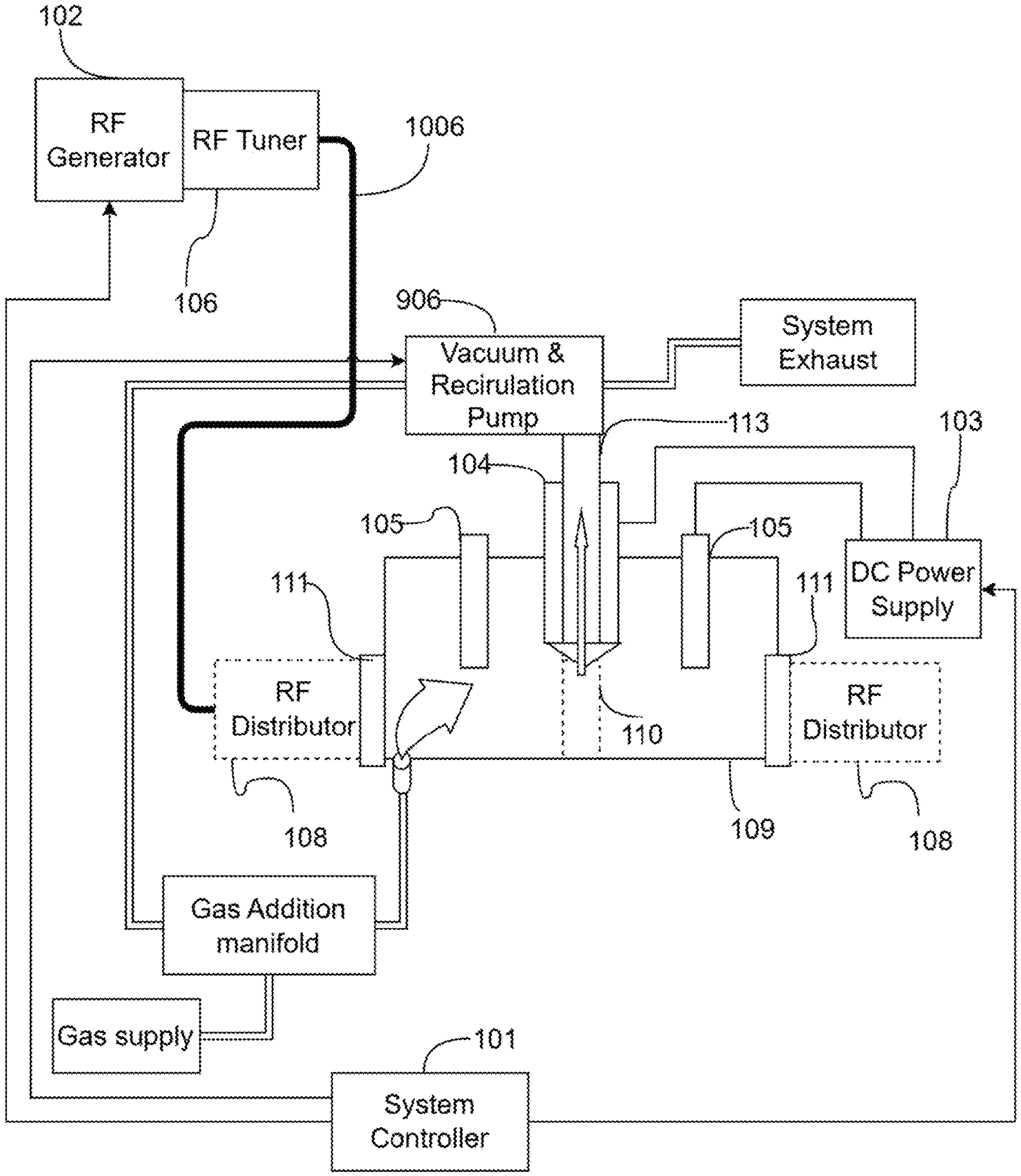
FIG. 10B is a schematic diagram depicting an alternative configuration of a stabilized Z-pinch plasma system having a hollow anode surrounded by a cylindrical cathode.
Figure 10C:
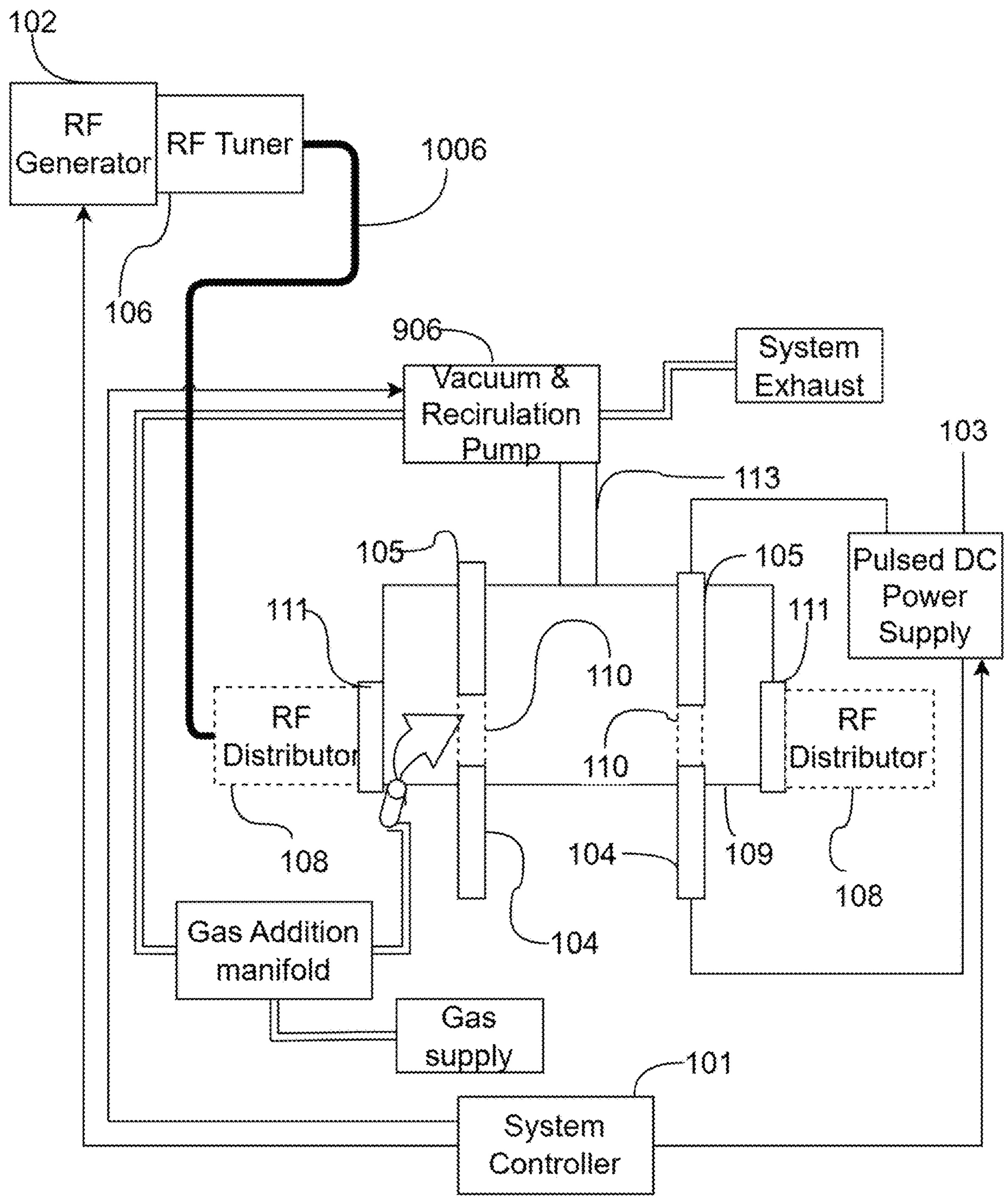
FIG. 10C is a schematic diagram depicting an alternative configuration of a stabilized Z-pinch plasma system having two or more anodes aligned with two or more corresponding cathodes.

FIGS. 10B-10C depict other possible alternative system configuration having an RF generator 102 injecting RF power through a tuner 106, waveguide 1006, environmental separation window 111, and optionally distributors 108, into a chamber 109 that acts as an RF resonant applicator and reaction zone, with frequency tuned RF concentrated in a concentration zone 110. The distributors 108 may include a resonant cavity with a moveable back wall, as shown in FIG. 8D. A hollow anode 104 is located protruding into the chamber 109, additionally acting as a field reflector, and is located with its tip at the RF concentration zone 110. RF waves are delivered in a cylindrically symmetric manner to an RF concentration zone 110 in the chamber 109. A cylindrical cathode 105 protrudes into the chamber and surrounds the anode. A combined vacuum and recirculation pump 1008 pulls gas from the center of the anode 104, removes gas via a system exhaust tube 113, introduces gas from a gas supply source via a gas addition manifold, and injects vortex gas through a delivery inlet 119. A pulsed power supply 103 is connected to the anode 104.

In the implementation shown in FIG. 10C, a plurality of electrodes including, e.g., two or more cathodes 105 in the form of two or more cylindrically patterned electrodes are aligned with corresponding anodes 104. The system shown in FIG. 10C further includes a pulsed power energy source 103 connected to the electrodes in such a manner to provide a separate induction between the single power source and each electrode. Furthermore, in some implementations a plurality of energy sources may deliver power independently to each electrode. Optionally, the electrodes may be connected to independent power supplies.

Plasma Resistant Coating

Figure 11:
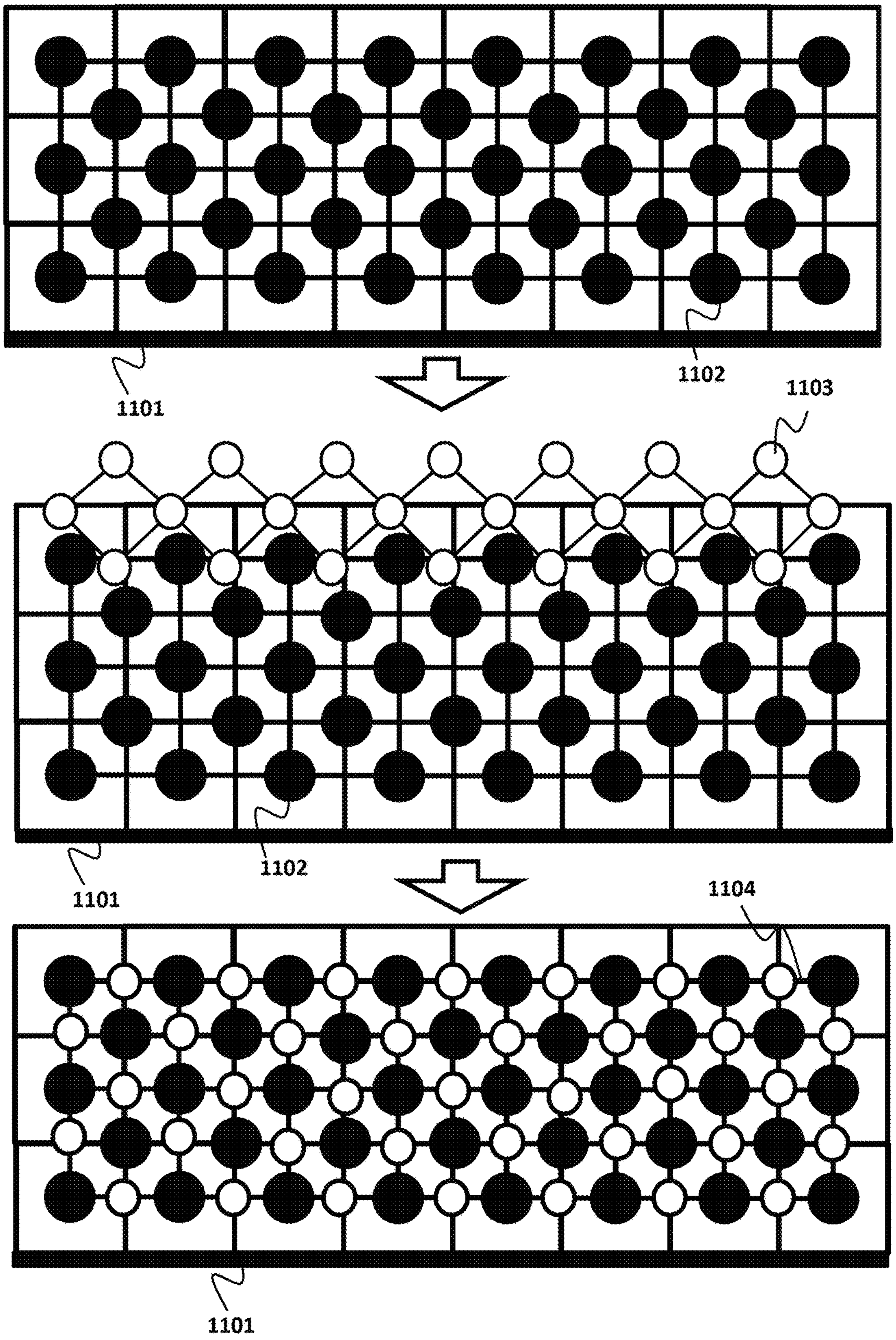
FIG. 11 depicts a method of fabrication of a resilient coating for the Z-pinch plasma system according to aspects of the present disclosure.

The temperatures involved in fusion are extreme and the materials used to create all parts exposed to the fusion reactions must be resistant to those high temperatures. According to aspects of the present disclosure the longevity of components in the reactor may be extended by using a seasoned carbon molybdenum coating developed according to aspects of the present disclosure. FIG. 11 depicts a method for creating the seasoned carbon molybdenum coating for the reactor according to an aspect of the present disclosure. To fabricate the seasoned carbon molybdenum coating, first a surface of the reactor 1101 which may be exposed to compressed high temperature plasma is coated with an open cell molybdenum foam 1102. The open cell molybdenum foam 1102 has the valuable property of being porous and permeable to other materials. Amorphous carbon 1103 is formed on the open cell molybdenum foam 1102 and integrated into the cells and surface of the Molybdenum foam 1102. The fusion reactor is started which exposes the carbon and molybdenum to extreme heat, seasoning the surface treatment resulting in carbon being incorporated into the Molybdenum crystal structure 1104, thereby creating a seasoned Carbon Molybdenum coating 1104 on surfaces of the reactor. This seasoned Carbon Molybdenum coating 1104 is resistant to the high temperatures that occur in the fusion reactor and has good heat conducting properties allowing heat to wick away from the surface of the interior of the fusion reactor. Reactor surfaces coated with this seasoned carbon molybdenum material may include for example and without limitation, the interior of the atmospheric isolation device, the interior of the hollow primary electrodes, the secondary electrodes, venturi nozzle, interior of the reaction chamber, gas inlets etc.

In some cases, a resilient surface finish can be generated using the following method. A molybdenum and/or tungsten foam can be formed on a surface. The molybdenum and/or tungsten foam can be impregnated over the surface with one or more atomic isotopes. The one or more atomic isotopes can be incorporated into pores of the molybdenum and/or tungsten foam. The molybdenum and/or tungsten foam impregnated with the one or more atomic isotopes is then exposed to high temperature plasma, whereby atoms from the one or more atomic isotopes are incorporated into a structure of the molybdenum foam. For example, the one or more atomic allotropes can include carbon isotopes, lithium-6, or boron isotopes.

Incorporating lithium-6 or other fusion reactants into the porous material may be used to deliver one or more fusion reactants to an environment within the atmospheric isolation device.

In alternative embodiments, the porous material can be formed of tungsten, copper, iron, steel, ceramic, or glass.

Instead of carbon atoms, the foam can be filled with a material which is favorable for interacting with other fusion reactant gasses such as lithium-6, or a metal such as boron.

Alternatives

In addition to fusion, stabilized Z-Pinches of the type described herein may be used for X-ray production, Neutron production, EUV production, high energy physics experimentation, and chemistry applications. For example and without limitation, for visible light, X-ray, UV, or other wavelength radiation production a window that is transparent to desired wavelength of radiation may be installed in the atmospheric isolation device. The desired wavelength may be extracted through the transparent window. Additionally, for some wavelengths of the window may be chosen to block certain wavelengths of radiation for example for usable visible light the window may be chosen to block UV and IR radiation. For example, a substrate (e.g., including a semiconductor, a metal, a dielectric, and/or a ceramic material) can be positioned such that it is irradiated with the desired wavelength transmitted through the window in the atmospheric isolation device. In another implementation the plasma output from the stabilized Z-Pinches may be used for etching or welding, the plasma outlet with a venturi may focus the super-heated gas allowing it to be used for cutting, welding, etching, plasma deposition, etc. For example, the output plasma stream can be used to etch or cut a substrate (e.g., a semiconductor material such as Si), or a component (e.g., made of a metal or a ceramic) in a manufacturing process. Aspects of the present disclosure discuss compressed plasma reactions, these reactions may be used to for example and without limitation pre-treatment of fuel gas mixture to break down fuel or oxygen into reactive species, plasma chemistry to break material into constituent elements. Accordingly, aspects of the present disclosure may enable performance improvements for Z-Pinches in all of these fields.

Claims Clauses

Clause 1. A stabilized Z-pinch plasma system, comprising: an atmospheric isolation device; one or more radiofrequency (RF) generators configured to supply RF energy: one or more RF applicators coupled to the one or more RF generators and configured to direct RF energy from the one or more RF generators to a Z-pinch plasma column region within the atmospheric isolation device in a direction having a component perpendicular to a direction of electric current through a Z-pinch plasma column in the Z-pinch plasma column region; one or more RF distributors coupled to the one or more RF generators and to the one or more RF applicators, positioned between the one or more RF generators and the one or more RF applicators, and configured to distribute the RF energy to the one or more RF applicators; a Z-Pinch drive device configured to drive electric current through the Z-pinch plasma column within the atmospheric isolation device to produce a Lorentz force on the Z-pinch plasma column; and a controller coupled to the one or more RF generators, one or more RF applicators, one or more RF distributors, and Z-pinch drive device, wherein the controller is configured to cause the one or more RF generators, one or more RF applicators, and one or more RF distributors to apply sufficient RF energy to a neutral gas in the Z-pinch plasma column region to create a plasma prior to the Z-pinch drive device applying electric current through the Z-pinch plasma column.

Clause 2. The system of clause 1, wherein the Z-pinch drive device includes a pulse power supply.

Clause 3. The system of clause 1, further comprising a radiofrequency (RF) tuner coupled between the one or more RF generators and the one or more RF applicators, wherein the RF tuner is configured to match an impedance of the one or more RF generators to an impedance of the one or more RF applicators.

Clause 4. The system of clause 1, further comprising an energy extraction mechanism configured to extract energy from nuclear fusion resulting from a Z-pinch occurring in the Z-pinch plasma column.

Clause 5. The system of clause 1, wherein the controller is configured to cause the Z-pinch drive device to apply sufficient electric current through the Z-pinch plasma column, and cause the one or more RF generators, one or more RF applicators and one or more RF distributors to apply RF energy to the Z-pinch plasma column as the Z-pinch drive device applies sufficient electric current through the Z-pinch plasma column.

Clause 6. The system of clause 1, further comprising one or more gas sources coupled to the atmospheric isolation device, wherein the one or more gas sources are configured to deliver one or more fusion reactant gasses to the Z-pinch plasma column within the atmospheric isolation device.

Clause 7. The system of clause 6, wherein the one or more fusion reactant gasses include deuterium.

Clause 8. The system of clause 6, wherein the one or more fusion reactant gasses include deuterium and tritium.

Clause 9. The system of clause 6, wherein the one or more fusion reactant gasses include a boron-containing gas and hydrogen.

Clause 10. The system of clause 1, wherein the atmospheric isolation device includes a plasma outlet and the system further comprising a venturi nozzle coupled to the plasma outlet of the atmospheric isolation device.

Clause 11. The system of clause 10, wherein the venturi nozzle is located outside of the atmospheric device.

Clause 12. The system of clause 10, wherein the venturi nozzle is located inside of the atmospheric device.

Clause 13. The system of clause 10, wherein the venturi nozzle is incorporated into the plasma outlet.

Clause 14. The system of clause 1, further comprising a downstream reaction chamber coupled to the atmospheric isolation device.

Clause 15. The system of clause 14 wherein the downstream reaction chamber includes a downstream reagent inlet.

Clause 16. The system of clause 14 wherein the atmospheric isolation device includes a downstream reagent inlet.

Clause 17. The system of clause 14 wherein an inlet of the downstream reaction chamber is coupled to a venturi nozzle.

Clause 18. The system of clause 17 wherein the venturi includes a downstream reagent inlet.

Clause 19. The system of clause 1 wherein the atmospheric isolation device includes one or more angled gas inlets configured to provide a carrier gas or fuel gas radially inward to an interior of the atmospheric isolation device.

Clause 20. The system of clause 1 wherein the atmospheric isolation device includes at least one plasma outlet and further comprising at least one electrode in an output path of the plasma outlet and configured to deliver current pulses to another electrode within the atmospheric isolation device.

Clause 21. The system of clause 1 wherein the one or more RF distributors include a cylindrically symmetric outer waveguide structure having one or more wave-shaping inner walls located between the Z-Pinch plasma column region and the cylindrically symmetric outer waveguide structure.

Clause 22. The system of clause 21, further including one RF generator coupled to the outer waveguide structure through the RF applicator and the outer waveguide structure including at least two resonant cavities configured to shape the RF energy and direct a maximum field intensity towards the Z-pinch plasma column region.

Clause 23. The system of clause 21, wherein three RF generators are coupled to the outer waveguide structure through three corresponding RF applicators and wherein the three RF generators are synchronized to direct a maximum RF field intensity toward the Z-Pinch plasma column region.

Clause 24. The system of clause 1, wherein the Z-Pinch drive device is configured to drive sufficient electric current through the Z-pinch plasma column within the atmospheric isolation device to compress the Z-pinch plasma column sufficiently to cause a fusion reaction.

Clause 25. The system of clause 1, wherein the atmospheric isolation device includes at least one window that is transparent to at least one wavelength of electromagnetic radiation.

Clause 26. The system of clause 1, wherein the one or more RF distributors are configured to ensure that the one or more RF applicators distribute power to the Z-pinch plasma column in a cylindrically uniform manner.

Clause 27. The system of clause 1, wherein the Z-pinch drive device is configured to drive sufficient current through the Z-pinch plasma column within the atmospheric isolation device to produce a Lorentz force sufficient to compress the Z-pinch plasma column.

Clause 28. A plasma processing method, comprising: driving electric current through a Z-pinch plasma column within an atmospheric isolation device to produce a Lorentz force on the Z-pinch plasma column; and supplying radiofrequency (RF) energy to the Z-Pinch plasma column with one or more RF generators configured to drive energy into regions of the Z-pinch plasma, wherein one or more RF applicators direct RF energy from the one or more RF generators toward the Z-pinch plasma column in a direction generally perpendicular to the direction of the electric current through the Z-pinch plasma column, and wherein one or more RF distributors are configured to distribute the RF energy to the one or more RF applicators.

Clause 29. The method of clause 28, further comprising extracting energy from nuclear fusion resulting from a Z-pinch occurring in the Z-pinch plasma column.

Clause 30. The method of clause 28, further comprising supplying radiofrequency (RF) energy to a region within the atmospheric isolation device to initiate the Z-pinch plasma column prior to driving the electric current through the Z-pinch plasma column.

Clause 31. The method of clause 28, further comprising delivering one or more fusion reactants to an environment within the atmospheric isolation device.

Clause 32. The method of clause 31, wherein the one or more fusion reactants include deuterium.

Clause 33. The method of clause 31, wherein the one or more fusion reactants include deuterium and tritium.

Clause 34. The method of clause 31, wherein the one or more fusion reactants include a boron-containing gas and hydrogen.

Clause 35. The method of clause 31, wherein the one or more fusion reactants include a helium 3-containing gas and deuterium.

Clause 36. The method of clause 31, wherein the one or more fusion reactants include hydrogen and lithium-6.

Clause 37. The method of clause 28, further comprising introducing one or more down-stream reagents into the Z-pinch plasma column.

Clause 38. The method of clause 37, further comprising collecting products of the one or more down-stream reagents in a down-stream reaction chamber.

Clause 39. The method of clause 37, further comprising performing secondary reactions on products of the one or more down-stream reagents in a down-stream reaction chamber.

Clause 40. The method of clause 39, further comprising inputting one or more secondary reactants into the down-stream reaction chamber.

Clause 41. The method of clause 31, further comprising entraining the Z-pinch plasma column into an output stream with a venturi nozzle.

Clause 42. The method of clause 41, further comprising using the output stream to etch or cut a substrate.

Clause 43. The method of clause 31, further comprising irradiating a substrate through a window in the atmospheric isolation device.

Clause 44. The method of clause 28, further comprising shaping the plasma into a single Z-pinch plasma column using one or more angled gas flows.

Clause 45. The method of clause 28, wherein the one or more RF distributors are configured to ensure that one or more RF applicators distribute power to the Z-pinch plasma in a cylindrically symmetric manner.

Clause 46. The method of clause 28, wherein driving electric current through a Z-pinch plasma column within the atmospheric isolation device to produce a Lorentz force the Z-pinch plasma column includes driving sufficient electric current through the Z-pinch plasma column within the atmospheric isolation device to produce a Lorentz force sufficient to compress the Z-pinch plasma column.

Clause 47. The method of clause 28, wherein, prior to driving the electric current through the Z-Pinch plasma column, the Z-Pinch plasma column is characterized by a diameter of $\lambda RF/4$ or less, where $\lambda RF$ is a wavelength of the RF energy, and wherein a gas pressure within the atmospheric isolation device is between 0.5 kilopascals (kPa) and 2 kPa, and wherein a ratio of a power density of the RF energy to the gas pressure within the atmospheric isolation device is between 0.2 $W/mm^3kPa$ and 0.4 $W/mm^3kPa$.

Clause 48. The method of clause 28, wherein, prior to driving the electric current through the Z-Pinch plasma column, the Z-Pinch plasma column is characterized by a diameter of between 2.5 millimeters (mm) and 12 mm, and wherein a gas pressure within the atmospheric isolation device is between 2 kilopascals (kPa) and 50 kPa, and wherein a ratio of a power density of the RF energy to the gas pressure within the atmospheric isolation device is between 0.2 $W/mm^3kPa$ and 12 $W/mm^3kPa$.

Clause 49. The method of clause 28, wherein, prior to driving the electric current through the Z-Pinch plasma column, the Z-Pinch plasma column is characterized by a diameter of between 1 millimeter (mm) and 6 mm, and wherein a gas pressure within the atmospheric isolation device is between 50 kilopascals (kPa) and 500 kPa, and wherein a ratio of a power density of the RF energy to the gas pressure within the atmospheric isolation device is between 0.4 $W/mm^3kPa$ and 2 $W/mm^3kPa$.

Clause 50. A stabilized Z-pinch plasma system, comprising: an atmospheric isolation device; one or more radiofrequency (RF) generators configured to supply RF energy; one or more RF applicators configured to direct RF energy from the one or more RF generators to a Z-pinch plasma column region within the atmospheric isolation device in a direction having a component perpendicular to a direction of electric current through a Z-pinch plasma column; one or more RF distributors coupled to the one or more RF generators and to the one or more RF applicators, positioned between the one or more RF generators and the one or more RF applicators, and configured to distribute the RF energy to the one or more RF applicators; a Z-Pinch drive device configured to drive electric current through a Z-pinch plasma column within the atmospheric isolation device to produce a Lorentz force on the Z-pinch plasma column; and a controller coupled to the one or RF generators, one or more RF applicators, one or more RF distributors, and Z-pinch drive device, wherein the controller is configured to cause the one more or RF generators, one or more RF applicators and one or more RF distributors to apply RF energy to the Z-pinch plasma column as the Z-pinch drive device applies electric current through the Z-pinch plasma column.

Clause 51. The system of clause 50, wherein the controller is configured to cause the one more or RF generators, one or more RF applicators and one or more RF distributors to apply sufficient RF energy to a neutral gas in the Z-pinch plasma column region to create a plasma prior to the Z-pinch drive device applying sufficient electric current through the Z-pinch plasma column.

Clause 52. The system of clause 50, wherein the one or more RF distributors are configured to ensure that the one or more RF applicators distribute power to the Z-pinch plasma column in a cylindrically uniform manner.

Clause 53. The system of clause 50, wherein the Z-pinch drive device is configured to drive sufficient current through the Z-pinch plasma column within the atmospheric isolation device to produce a Lorentz force sufficient to compress the plasma column.

Clause 54. A method of producing neutrons, comprising: supplying a fuel to a concentration zone between an anode and a cathode; applying a current between the anode and the cathode; and applying radiofrequency (RF) power to the concentration zone, wherein the current applied between the anode and the cathode is sufficient to compress the fuel and cause nuclear fusion of atoms of the fuel, thereby releasing neutrons and thermal energy.

Clause 55. The method of clause 54, wherein supplying the fuel to the concentration zone takes place before applying the RF power to the concentration zone.

Clause 56. The method of clause 54, wherein supplying the fuel to the concentration zone takes place after applying the RF power to the concentration zone.

Clause 57. The method of clause 56, further comprising ionizing the fuel in the concentration zone prior to applying the current between the anode and cathode.

Clause 58. A method for generation of a resilient surface finish comprising: forming a molybdenum and/or tungsten foam on a surface; impregnating the molybdenum and/or tungsten foam over the surface with one or more atomic isotopes wherein the one or more atomic isotopes are incorporated into pores of the molybdenum and/or tungsten foam; and exposing the molybdenum and/or tungsten foam impregnated with the one or more atomic isotopes to high temperature plasma whereby atoms from the one or more atomic isotopes is incorporated into a structure of the molybdenum foam, wherein the one or more atomic isotopes include carbon isotopes, lithium-6, or boron isotopes.

Clause 59. The system of clause 1, further comprising a neutron absorbing blanket containing a precursor isotope for a useful product isotope.

Clause 60. The system of clause 59, wherein the precursor isotope is molybdenum-98.

Clause 61. A stabilized Z-pinch plasma system, comprising: an atmospheric isolation device; one or more radiofrequency (RF) generators configured to supply RF energy; one or more RF applicators configured to direct RF energy from the one or more RF generators to a Z-pinch plasma column region within the atmospheric isolation device comprising a Z-pinch plasma column; an RF distributor which reflects the RF energy to converge on the Z-Pinch plasma column in a direction generally perpendicular to a direction of electric current through the Z-pinch plasma column; an RF distributor configured to ensure that the one or more RF applicators distribute power to the Z-pinch plasma column in a cylindrically uniform manner; a Z-Pinch drive device configured to drive sufficient electric current through a Z-pinch plasma column within the atmospheric isolation device to cause the Z-pinch plasma column to compress; and a controller coupled to the one or RF generators, one or more RF applicators, RF distributor, and Z-pinch drive device, wherein the controller is configured to cause the one more or RF generators, one or more RF applicators and RF distributor to apply RF energy to the Z-pinch plasma column as the Z-pinch drive device applies sufficient electric current through the Z-pinch plasma column.

Clause 62. The system of clause 50, further comprising a remote plasma source configured to inject plasma through one or more openings in a wall of the atmospheric isolation device.

Clause 63. The system of clause 50 further comprising a remote plasma source configured to inject plasma through one or more openings in an anode and/or a cathode of the atmospheric isolation device.

Clause 64. The system of clause 1 or 50 further comprising one or more volumetric tuners each comprising one or more variable volume TE mode resonator including a movable wall coupled to a linear motion device.

Clause 65. The system of clause 64, further comprising a motorized linear motion device and a controller configured to determine a motion of the linear motion device.

Clause 66. The system of clause 64, further comprising one or more variable volume TEM resonators or TM resonators.

Clause 67. The system of clause 1 or 50, further comprising a plurality of RF injection points patterned cylindrically about the Z-Pinch plasma column region.

Clause 68. The system of clause 1 or 50 wherein an RF distributor of the one or more RF distributors comprises one or more waveguide entries arranged in a mirrored linear pair, triangle, square, pentagon, hexagon, septagon, octagon, or higher order polygon geometry.

Clause 69. The system of clause 1 or 50, further comprising one or more gas curtains configured to act as environmental separation between the RF generator and RF distributor.

Clause 70. The system of clause 1 or 50, further one or more cathodes and one or more corresponding anodes disposed in the atmospheric isolation device and coupled to the Z-pinch drive device, wherein the Z-pinch drive device is configured to drive the electric current through the Z-pinch plasma column via the one or more anodes and the one or more cathodes.

Clause 71. The system of clause 1 or 50, further comprising a plasma outlet concentric with an anode and/or a cathode.

Clause 72. The system of clause 1 or 50, further comprising one or more plasma outlets patterned in a rotationally symmetric array around a cathode and/or an anode.

Clause 73. The system of clause 1 or 50 further comprising one or more recirculation pumps coupled to the atmospheric isolation device.

Clause 74. The system of clause 1 or 50 wherein the Z-Pinch drive device comprises two or more pulse power supplies coupled to a cathode and an anode configured to drive the electric current through the Z-pinch plasma column.

Clause 75. The system of clause 1 or 50, further comprising an anode and a cathode disposed within the atmospheric isolation device and one or more pulse power supplies and one or more AC power supplies conductively coupled to the anode and cathode through a combiner.

Clause 76. The system of clause 1 or 50 wherein the Z-Pinch drive device is coupled to a cathode and an anode configured to drive the electric current through the Z-pinch plasma column, wherein the cathode and/or the anode comprise one or more protrusions which extend inside of the atmospheric isolation device and/or RF distributor, and are configured to form one or more TEM resonators substantially parallel to the Z-Pinch plasma column.

Clause 77. The system of clause 1 or 50, further comprising one or more TE resonators extending substantially perpendicular to the Z-Pinch plasma column.

Clause 78. The system of clause 1 or 50, further comprising an anode and a cathode having protrusions that extend substantially inside of the atmospheric isolation device and/or RF distributor forming one or more TEM resonators.

Clause 79. The system of clause 78 wherein the protrusions on the cathode and/or anode form a point or rounded tip concentric with an axis of the Z-Pinch plasma column.

Clause 80. The system of clause 1 or 50, further comprising one central electrode and two or more opposite polarity electrodes located in cylindrical symmetry about a central axis of the central electrode, wherein the central electrode and the two or more opposite polarity electrodes all extend parallel from a wall structure of the atmospheric isolation device.

Clause 81. The system of clause 1 or 50, further comprising one central electrode and two or more opposite polarity electrodes located in cylindrical symmetry about a central axis of the central electrode wherein the central electrode and the two or more opposite polarity electrodes all extend parallel from opposite wall structures of the atmospheric isolation device.

Clause 82. The system of clause 1 or 50, further comprising one central electrode and two or more opposite polarity electrodes located in cylindrical symmetry about a central axis of the central electrode all extending from a radial direction perpendicular or angled up or down relative to the central electrode.

Clause 83. The system of clause 1 or 50, further comprising one or more concentric hollow cathode and anode structures located at opposite ends of the Z-Pinch plasma column.

Clause 84. The system of clause 83 wherein the Z-Pinch drive device is coupled to a cathode and an anode configured to drive the electric current through the Z-pinch plasma column, and wherein the system further comprises a secondary anode and/or cathode located on the axis of the Z-Pinch plasma column either protruding from, coplanar with, or withdrawn from a surface of the one or more concentric hollow cathode and anode structures.

Clause 85. The system of clause 1 or 50, further comprising an anode and a cathode arranged in cylindrical symmetry about a central axis of the Z-Pinch plasma column; a pulsed power energy source connected to the anode and the cathode.

Clause 86. The system of clause 1 or 50, wherein the applicator is configured such that RF energy enters the applicator in a direction parallel to an axis of the Z-Pinch column.

Clause 87. The system of clause 1 or 50, wherein the applicator is configured such that RF energy enters the applicator at an end of the Z-Pinch, at the middle of the Z-Pinch column, above the Z-Pinch column, or at any intermediate location along the Z-Pinch column.

Clause 88. The system of clause 1 or clause 50, further comprising a cathode and anode that protrude into the atmospheric isolation device.

Clause 89. The system of clause 88, wherein the cathode and anode are configured to act as resonant members creating transverse electromagnetic (TEM) resonance, in addition to a transverse electric (TE) mode.

Clause 90. The system of clause 88, wherein RF radiation is introduced by a distributor in the form of a waveguide structure.

Clause 91. The system of clause 88, wherein the anode and the cathode are configured to act as antennae to create a transverse electromagnetic (TEM) radiofrequency (RF) mode that overlays a transverse electric RF mode wave coming in from a waveguide distributor.

Clause 92. The system of clause 1 or 50, wherein RF power is delivered coaxially with a cathode, or with an anode, or with both a cathode and anode acting, in whole or in part, as the applicator.

Clause 93. The system of clause 92, wherein the cathode and/or anode is of a cylindrical shape that protrudes through one or more environmental separation windows.

Clause 94. The system of clause 93, wherein the one or more environmental separation windows include one or more suitably configured feedthroughs that electrically isolate the cathode and/or anode from a chamber.

Clause 95. The system of clause 1 or 50, further comprising one or more tangential gas injectors configured to cause a vortex flow pattern within the atmospheric isolation device.

Clause 96. The system of clause 95, wherein the one or more tangential gas injectors are angled tangentially with respect to a symmetry axis of the atmospheric isolation device so that vortex flow is present proximate to a center of the atmospheric isolation device.

Clause 97. The system of clause 1 or 50, further comprising one or more gas injectors configured to introduce a flow of gas into the atmospheric isolation device.

Clause 98. The system of clause 97, wherein the one or more gas injectors include one or more radial gas injectors configured to cause a centrally directed flow pattern within the atmospheric isolation device.

Clause 99. The system of clause 98, further comprising, an exhaust tube that is coaxial with a cathode or with an anode 105 or with both a cathode and an anode.

Clause 100. The system of clause 97, wherein the one or more gas injectors are configured to provide some combination of radial, axial, and tangential gas flow(s).

Clause 101. The system of clause 97, wherein the flow of gas is configured to pull activated plasma from the Z-pinch plasma column through to a reaction zone downstream of the Z-pinch plasma column.

Clause 102. The system of clause 1 or 50, further comprising one or more gas injectors including one or more axial injectors configured to direct fuel gas axially along an anode toward a cathode.

Clause 103. The system of clause 1 or 50, further comprising one or more gas injectors including one or more axial injectors configured to direct fuel gas axially along a cathode toward an anode.

Clause 104. The system of clause 1 or 50, further comprising a controller and a pulse power supply, wherein the controller is configured to cause the pulse power supply to deliver a series of pulses of different amplitude, frequency, period, pulse shape, waveform, or pattern between an anode and a cathode, wherein the Z-pinch plasma column is located between the anode and the cathode.

Clause 105. The system of clause 1 or 50, wherein the RF generator is coupled to an RF amplifier, configured to direct TE01 RF waves into a tuner coupled to the RF applicator, wherein the RF applicator is in the form of a cylindrical RF cavity configured to produce an RF concentration zone proximate a cylinder axis of the RF cavity.

Clause 106. The system of clause 105, further comprising one or more additional RF amplifiers coupled to a joiner that is coupled to the tuner.

Clause 107. The system of clause 1 or 50, wherein the RF generator is coupled to an RF amplifier, configured to direct TE01 RF waves into a tuner coupled to the RF applicator, wherein the RF applicator includes one or more arcuate walls located around the Z-Pinch plasma column region, wherein the one or more arcuate walls are configured to produce an RF concentration zone proximate the Z-Pinch plasma column.

Clause 108. The system of clause 1 or 50, wherein the RF distributor includes a plurality of waveguides configured to deliver RF power from a single RF generator to the RF applicator in a cylindrically symmetric fashion.

Clause 109. The system of clause 1 or 50, further comprising a chamber, wherein the RF generator is coupled to the chamber via an inline tuner, the system further comprising a reflection tuner coupled to the chamber, wherein the chamber act as the RF applicator, wherein the chamber, inline tuner and reflection tuner act together as the RF distributor.

Clause 110. The system of clause 109, wherein the reflection tuner includes an RF cavity made of electrically conductive material with a moveable back wall that can translate along an axis of the RF cavity.

Clause 111. The system of clause 109, wherein the inline tuner, reflection tuner and chamber act together as the distributor to provide RF power to one or more entry points on the chamber and deliver RF energy to an RF concentration zone in the chamber.

Clause 112. The system of clause 1 or 50, further comprising a chamber, wherein the RF generator is coupled to the chamber via an inline tuner.

Clause 113. The system of clause 1 or 50, further comprising a chamber and multiple tunable resonators coupled to the chamber, wherein the multiple tunable resonators are arranged around the chamber with cylindrical symmetry, wherein the chamber and multiple tunable resonators act partly as the RF applicator and partly as the distributor.

Clause 114. The system of clause 1 or 50, wherein the RF applicator is integrated with the atmospheric isolation device and the RF generator is coupled to the RF applicator directly through the distributor, wherein the distributor is in the form of a waveguide.

Clause 115. The system of clause 114, further comprising a chamber, an anode, and a cathode, wherein the RF applicator, anode and cathode are configured to split an RF concentration zone within the chamber into a first zone proximate the anode and a second zone proximate the cathode.

Clause 116. The system of clause 1 or 50, wherein the atmospheric isolation device includes a gas curtain.

Clause 117. The system of clause 1 or 50, wherein plasma from a remote plasma source drives plasma to enter the atmospheric isolation device through a hollow electrode.

Clause 118. The system of clause 1 or 50, further comprising a conical anode and a conical cathode disposed within the atmospheric isolation device, wherein conical anode and a conical cathode are configured to concentrate electric field.

Clause 119. The system of clause 1 or 50, further comprising an anode and a cathode electrically coupled to the Z-pinch drive device and a low-frequency power supply coupled to the anode and/or cathode through one or more frequency combiners, wherein the one or more frequency combiners are configured to combine a current pulse from the Z-pinch drive device with a signal from the low-frequency power supply.

Clause 120. The system of clause 1 or 50, further comprising a recirculation pump coupled to the atmospheric isolation device.

Clause 121. The system of clause 120, further comprising a vacuum pump coupled to the atmospheric isolation device.

Clause 122. The system of clause 121, wherein functions of the recirculation pump and the vacuum pump are combined in a single pumping system or a single pump.

Clause 123. The system of clause 122, further comprising a gas treatment device implemented between the vacuum pump and recirculation pump.

Clause 124. The system of clause 123, wherein the gas treatment device includes an in-line gas separation, filtration, or fuel addition device.

Clause 125. The system of clause 1 or 50, further comprising a cylindrical cathode that protrudes into the atmospheric isolation device and surrounds an anode.

Clause 126. A method, comprising: causing an RF plasma to spread between and perpendicular to an axis of two or more electrodes; conducting one or more amplitudes, frequencies, patterns, and/or spectral shapes of current to the two or more electrodes; controlling a static and/or time dependent location and density profile of the plasma.

Clause 127. A plasma confinement system comprising at least one electrode with one or more delivery passages configured to deliver a gas, liquid, solid, powder, or superfluid to an area surrounding, adjacent to, coinciding with, or aimed towards a Z-Pinch or RF plasma in the form of one or more plasma columns or sheets or tubes or cones; and at least one power supply configured to supply AC, DC, or pulsed current to the at least one electrode; optionally a waveguide delivery system capable of delivering RF energy.

Clause 128. A plasma confinement system comprising at least one phase shift device configured to focus RF energy towards a plasma; at least one power supply capable of generating plasma; means configured to deliver RF energy to the plasma; means coupled to the at least one phase shift device configured to control a static or time dependent location and density profile of the plasma.

Clause 129. The system of clause 128, further comprising an atmospheric isolation device, wherein the plasma occupies an entire volume of the atmospheric isolation device.

Clause 130. A plasma confinement system comprising at least one phased array RF applicator configured to direct or focus RF energy towards a plasma; at least one power supply coupled to the phased array RF applicator; an RF delivery system configured to RF energy from the at least one power supply to the plasma; and a controller coupled to the phased array RF applicator configured to control static or time dependent location and density profile of the plasma.

Clause 131. A method of producing activated plasma species, comprising: supplying one or more reactant gasses to a concentration zone between an anode and cathode; applying radiofrequency (RF) power to the concentration zone, wherein the RF power applied between the anode and cathode is sufficient to create a plasma; and applying a current between the anode and cathode.

Clause 132. The method of clause 131, further comprising moving activated species of the plasma via pressure differential to a downstream reaction chamber through an orifice, expanding and cooling the activated species, and forming final or intermediate product species.

Clause 133. The method of clause 132 where a second reactant flows through a venturi nozzle into the downstream reaction chamber, applying suction to the plasma species, reacting with the plasma species.

Clause 134. The method of clause 133 where the plasma species is nitrogen, and the second reactant is water.

Clause 135. The method of clause 133 where the plasma species are hydrogen and nitrogen, forming ammonia.

Clause 136. The method of clause 133, where the plasma species are $CO_2$ and Hydrogen, forming methanol.

Clause 137. The method of clause 133, where the plasma species are nitrogen and oxygen, forming nitrogen oxides.

Clause 138. The method of clause 133, where the plasma species is air, forming nitrogen oxides.

Clause 139. The method of clause 133, where the plasma species is air supplemented with nitrogen and/or oxygen, forming nitrogen oxides.

Clause 140. A stabilized plasma system, comprising: an atmospheric isolation device, wherein the atmospheric isolation device includes a plasma outlet; one or more radiofrequency (RF) generators configured to supply RF energy; one or more RF applicators coupled to the one or more RF generators and configured to direct RF energy from the one or more RF generators to a plasma column region within the atmospheric isolation device coaxially aligned with the plasma outlet in a direction having a component perpendicular to a direction of electric current through a plasma column; one or more RF distributors coupled to the one or more RF generators and to the one or more RF applicators, positioned between the one or more RF generators and the one or more RF applicators, and configured to distribute the RF energy to the one or more RF applicators, wherein the one or more RF distributors is configured to distribute RF power to the one or more RF applicators such that the one or more RF applicators apply RF power to the plasma column region in an axisymmetric fashion; and a controller coupled to the one or more RF generators, one or more RF applicators, and one or more RF distributors, wherein the controller is configured to cause the one or more RF generators, one or more RF applicators, and one or more RF distributors to apply sufficient RF energy to a neutral gas in the plasma column region to create a plasma.

Clause 141. A plasma processing method, comprising: supplying radiofrequency (RF) energy to the plasma column in an axisymmetric manner with one or more RF generators configured to drive energy into a plasma column to form active species; and moving the active species from the plasma through a plasma outlet, wherein the plasma outlet is coaxially aligned with the plasma column; and wherein one or more RF applicators direct RF energy from the one or more RF generators toward the plasma column in a direction generally perpendicular to the direction of an electric current through the plasma column, and wherein one or more RF distributors are configured to distribute the RF energy to the one or more RF applicators.

While the above is a complete description of the preferred embodiment of the present invention, it is possible to use various alternatives, modifications, and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A," or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A plasma processing method, comprising:

driving electric current through a Z-pinch plasma column within an atmospheric isolation device to produce a Lorentz force on the Z-pinch plasma column; and supplying radiofrequency (RF) energy to the Z-Pinch plasma column with one or more RF generators configured to drive energy into regions of the Z-pinch plasma column after formation of the Z-pinch plasma column to stabilize the Z-pinch plasma column and after starting said driving electric current through the Z-pinch plasma column, wherein one or more RF applicators direct RF energy from the one or more RF generators toward the Z-pinch plasma column in a direction generally perpendicular to the direction of the electric current through the Z-pinch plasma column, and wherein one or more RF distributors distribute the RF energy to the one or more RF applicators.

2. The method of claim 1, further comprising initiating nuclear fusion with a Z-pinch occurring in the Z-pinch plasma column as a result of the Lorentz force and extracting energy from the nuclear fusion resulting from the Z-pinch occurring in the Z-pinch plasma column.

3. The method of claim 1, further comprising supplying radiofrequency (RF) energy to a region within the atmospheric isolation device to initiate the Z-pinch plasma column prior to the driving the electric current through the Z-pinch plasma column.

4. The method of claim 1, further comprising delivering one or more fusion reactants to an environment within the atmospheric isolation device.

5. The method of claim 4, wherein the one or more fusion reactants include deuterium.

6. The method of claim 4, wherein the one or more fusion reactants include deuterium and tritium.

7. The method of claim 4, wherein the one or more fusion reactants include a boron-containing gas and hydrogen.

8. The method of claim 4, wherein the one or more fusion reactants include a helium 3-containing gas and deuterium.

9. The method of claim 4, wherein the one or more fusion reactants include hydrogen and lithium-6.

10. The method of claim 1, further comprising introducing one or more down-stream reagents into the Z-pinch plasma column.

11. The method of claim 10, further comprising collecting products of the one or more down-stream reagents in a down-stream reaction chamber.

12. The method of claim 10, further comprising performing secondary reactions on products of the one or more down-stream reagents in a down-stream reaction chamber.

13. The method of claim 12, further comprising inputting one or more secondary reactants into the down-stream reaction chamber.

14. The method of claim 10, further comprising entraining the Z-pinch plasma column into an output stream with a venturi nozzle.

15. The method of claim 14, further comprising using the output stream to etch or cut a substrate.

16. The method of claim 1, further comprising irradiating a substrate through a window in the atmospheric isolation device with radiation from the Z-pinch plasma column as a result a Z-pinch due to the Lorentz force.

17. The method of claim 1, further comprising shaping the Z-pinch plasma column into a single Z-pinch plasma column using one or more angled gas flows.

18. The method of claim 1, wherein the one or more RF distributors are configured to ensure that one or more RF applicators distribute power to the Z-pinch plasma column in a cylindrically symmetric manner.

19. The method of claim 1, wherein driving electric current through a Z-pinch plasma column within the atmospheric isolation device to produce a Lorentz force on the Z-pinch plasma column includes driving sufficient electric current through the Z-pinch plasma column within the atmospheric isolation device to produce a Lorentz force sufficient to compress the Z-pinch plasma column.

20. The method of claim 1, wherein, prior to driving the electric current through the Z-Pinch plasma column, the Z-Pinch plasma column is characterized by a diameter of $\lambda_{RF}/4$ or less, where $\lambda_{RF}$ is a wavelength of the RF energy, and a gas pressure within the atmospheric isolation device of between 0.5 kilopascals (kPa) and 2 kPa, and a ratio of a power density of the RF energy to the gas pressure within the atmospheric isolation device of between 0.2 $W/mm^3kPa$ and 0.4 $W/mm^3kPa$.

21. The method of claim 1, wherein, prior to driving the electric current through the Z-Pinch plasma column, the Z-Pinch plasma column is characterized by a diameter of between 2.5 millimeters (mm) and 12 mm, and a gas pressure within the atmospheric isolation device of between 2 kilopascals (kPa) and 50 kPa, and a ratio of a power density of the RF energy to the gas pressure within the atmospheric isolation device of between 0.2 $W/mm^3kPa$ and 12 $W/mm^3kPa$.

22. The method of claim 1, wherein, prior to driving the electric current through the Z-Pinch plasma column, the Z-Pinch plasma column is characterized by a diameter of between 1 millimeter (mm) and 6 mm, and a gas pressure within the atmospheric isolation device of between 50 kilopascals (kPa) and 500 kPa, and wherein a ratio of a power density of the RF energy to the gas pressure within the atmospheric isolation device of between 0.4 $W/mm^3kPa$ and 2 $W/mm^3kPa$.

* * * * *